(12) United States Patent
Ravichandran et al.

(10) Patent No.: US 12,425,414 B2
(45) Date of Patent: Sep. 23, 2025

(54) SEGMENTATION AND ACCESS CONTROL FOR TRUSTED NODES IN CLOUD-BASED TELECOMMUNICATION AND ENTERPRISE NETWORK

(71) Applicant: RAKUTEN MOBILE, INC., Tokyo (JP)

(72) Inventors: Bharath Kumar Ravichandran, Tokyo (JP); John Carse, Tokyo (JP); Pradheepkumar Singaravelu, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/010,997

(22) PCT Filed: Sep. 30, 2022

(86) PCT No.: PCT/US2022/045309
§ 371 (c)(1),
(2) Date: Dec. 16, 2022

(87) PCT Pub. No.: WO2023/214989
PCT Pub. Date: Nov. 9, 2023

(65) Prior Publication Data
US 2024/0236111 A1 Jul. 11, 2024

Related U.S. Application Data

(60) Provisional application No. 63/339,108, filed on May 6, 2022, provisional application No. 63/338,570, filed (Continued)

(51) Int. Cl.
*H04L 29/06* (2006.01)
*H04L 9/40* (2022.01)

(52) U.S. Cl.
CPC .............. *H04L 63/108* (2013.01); *H04L 9/40* (2022.05); *H04L 63/08* (2013.01);
(Continued)

(58) Field of Classification Search
CPC ....... H04L 63/108; H04L 9/40; H04L 63/102; H04L 63/1433; H04L 63/0892; H04L 63/101
See application file for complete search history.

(56) References Cited

U.S. PATENT DOCUMENTS

2021/0336959 A1* 10/2021 Shah .................... H04L 63/0281

OTHER PUBLICATIONS

International Search Report (PCT/ISA/210) dated Jan. 31, 2023 issued by the International Searching Authority in International Application No. PCT/US22/45309.
(Continued)

*Primary Examiner* — Longbit Chai
(74) *Attorney, Agent, or Firm* — Sughrue Mion, PLLC

(57) ABSTRACT

Provided are a method, system, and computer-readable recording medium for controlling zero trust remote access to a target node in a network system. The method includes: receiving a request of a user to access the target node in the network system; generating, based on parameters of the user and the target node, an access policy segmentation for the user to access the target node; providing, based on the generated access policy segmentation, the user with access to the target node; and terminating, based on the generated access policy segmentation, access of the user to the target node.

20 Claims, 64 Drawing Sheets

Related U.S. Application Data on May 5, 2022, provisional application No. 63/338,532, filed on May 5, 2022.

(52) U.S. Cl.
CPC ........ *H04L 63/0892* (2013.01); *H04L 63/101* (2013.01); *H04L 63/102* (2013.01); *H04L 63/1433* (2013.01)

(56) References Cited

OTHER PUBLICATIONS

Written Opinion (PCT/ISA/237) dated Jan. 31, 2023 issued by the International Searching Authority in International Application No. PCT/US 22/45309.

\* cited by examiner

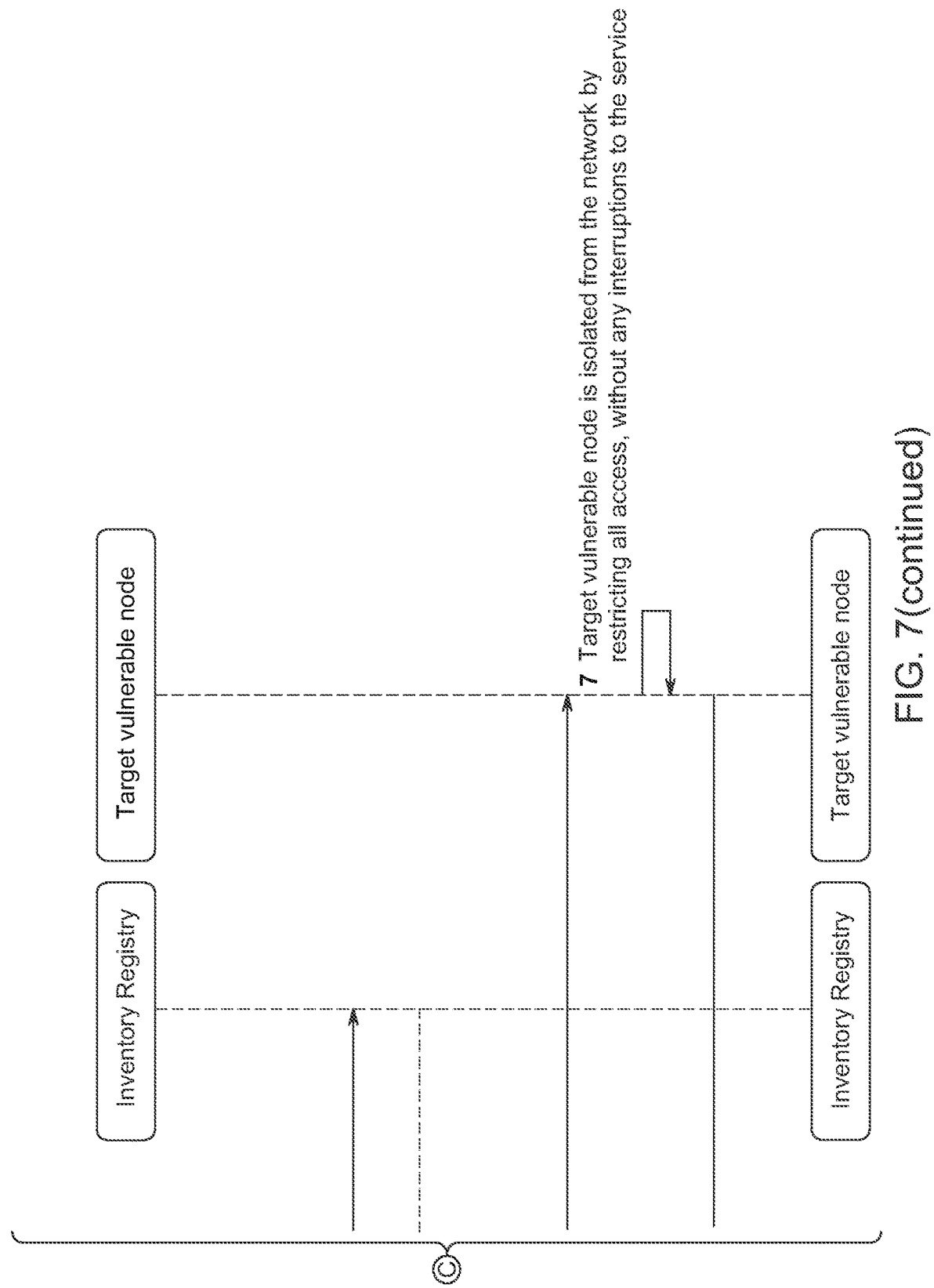

Provisioning of access for administrative change management using ZTRAS access policy segmentation (ZTRAS$_{pid}$)

2 Request creation of ZTRAS access policy segmentation (ZTRAS$_{pid}$)

3 Return the ZTRAS access policy segmentation (ZTRAS$_{pid}$) based on the ZTRASid and ZTRAS$_{nodeid}$ with session validity period (session start time and session end time) based on the type of change request: (2h if the change request type is config change, 6h if the change request type is migration, 12h if the change request type is upgrade)

4 Using the ZTRAS access policy segmentation (ZTRAS$_{pid}$), the ZTRAS subscription engine initiates the session for the ZTRAS subscriber (ZTRASid) to access the target node (ZTRAS$_{nodeid}$)

Ⓐ ⋯ Ⓑ

6 Using the ZTRAS access policy segmentation (ZTRAS$_{pid}$), the ZTRAS subscription engine terminates the session for the ZTRAS subscriber (ZTRASid) and restricts access to the target node (ZTRAS$_{nodeid}$)

FIG. 8(Continued)

Provisioning of sensitive and non-sensitive application using ZTRAS access policy segmentation ($ZTRAS_{pid}$) for admin ZTRAS subscriber

ZTRAS AI policy engine

2 Request the ZTRAS access policy segmentation ($ZTRAS_{pid}$) based on the $ZTRAS_{nodeid}$ and the group ID 3 Return the generated ZTRAS access policy segmentation ($ZTRAS_{pid}$) based on the group ID 4 Using the ZTRAS access policy segmentation ($ZTRAS_{pid}$), the ZTRAS subscription engine initiates the session for the admin subscriber (ZTRASid) to access the internal trusted node (non-sensitive)($ZTRAS_{nodeid}$)

6 Using the ZTRAS access policy segmentation ($ZTRAS_{pid}$), the ZTRAS subscription engine terminates the session for the admin subscriber (ZTRASid) and restricts to access the internal trusted node (non-sensitive)($ZTRAS_{nodeid}$)

10 Using the ZTRAS access policy segmentation ($ZTRAS_{pid}$), the ZTRAS subscription engine initiates the session for the admin subscriber (ZTRASid) to access the internal trusted sensitive node

FIG. 12(Continued)

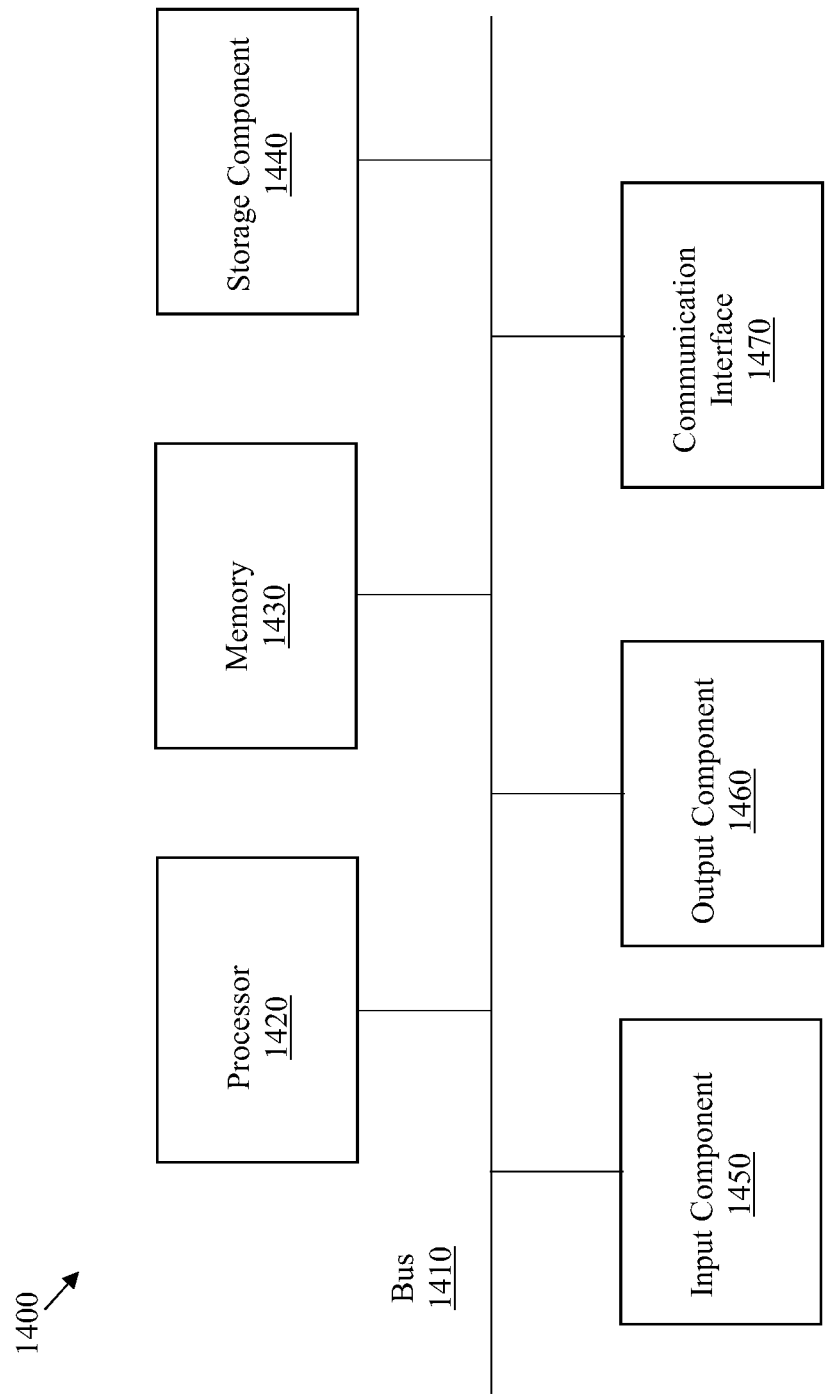

SEGMENTATION AND ACCESS CONTROL FOR TRUSTED NODES IN CLOUD-BASED TELECOMMUNICATION AND ENTERPRISE NETWORK

CROSS-REFERENCE TO RELATED APPLICATION(S)

This application is a National Stage of International Application No. PCT/US2022/045309 filed Sep. 30, 2022, claiming priority from U.S. Provisional Patent Application No. 63/338,570, filed on May 5, 2022, U.S. Provisional Patent Application No. 63/338,532, filed on May 5, 2022, and U.S. Provisional Patent Application No. 63/339,108, filed on May 6, 2022 in the United States Patent and Trademark Office, the disclosures of which (and the disclosures of the PCT applications filed concurrently herewith and claiming benefit thereof) are incorporated by reference herein in their entireties. That is, the disclosures of the other PCT applications filed Sep. 30, 2022 and claiming priority from U.S. Provisional Patent Application No. 63/338,570, U.S. Provisional Patent Application No. 63/338,532 and U.S. Provisional Patent Application No. 63/339,108 are also incorporated by reference in their entireties.

BACKGROUND

1. Field

Apparatuses and methods consistent with example embodiments of the present disclosure relate to a security system and method for a cloud-based telco network system, and more particularly to authorization and context segmentation for trusted and untrusted entities within a cloud-based telecommunication or enterprise network.

2. Description of Related Art

Recently, telecommunication network systems have been undergoing a transformation from a hardware-based system to a virtualized, software-based system or cloud system. Although security for cloud systems may have been undergoing development in the past decade, the security aspect for cloud-based telco network systems remains a relatively new area for exploring and enhancement.

Generally, a network system allows a node to connect to another node (e.g., a target node). In related art telecommunications and cloud security systems and procedures, there is no way to determine or classify the user who is sending a request to the network and no way to determine/classify the nodes within the network based on the type of the node and manage them with a unique subscription identifier. These limitations cause security issues and risks in cloud-based telco network system, such as (but not limited to) the following: (a) lack of segmentation of access based on geolocation, time window and sensitivity of target node; (b) unrestricted access to out of band (OOB) network node access; (c) policy drift due to manual configuration with growing asset inventory; (d) man-in-the-middle (MITM) attacks within the cloud-based telecommunication network; (e) Domain Name System (DNS) hijacking; (f) external hacking threats; (g) compromise of sensitive information; (h) damage of brand identity and loss of customer trust; (i) improper storage of data (logs, credentials, etc.) in the network; (j) Internet Protocol (IP) address leakage.

SUMMARY

According to embodiments, systems and methods are provided for including a zero trust-remote access system (ZTRAS) that is a centralized authorization and contextual access policy management system to perform segmentation for internal and external trusted nodes based on parameters pertaining to a requesting subscriber and the target node.

According to example embodiments, a method for controlling zero trust remote access to a target node in a network system, includes: receiving a request of a user to access the target node in the network system; generating, based on parameters of the user and the target node, an access policy segmentation for the user to access the target node; providing, based on the generated access policy segmentation, the user with access to the target node; and terminating, based on the generated access policy segmentation, access of the user to the target node.

According to example embodiments, a system for controlling zero trust remote access to a target node in a network system, includes: at least one memory storing instructions; and at least one processor configured to execute the instructions to: receive a request of a user to access the target node in the network system; generate, based on parameters of the user and the target node, an access policy segmentation for the user to access the target node; provide, based on the generated access policy segmentation, the user with access to the target node; and terminate, based on the generated access policy segmentation, access of the user to the target node.

According to example embodiments, a non-transitory computer-readable recording medium having recorded thereon instructions executable by at least one processor to perform a method for controlling zero trust remote access to a target node in a network system, includes: receiving a request of a user to access the target node in the network system; generating, based on parameters of the user and the target node, an access policy segmentation for the user to access the target node; providing, based on the generated access policy segmentation, the user with access to the target node; and terminating, based on the generated access policy segmentation, access of the user to the target node.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 14 is a diagram of example components of a device according to an embodiment.

DETAILED DESCRIPTION

Figure 1:
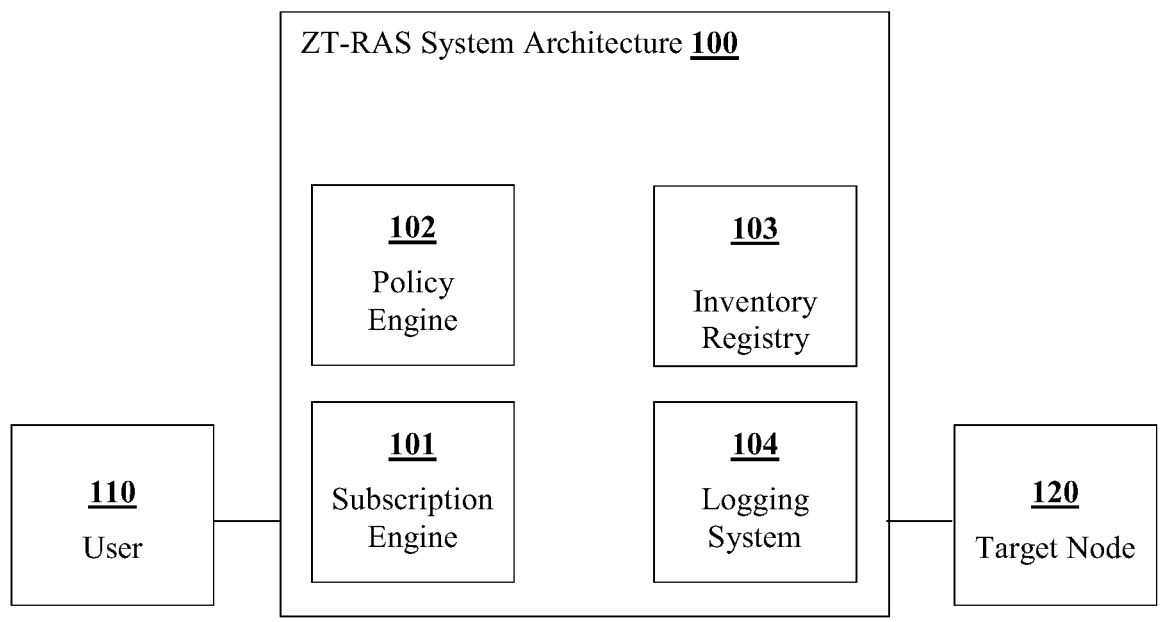
FIG. 1 illustrates a system architecture of a zero trust-remote access system (ZTRAS) for utilizing access policy segmentation to control network access from a subscriber (or user) to a target node in a network, in accordance with an example embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed herein, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, example embodiments of the present invention provide a zero trust-remote access system (ZTRAS) that is a centralized authorization and contextual access policy management system for performing segmentation of internal and external trusted nodes based on parameters pertaining to a requesting subscriber and the target node.

Further, according to example embodiments, a unique policy identifier ($ZTRAS_{pid}$) is defined binding a ZTRAS subscriber ($ZTRAS_{id}$) with a target node ($ZTRAS_{nodeid}$) and additional parameters within the cloud-based telecommunication or enterprise network. The additional parameters may include, but are not limited to, at least one of geolocation, time window of access, grouping policy of the target nodes (virtualized network function (VNF), cloud-native network function (CNF), cluster, host, physical nodes, application nodes, terminal nodes, radio nodes, endpoints, etc.), etc. These additional parameters are considered for the ZTRAS access policy segmentation.

The ZTRAS according to example embodiments also orchestrates the management of authorization and access policies within the cloud-based telecommunication network by leveraging Machine Learning (ML)/Artificial Intelligence (AI) policies with contextual data of each request.

By issuing a unique policy identifier ($ZTRAS_{pid}$) that binds ZTRAS subscriber ($ZTRAS_{id}$) information and target node ($ZTRAS_{nodeid}$) information such as time zone, location, trust percentage of the subscriber ($ZTRAS_{id}$), validity of the $ZTRAS_{id}$, trust percentage of the node ($ZTRAS_{nodeid}$), timestamp, session start time, session end time, etc., with reference to a group ID within the cloud-based telecommunication network, systems and methods according to one or more embodiments achieve one or more of the following technical benefits: (1) helping the cloud-based telecommunication network system to have a dynamic validity period for each session of the ZTRAS subscriber and the target node ($ZTRAS_{nodeid}$) based on trust level, authorization privilege, geolocation, etc., as a result of the issuance of ZTRAS access policy segmentation ($ZTRAS_{pid}$); (2) providing an easy way of provisioning access to users for any node in the cloud-based telecommunication network, overcoming traditional problems in access management by providing automated responses for access requests; (3) securing the cloud-based telecommunication network by restricting access to nodes based on malicious activity detection; (4) segmentation of access to trusted nodes within the telecomunication network based on the geolocation of the ZTRAS subscriber; (5) segmentation of access to trusted nodes within the telecommunication network based on the type of the target node (sensitive or non-sensitive); (6) segmentation of access based on the geolocation of the ZTRAS subscriber ($ZTRAS_{id}$); (7) prevention of vulnerabilities using ZTRAS access policy segmentation ($ZTRAS_{pid}$) to restrict access and isolate the identified vulnerable node; (8) provisioning of access for administrative change management using ZTRAS access policy segmentation ($ZTRAS_{pid}$) to restrict the duration of access based on the type of change; and (9) provisioning of out of band (OOB) access using ZTRAS access policy segmentation ($ZTRAS_{pid}$) for emergency use cases based on executive approval.

In accordance with one or more example embodiments, a node (or target node) as described herein may be defined and classified as a virtualized network function (VNF), a cloud-native function (CNF), cluster, host, physical nodes, application nodes, terminal nodes, radio nodes, endpoints, or any potential element in the network system. Further, each node is assigned a unique subscription identifier $ZTRAS_{nodeid}$ which shall be classified as $ZTRAS_{Tnodeid}$, $ZTRAS_{Anodeid}$, $ZTRAS_{Rnodeid}$ based on the type of the target node.

An inventory registry in one or more example embodiments is mandatory for all trusted nodes and shall have all information of internal trusted nodes and external trusted nodes respectively. For internal trusted nodes (e.g., nodes such as those provided or authorized by the network operator), at least one of the following information may be mandatory (though the information in the registry is not limited thereto): Internet protocol address (IP), Hostname, fully qualified domain name (FQDN), application name, namespace, cluster ID, endpoints, Media Access Control (MAC) address, location, universally unique identifier (UUID), serial number, equipment type, identity management integrated, secrets management integrated, centralized logging integrated, internal certificate details, etc. This information may be provided during registration of ZTRAS subscription for the trusted nodes.

For external trusted nodes (e.g., nodes such as those provided by vendors or service providers to the telco network system), at least one of the following information may be mandatory for the inventory registry (though the information in the registry is not limited thereto): IP, FQDN, endpoints, location, UUID, serial number, equipment type, public (or third-party) certificate details.

As used herein, a $ZTRAS_{id}$ (ZTRAS ID or telco operator ZTRAS ID) is a unique identifier provisioned for users of or attempting access to the network system, such as employee/operator/contractor/sales/marketspace/customer based on existing user identities such as public, private, corporate accounts, etc.

A ZTRAS subscription engine (which may include a processing engine and any other suitable elements) according to one or more example embodiments is a central node coupling to a plurality of nodes (e.g., any node) in the system. In accordance with an embodiment, when an entity (e.g., a user, a node, etc.) wants to access a network node in the system, the entity will first arrive at the ZTRAS subscription engine. The ZTRAS subscription engine will validate whether the entity is legitimate or not.

A ZTRAS artificial intelligence (AI) Policy Engine according to one or more example embodiments is a centralized policy engine that leverages machine learning algorithms to perform trust validation and trust percentage calculation for incoming requests from untrusted and trusted users. In one or more other embodiments, a policy engine that does not utilize machine learning algorithms (e.g., a policy engine that utilizes one or more predefined rules) may be utilized.

A ZTRAS logging system according to one or more example embodiments is a centralized monitoring, visibility, and detection platform that aggregates security logs and audit logs for any network node in the cloud-based telecommunication and/or enterprise network.

An Application Administrator according to one or more example embodiments is an owner of a resource authorized to approve and perform changes for a target trusted node in the cloud-based telecommunication and/or enterprise network.

In accordance with one or more example embodiments, a ZTRAS subscription engine utilizes an access policy segmentation to control a user's access to a target node. Here, the access is segmented based on various parameters with respect to a particular user ID and target node ID. The policy itself defines the level of access that the user has to the target node. A policy ID in accordance with one or more example embodiments binds a user ID and node ID to establish a policy definition that can be enforced by the ZTRAS subscription engine.

FIG. 1 illustrates a system architecture 100 of a zero trust-remote access system (ZTRAS) for utilizing access policy segmentation to control network access from a subscriber (or user) 110 to a target node 120 in a network, in accordance with an example embodiment.

Referring to FIG. 1, the system architecture 100 includes a ZTRAS subscription engine 101, a ZTRAS AI policy engine 102, an inventory registry 103, and a ZTRAS logging system 104.

The ZTRAS subscription engine 101 is configured to receive a user request to access a target node 120, and facilitate access (e.g., reject or provide) to the target node 120. The user request may be received from an internal or external user 110 (i.e., user device or user/source node), and may be received from a trusted or untrusted user 110. Further, the trusted user (e.g., internal trusted user or external trusted user) may be a user that has a previously-registered ZTRAS subscription in the system (e.g., has a previously-generated/registered $ZTRAS_{id}$ that is valid). The ZTRAS subscription engine 101 may determine whether the user is a trusted user or an untrusted user, and whether the user is internal or external, and provide access accordingly. To this end, the ZTRAS subscription engine 101 is configured to receive a user request to access a target node 120, obtain an access policy segmentation from the ZTRAS AI policy engine 102, and provide access to the target node 120 according to the access policy segmentation.

As set forth above The ZTRAS AI policy engine 102 is configured to perform trust validation and trust percentage calculation for incoming requests from untrusted and trusted users. Here, the ZTRAS AI policy engine 102 may implement algorithms to determine whether the user is trusted or untrusted, to determine whether the user is external or internal, and to calculate a trust percentage for the user. Further, the ZTRAS AI policy engine 102 is configured to generate an access policy segmentation based on input parameters (e.g., subscriber id and node id) provided by the ZTRAS subscription engine 101.

The inventory registry 103 is configured to store user information that is used to manage ZTRAS subscriptions of users, generate access policy segmentations, determine validity of user requests, session data, etc. Further, the inventory registry 103 may be configured to store generated access policy segmentations, node information (e.g., node ids, node types, node vulnerabilities, etc.), etc.

The ZTRAS logging system 104 is configured to receive, aggregate, store, etc., security logs and audit logs of the target node 120. Further, the logging system 104 is configured to monitor the security logs and audit logs and send alerts based on rules configured therein by the ZTRAS subscription engine 101.

Figure 2:
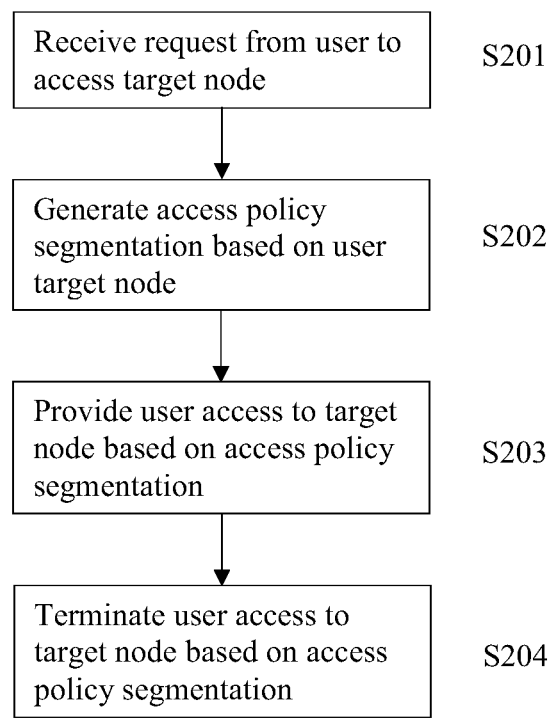
FIG. 2 illustrates a method of controlling network access to a target node based on access policy segmentation, according to an example embodiment.

FIG. 2 illustrates a method of controlling network access to a target node based on access policy segmentation, according to an example embodiment. The method of FIG. 2 may be performed by at least one processor (e.g., embodied or embodying the components of the system architecture described with reference to FIG. 1) executing instructions stored in memory.

Referring to FIG. 2, at operation S201, the ZTRAS subscription engine 101 receives a user request from a subscriber 110 (i.e., a user that has a ZTRAS subscription and corresponding $ZTRAS_{id}$) to access a target node 120.

At operation S202, the ZTRAS AI policy engine 102 generates an access policy segmentation based on the user and the target node (e.g., based on the $ZTRAS_{id}$ of the user and of the target node). For example, the access policy segmentation may be generated based on input parameters of the user 110 (such as location, user type, group identifier, etc.) and of the target node 120 obtained from the user 110 and/or from the inventory registry 103.

At operation S203, the ZTRAS subscription engine 101 provides user access to the target node 110 based on the generated access policy segmentation. An example of various access policy segmentations based on the user and the target node is provided below in Table 1:

TABLE 1

| SUBSCRIBER | TARGET NODE | | | ADDITIONAL POLICY CONDITIONS | | |
|---|---|---|---|---|---|---|
| | Internal Trusted Non-Sensitive | Internal Trusted Sensitive | External Trusted | Out-of-band Access to Target Node? | Change in Subscriber Geolocation Permitted? | Change in Node Permitted? |
| Internal Trusted Subscriber | Yes | Admin Approval Needed | Admin Approval Needed | No | No | No |
| External Trusted Subscriber | Admin Approval Needed | No | Admin Approval Needed | No | No | No |
| Administrator Subscriber | Yes | Yes | Yes | Executive Approval Needed | No | Yes |

At operation S204, the user access or session with respect to the target node 120 is terminated based on the access policy segmentation, e.g., based on a validity period or session start and end times of the policy.

Figure 3:
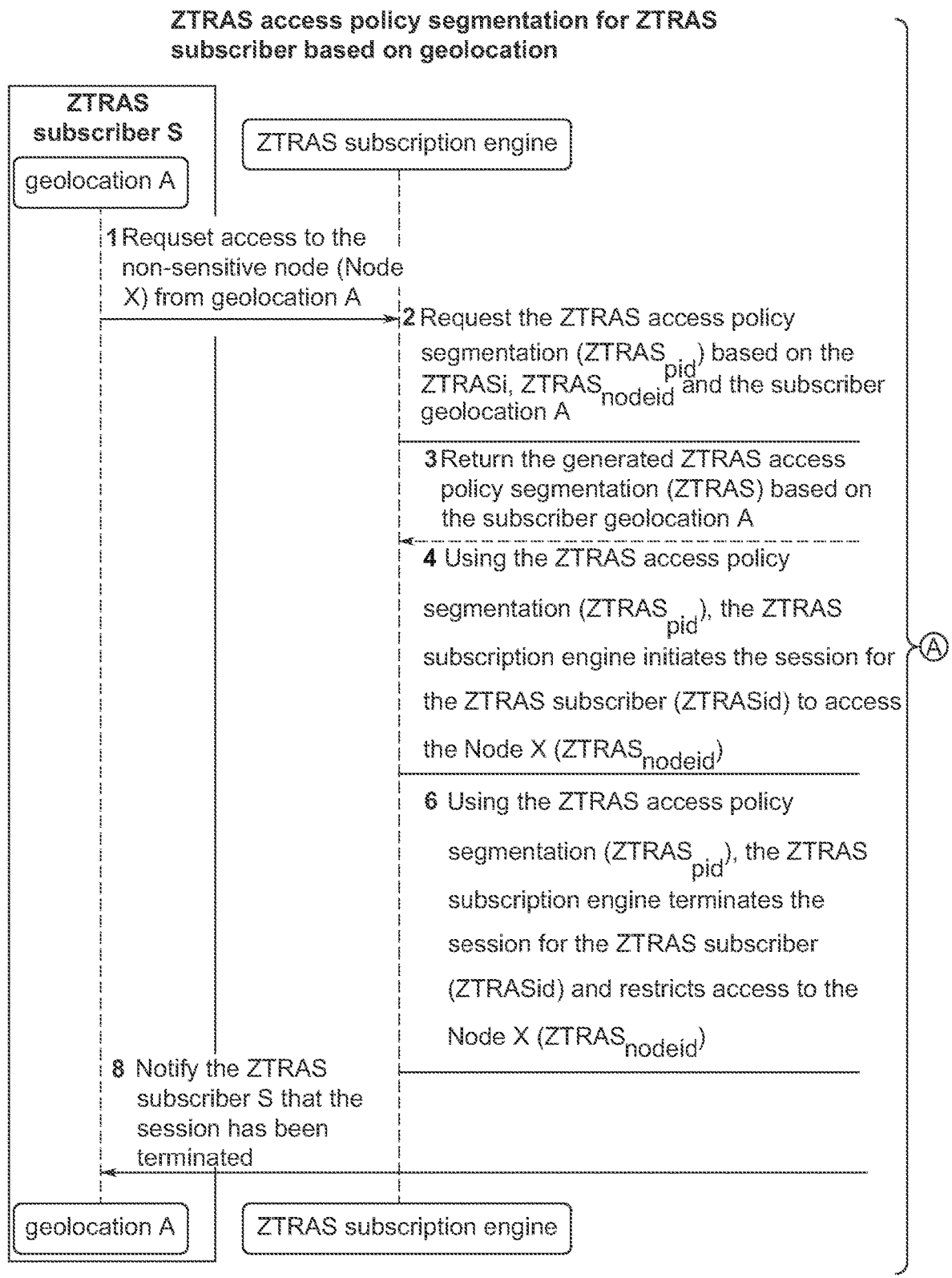
FIG. 3 illustrates a call flow for ZTRAS access policy segmentation for a ZTRAS subscriber based on geolocation, according to an embodiment.
Figure 3:
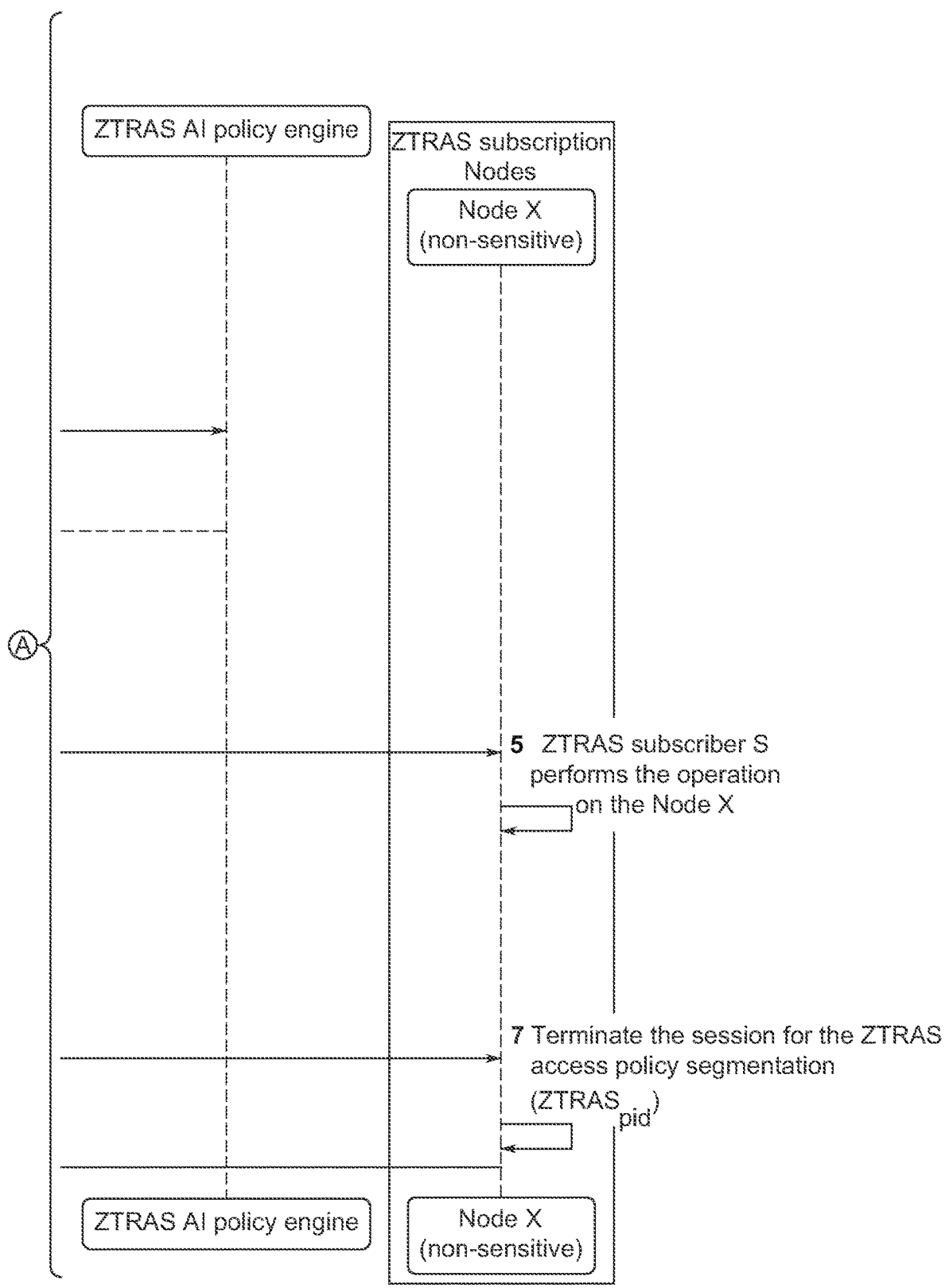

Use Case 1: ZTRAS Access Policy Segmentation for ZTRAS Subscriber Based on Geolocation FIG. 3 illustrates a call flow for ZTRAS access policy segmentation for a ZTRAS subscriber based on geolocation, according to an embodiment. In the example of FIG. 3, the ZTRAS subscriber S is assumed to be from geolocation A and requests to access a non-sensitive target node X inside a cloud-based telecommunication network.

Referring to FIG. 3, at (1), the ZTRAS subscriber S requests access to the non-sensitive target node X from geolocation A.

At (2), the ZTRAS subscription engine requests the ZTRAS AI policy engine for creation of the ZTRAS access policy segmentation ($ZTRAS_{pid}$) based on the $ZTRAS_{id}$, $ZTRAS_{nodeid}$ and the subscriber (or user) geolocation A.

At (3), the ZTRAS AI policy engine generates the ZTRAS access policy segmentation and returns the generated ZTRAS access policy segmentation ($ZTRAS_{pid}$) based on the subscriber geolocation A to the ZTRAS subscription engine.

At (4), using the ZTRAS access policy segmentation ($ZTRAS_{pid}$), the ZTRAS subscription engine initiates the session for the ZTRAS subscriber S ($ZTRAS_{id}$) to access the Node X (ZTRAS nodeid).

At (5), the ZTRAS subscriber S performs an operation on the Node X from geolocation A.

At (6), using the ZTRAS access policy segmentation ($ZTRAS_{pid}$), the ZTRAS subscription engine terminates the session for the ZTRAS subscriber S ($ZTRAS_{id}$) and restricts access to the Node X ($ZTRAS_{nodeid}$).

At (7), the session for the ZTRAS access policy segmentation ($ZTRAS_{pid}$) is terminated on Node X.

At (8), the Node X notifies the ZTRAS subscriber S that the session has been terminated for geolocation A.

Figure 4:
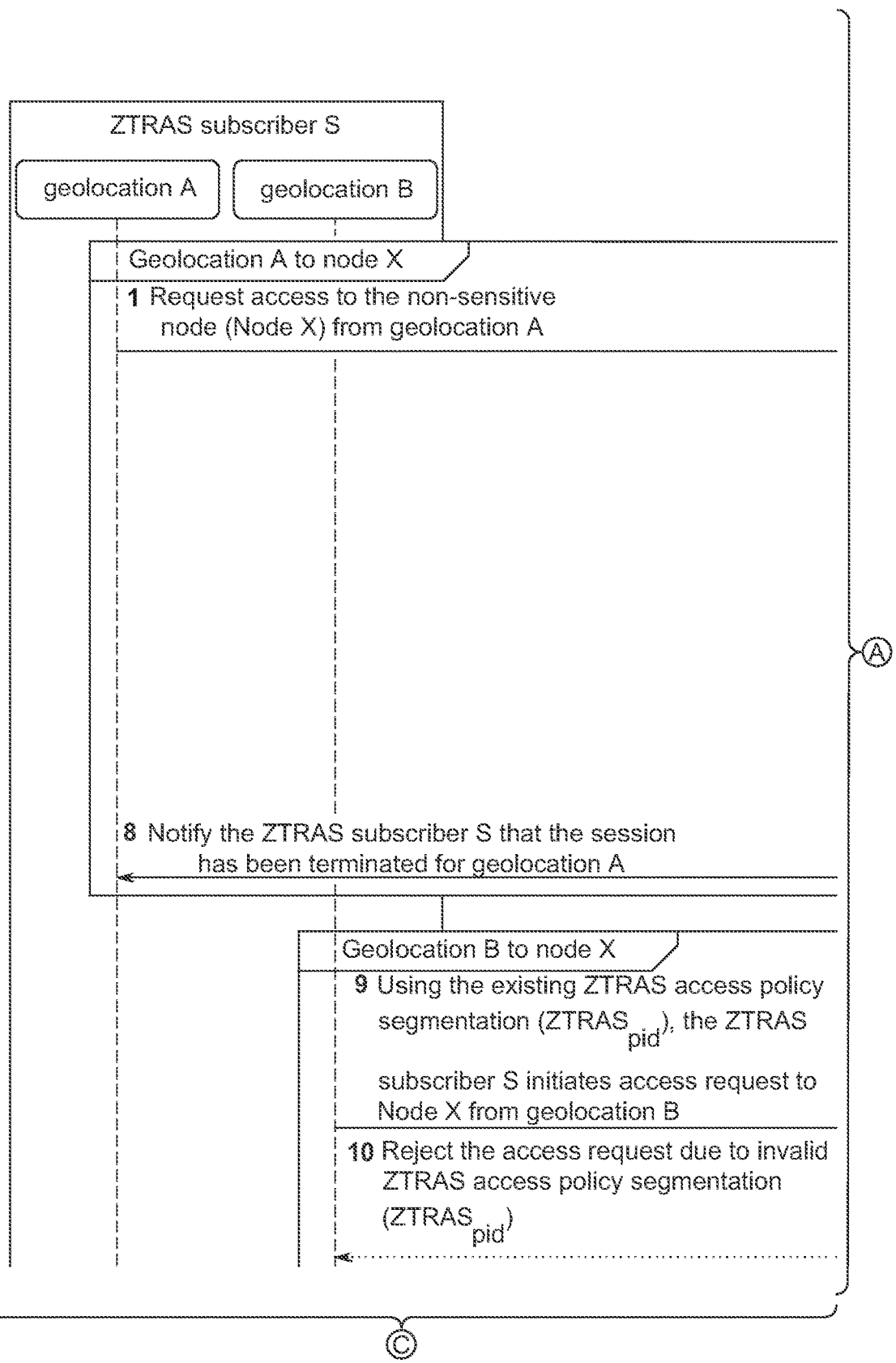
FIG. 4 illustrates a call flow for restriction of ZTRAS access policy segmentation for a ZTRAS subscriber based on change in geolocation, according to an embodiment.
Figure 4:
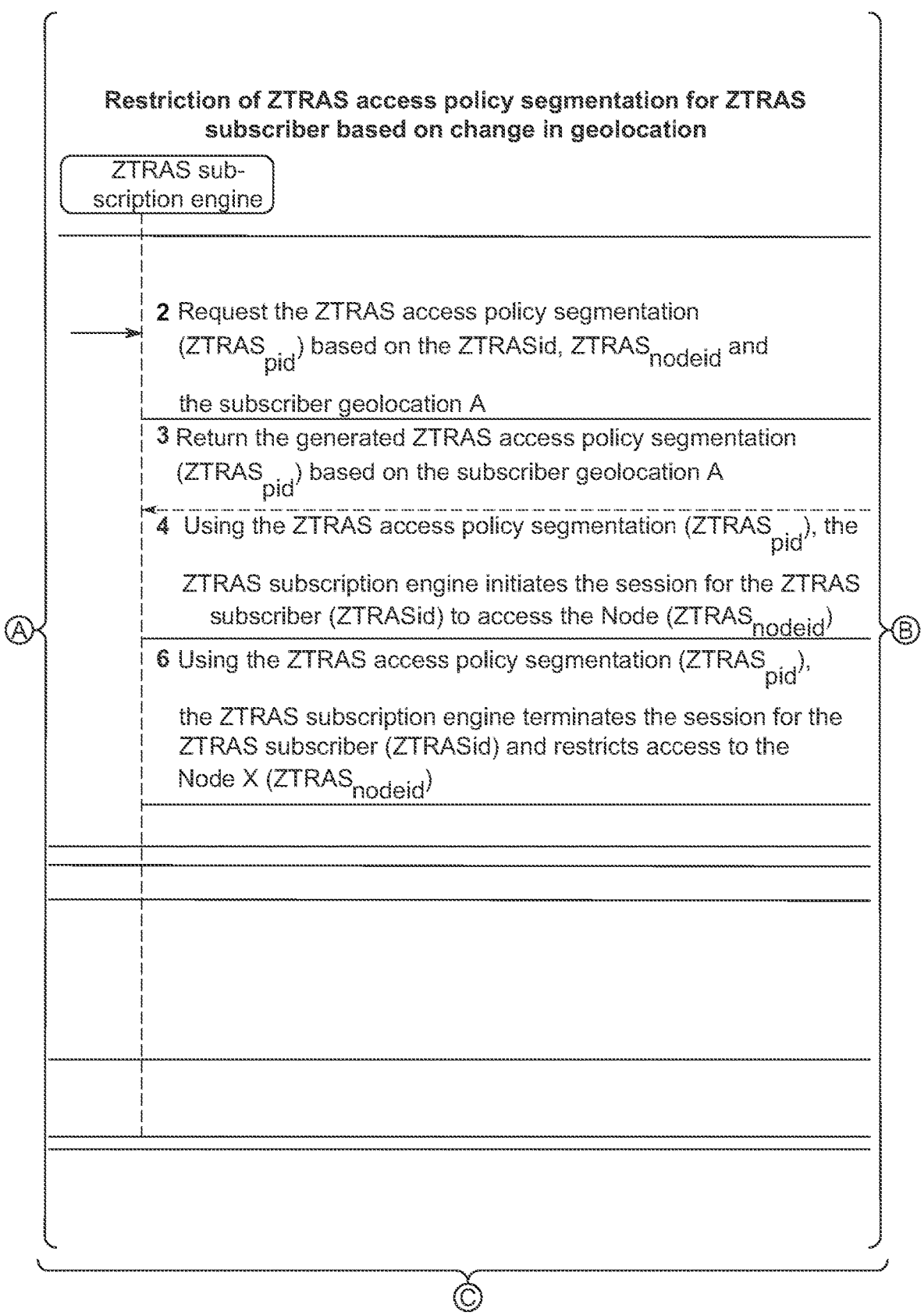
Figure 4:
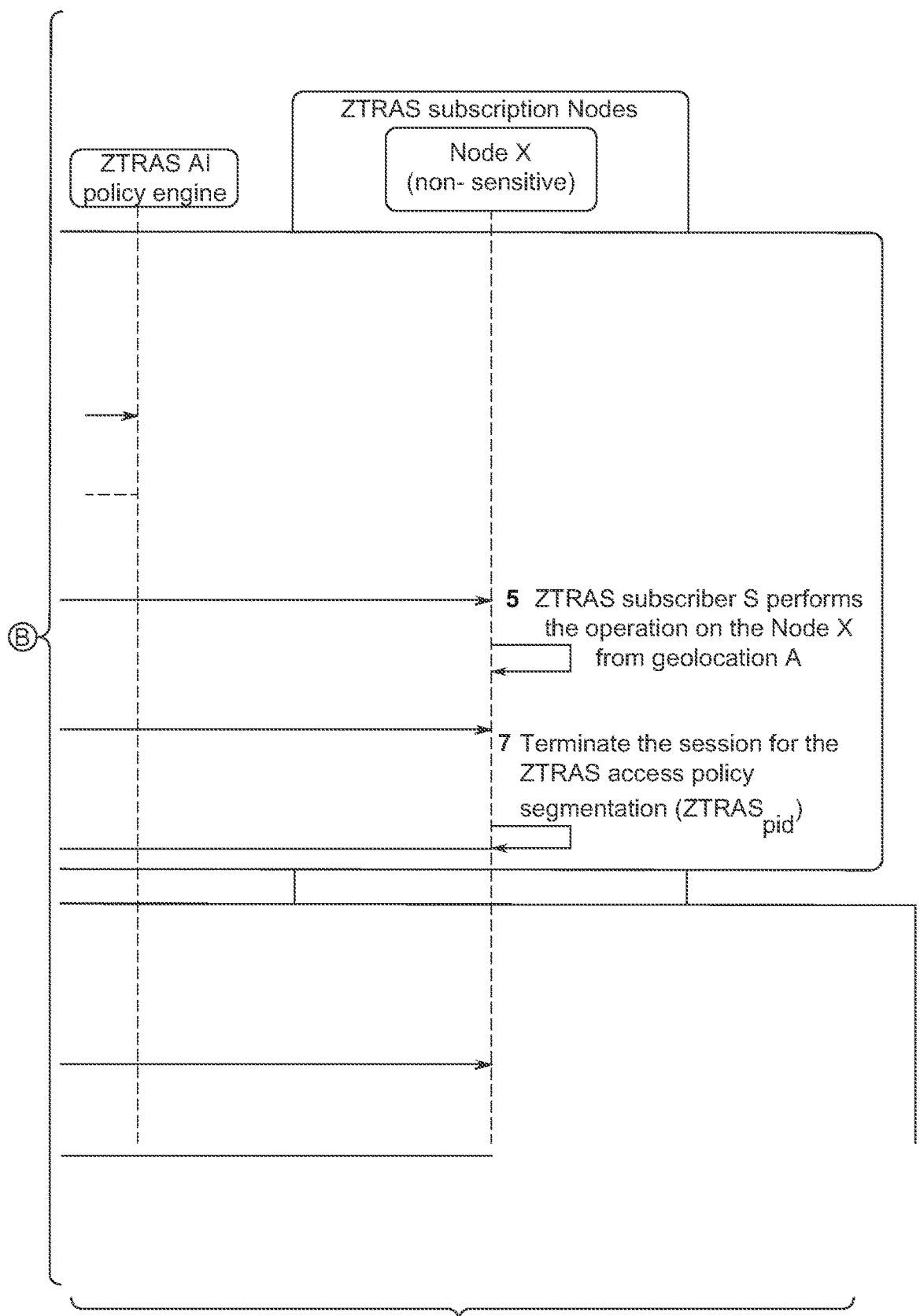
Figure 4:
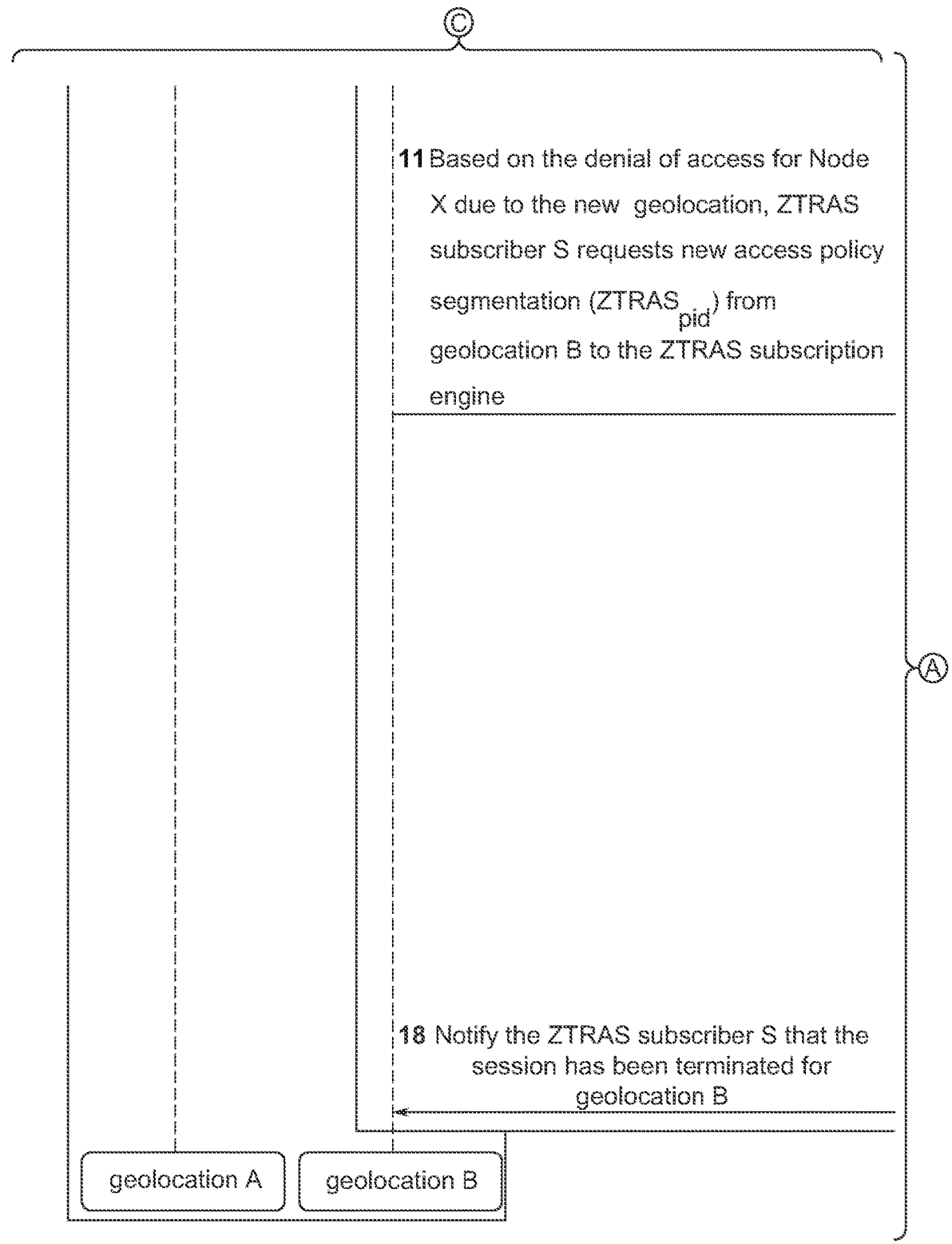
Figure 4:
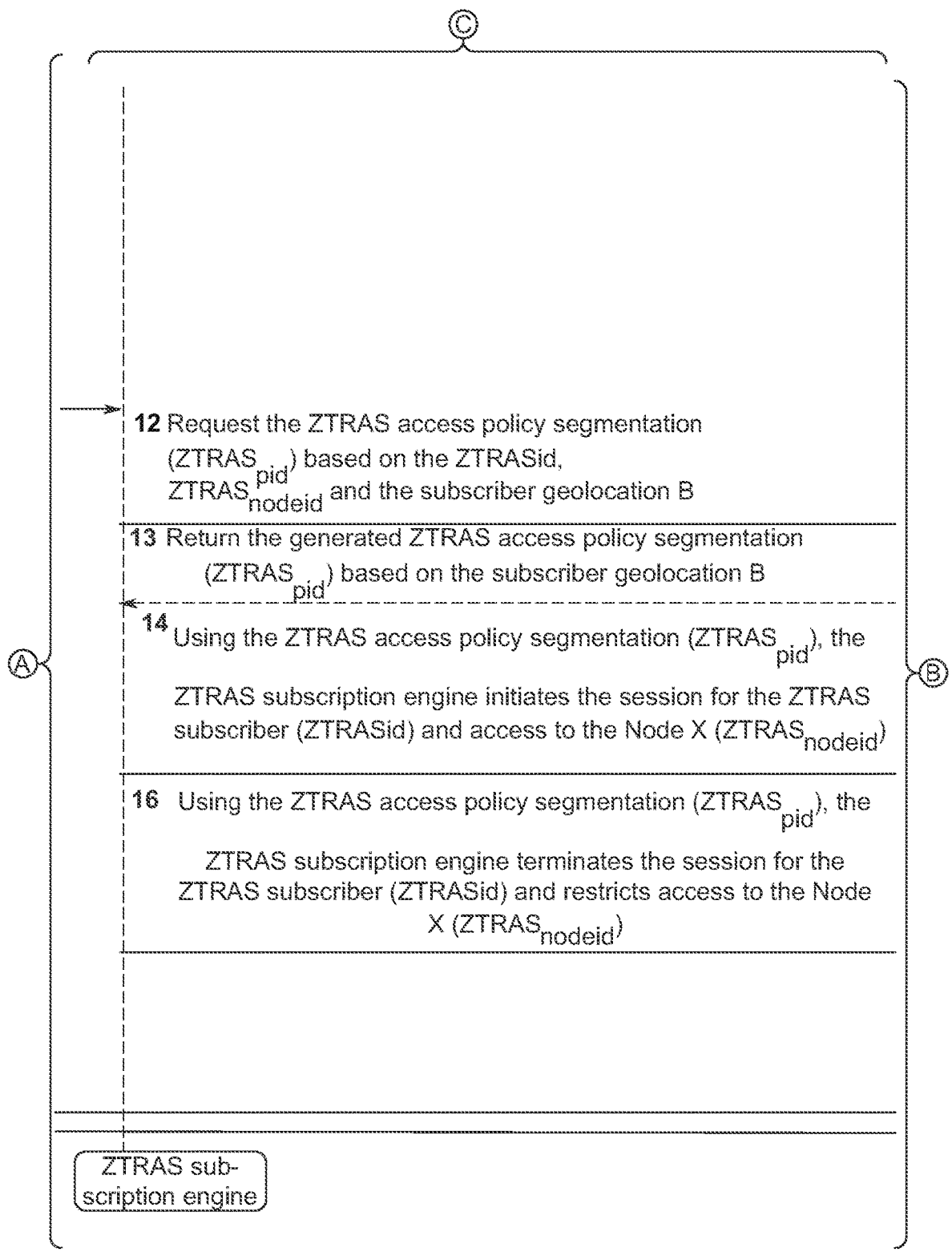
Figure 4:
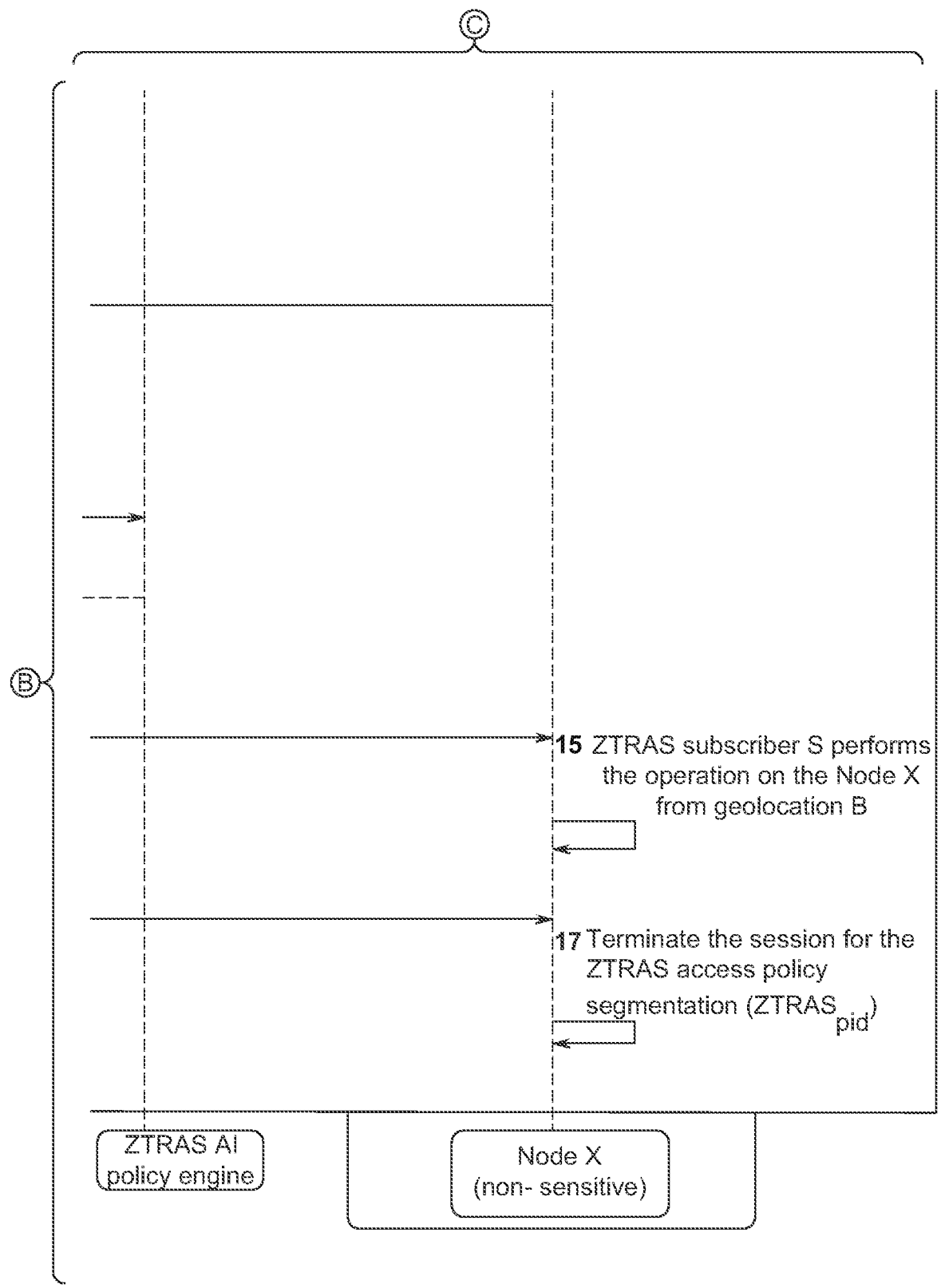

Use Case 1.1: Restriction of ZTRAS access policy segmentation for ZTRAS subscriber based on change in geolocation FIG. 4 illustrates a call flow for restriction of ZTRAS access policy segmentation for a ZTRAS subscriber S based on change in geolocation, according to an embodiment. In the example of FIG. 4, the assumptions from Use Case 1 are applicable. In addition, the ZTRAS subscriber S is assumed to move to geolocation B and requests to access a non-sensitive target node X inside the cloud-based telecommunication network.

Referring to FIG. 4, steps (1) through (8) in the call flow thereof correspond to steps (1) through (8), respectively, in the call flow of FIG. 3. Thus, redundant descriptions thereof are omitted below.

At (9), using the existing ZTRAS access policy segmentation ($ZTRAS_{pid}$), the ZTRAS subscriber S initiates an access request to Node X from geolocation B. For example, the subscriber requests the ZTRAS subscription engine for access to Node X from geolocation B. In this case, because the subscriber has changed geolocation, the ZTRAS subscription ID of the subscriber has changed as compared to the id when the access policy segmentation ($ZTRAS_{pid}$) was generated.

At (10), the access request is rejected due to invalid access policy segmentation. For example, at (10), the ZTRAS subscription engine may determine that the policy ID is no longer valid and rejects the access request from geolocation B due to invalid ZTRAS access policy segmentation ($ZTRAS_{pid}$). For example, the ZTRAS subscription engine may identify that the $ZTRAS_{id}$ of the subscriber S is different from that included in the policy id ($ZTRAS_{pid}$) due to the change in geolocation.

At (11), based on the denial of access for Node X due to the new geolocation, ZTRAS subscriber S requests new access policy segmentation ($ZTRAS_{pid}$) from geolocation B to the ZTRAS subscription engine.

At (12), the ZTRAS subscription engine requests the ZTRAS AI policy engine for new ZTRAS access policy segmentation ($ZTRAS_{pid}$) based on the $ZTRAS_{id}$, $ZTRAS_{nodeid}$ and the subscriber geolocation B.

At (13), the ZTRAS AI policy engine returns the generated ZTRAS access policy segmentation ($ZTRAS_{pid}$) based on the subscriber geolocation B.

At (14), using the ZTRAS access policy segmentation ($ZTRAS_{pid}$), the ZTRAS subscription engine initiates the session for the ZTRAS subscriber ($ZTRAS_{id}$) to access the Node X ($ZTRAS_{nodeid}$). Here, the ZTRAS subscription engine may provide the policy id ($ZTRAS_{pid}$) to the subscriber S, based on which the subscription engine will allow or terminate/restrict access by the subscriber S to the Node X.ZTRAS At (15), the ZTRAS subscriber S performs an operation on the Node X from geolocation B.

At (16), using the ZTRAS access policy segmentation ($ZTRAS_{pid}$), the ZTRAS subscription engine terminates the session for the ZTRAS subscriber ($ZTRAS_{id}$) and restricts access to the Node X ($ZTRAS_{nodeid}$).

At (17), the session for the ZTRAS access policy segmentation ($ZTRAS_{pid}$) is terminated on Node X.

At (18), the Node X notifies the ZTRAS subscriber S that the session has been terminated for geolocation B. Alternatively, this notification may be provided by the ZTRAS subscription engine.

Figure 5:
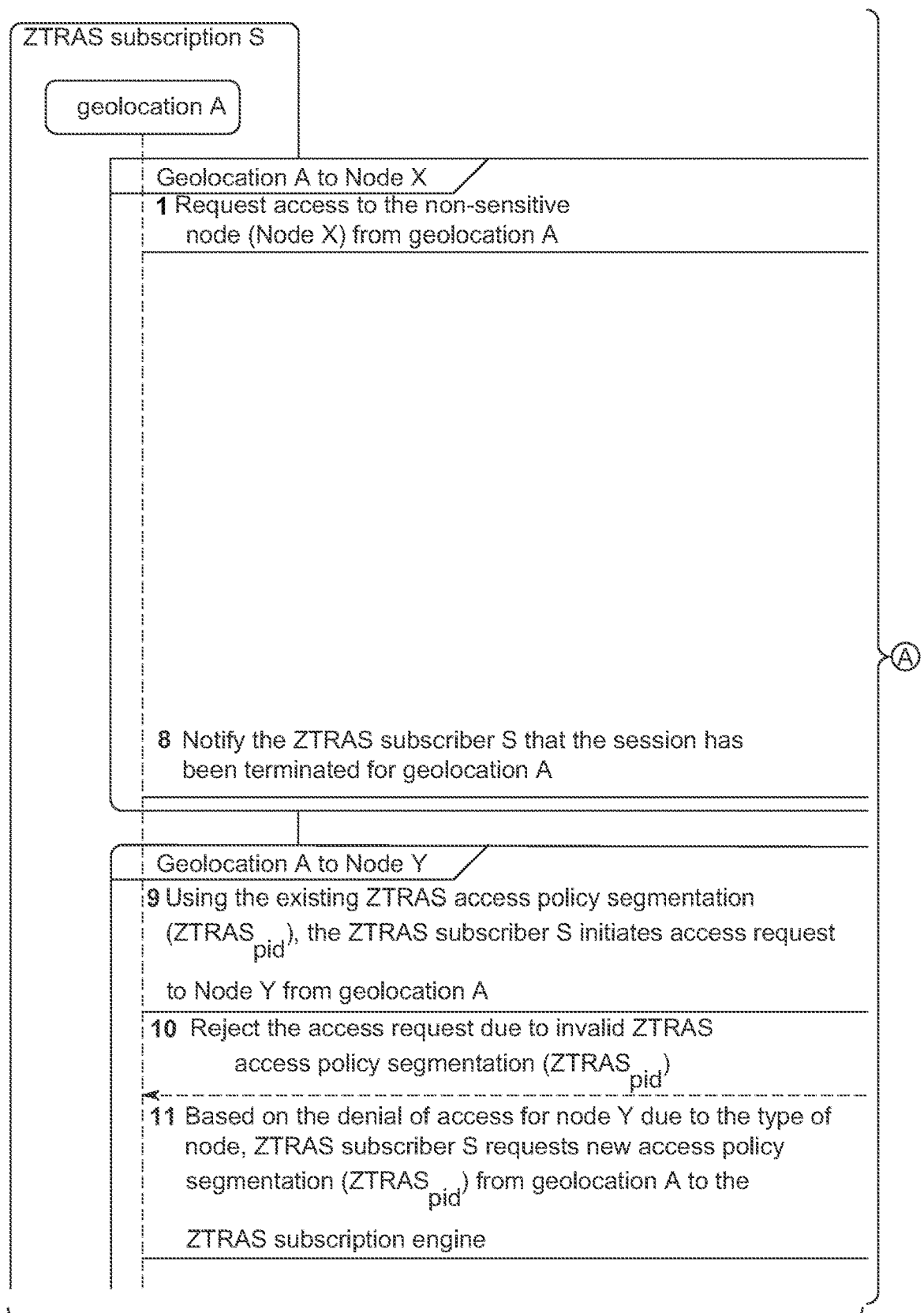
FIG. 5 illustrates a call flow for restriction of ZTRAS access policy segmentation for a ZTRAS subscriber based on sensitive application, according to an embodiment.
Figure 5:
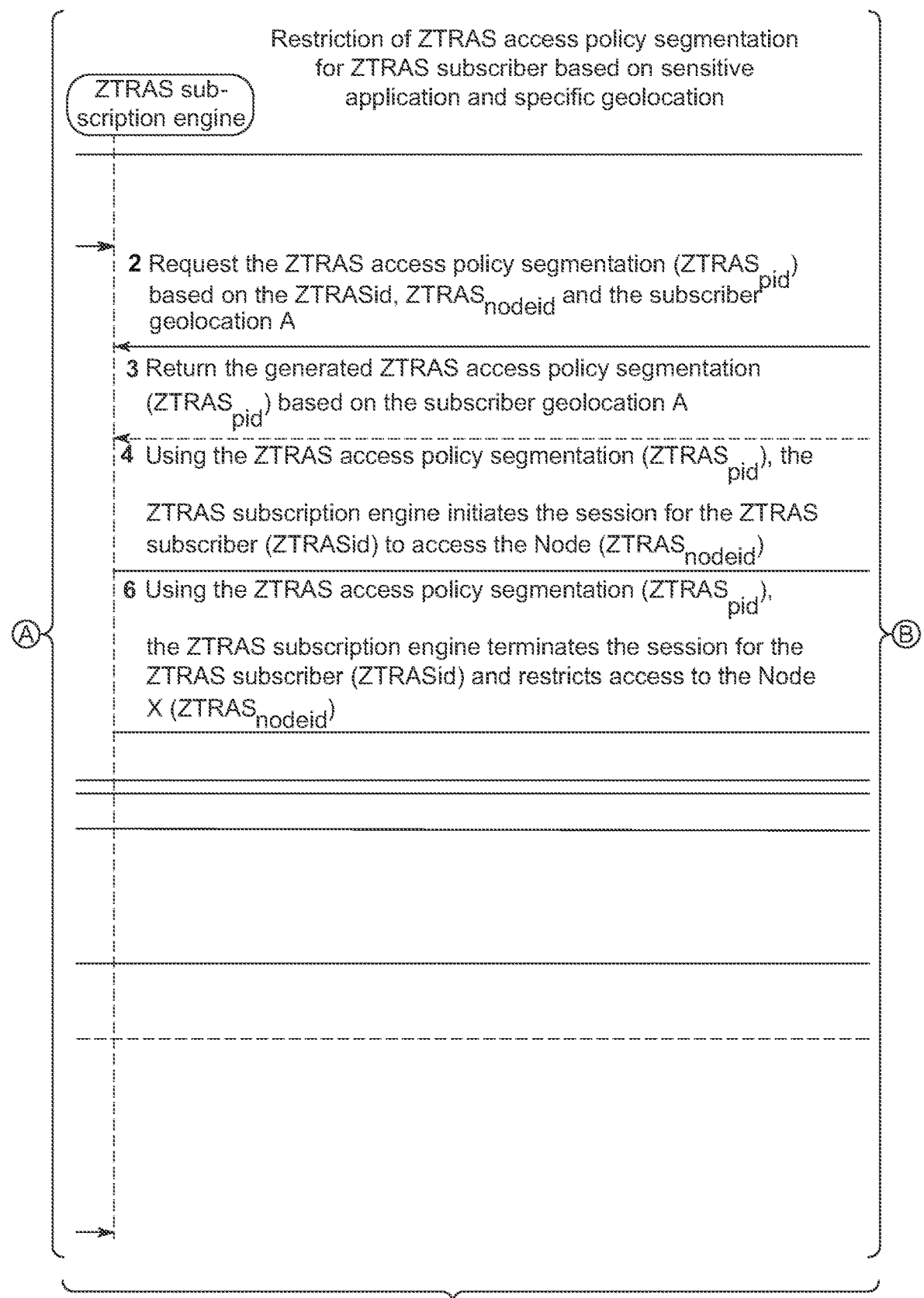
Figure 5:
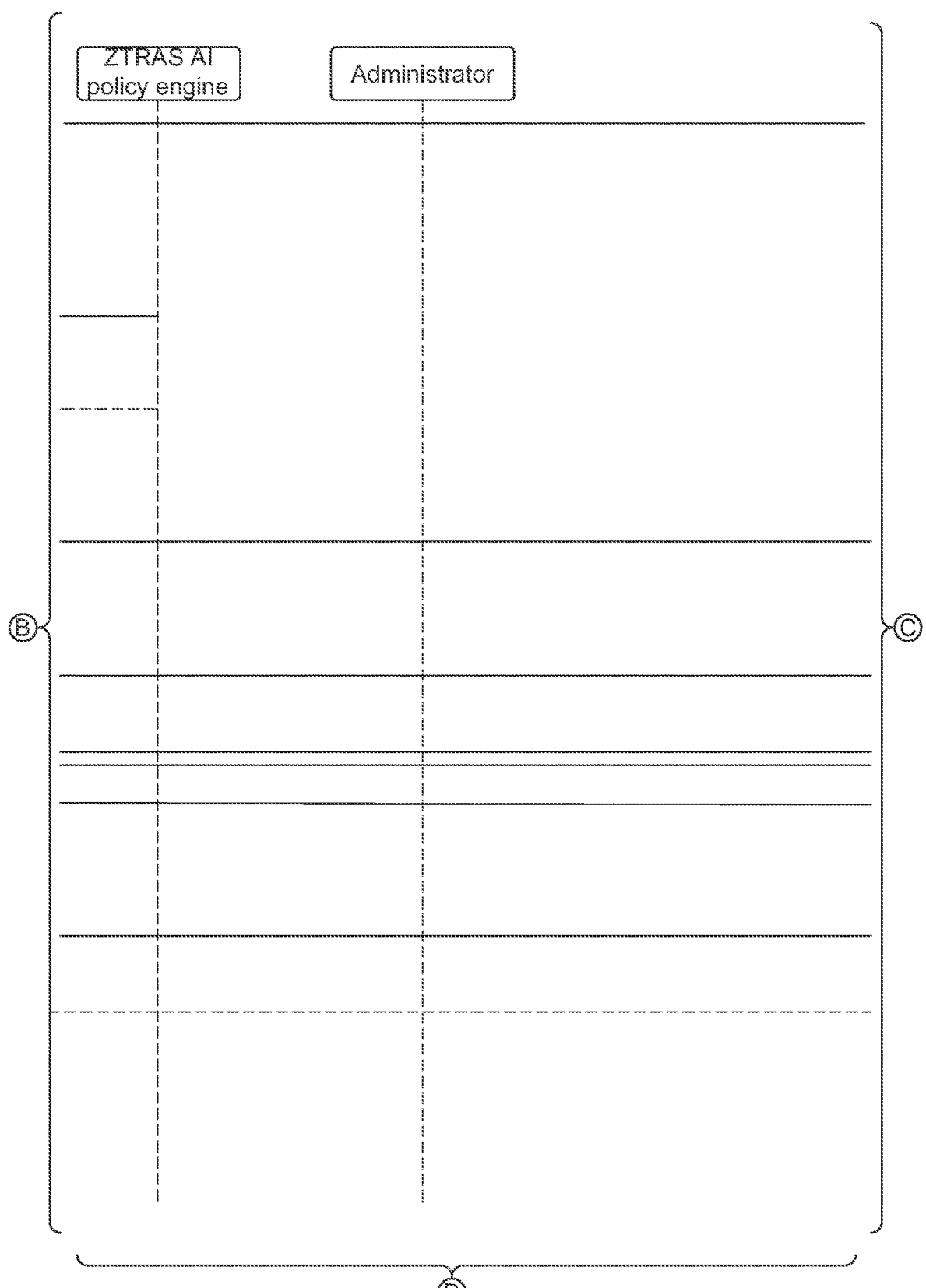
Figure 5:
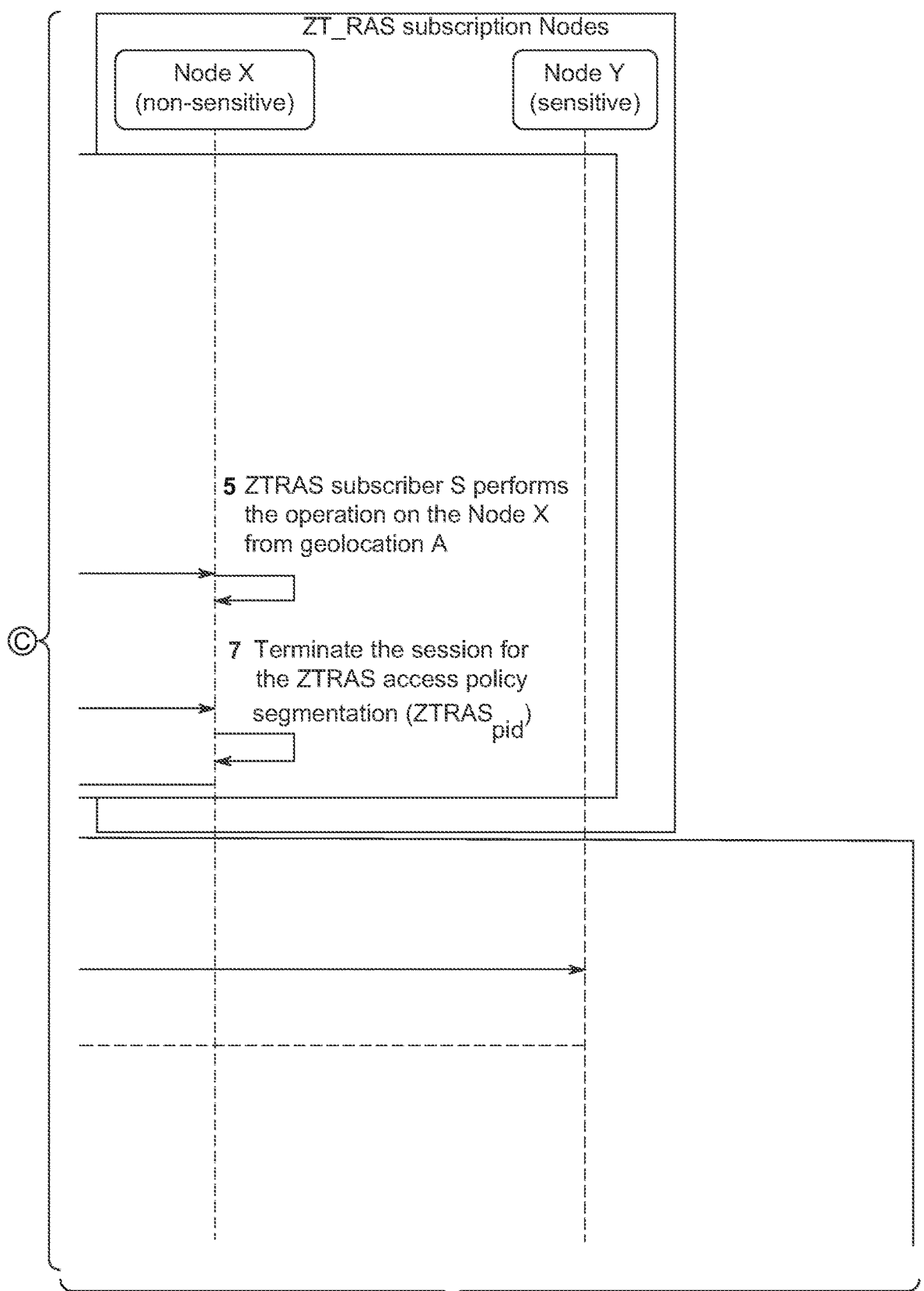
Figure 5:
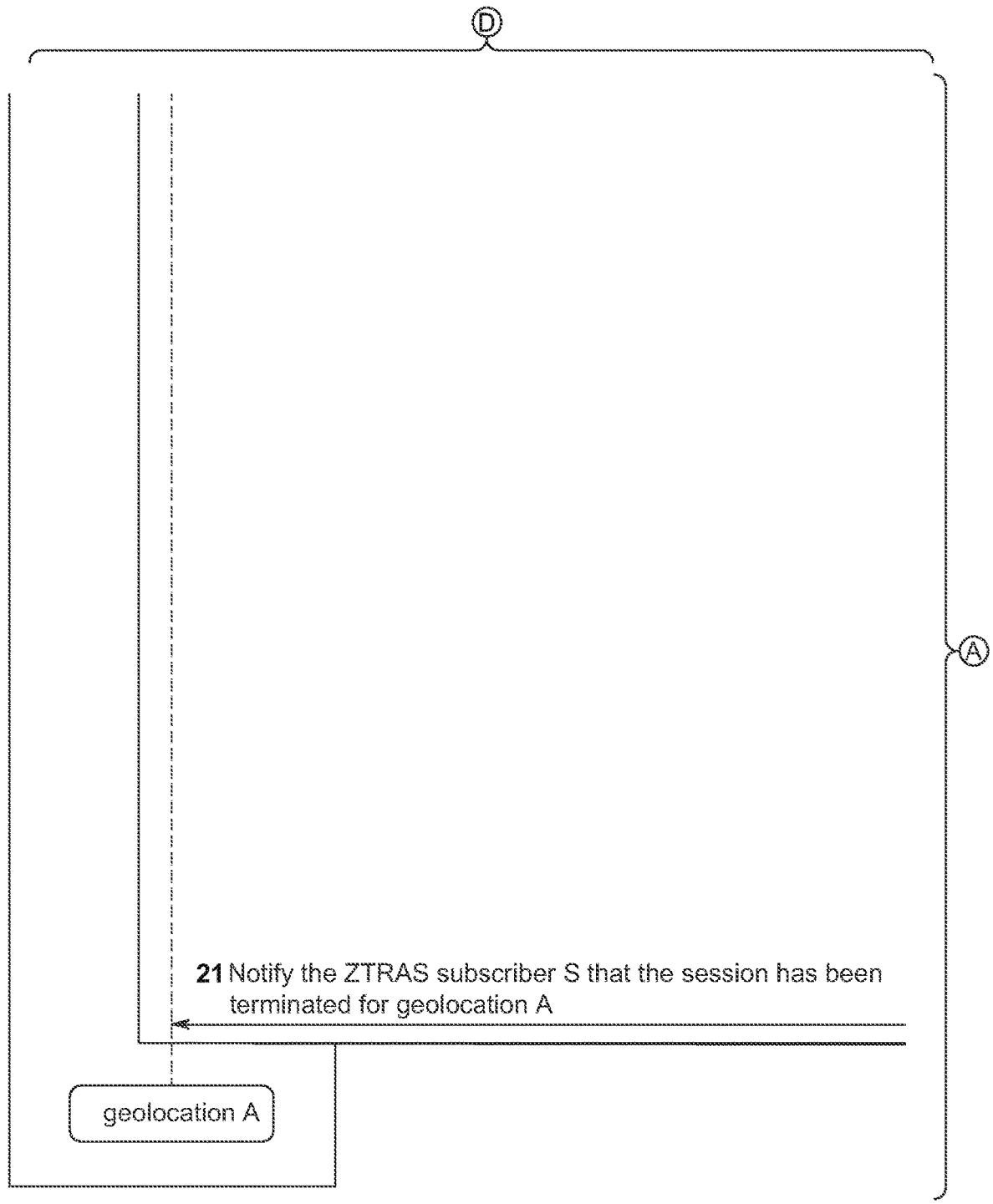
Figure 5:
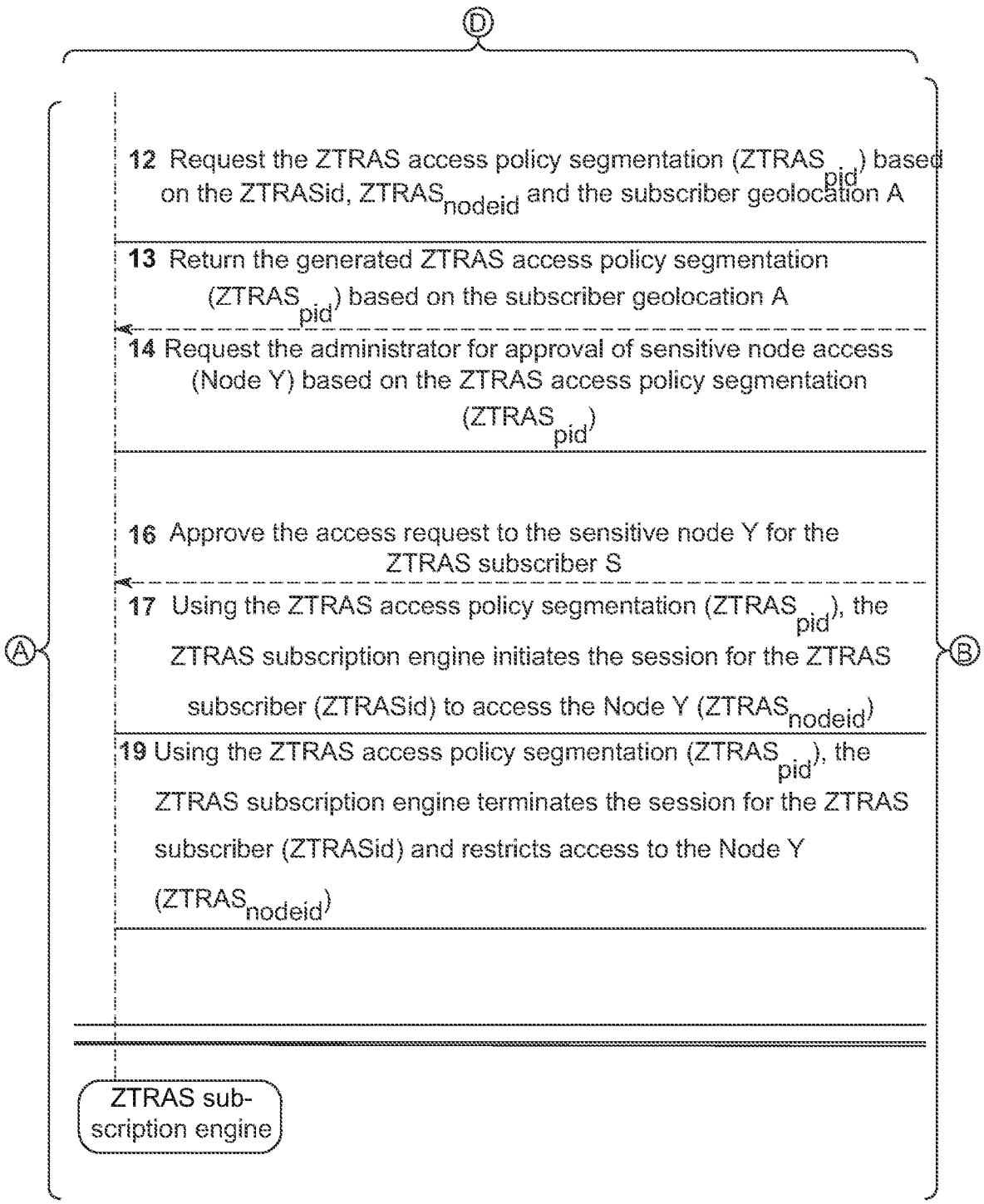
Figure 5:
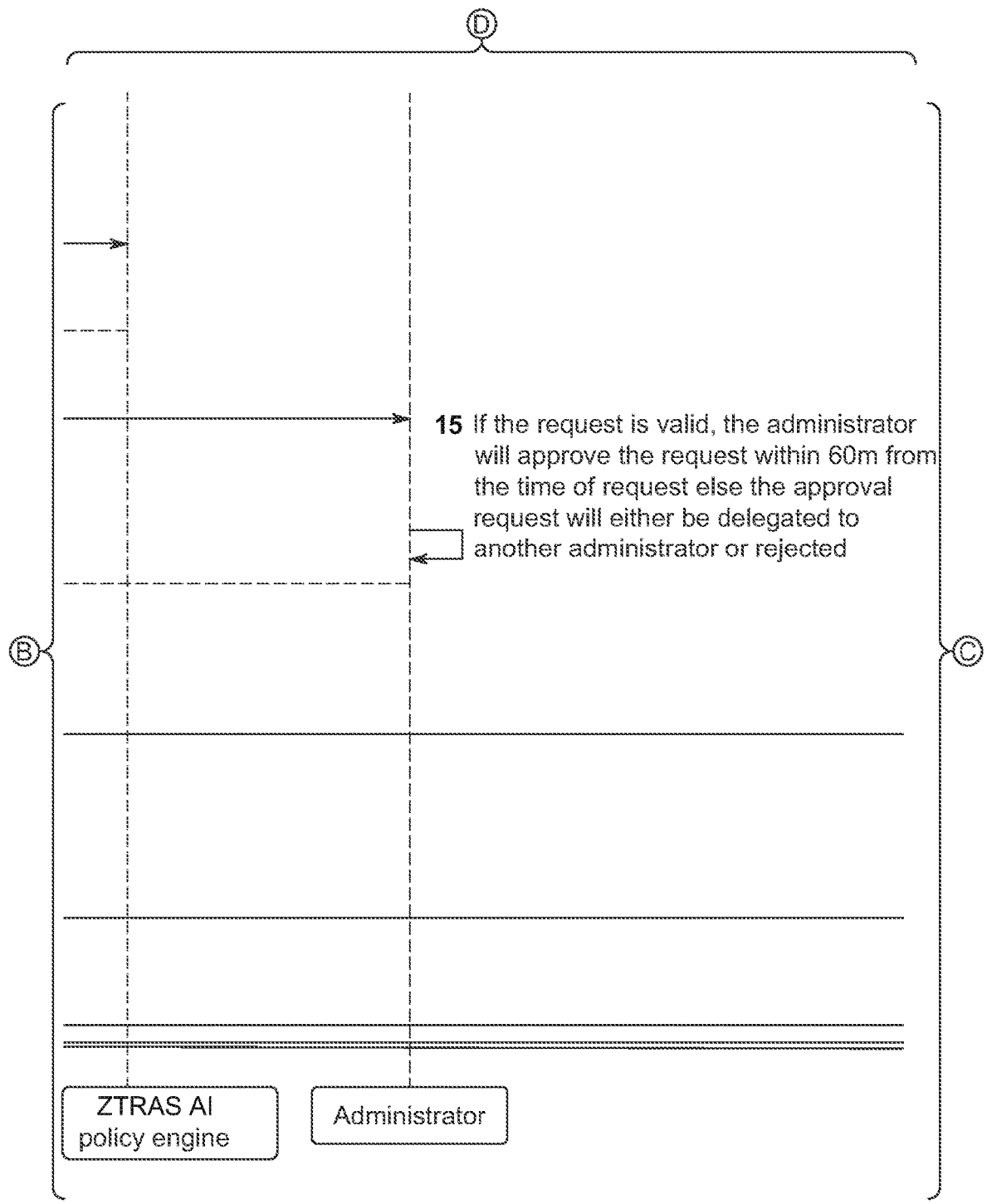
Figure 5:
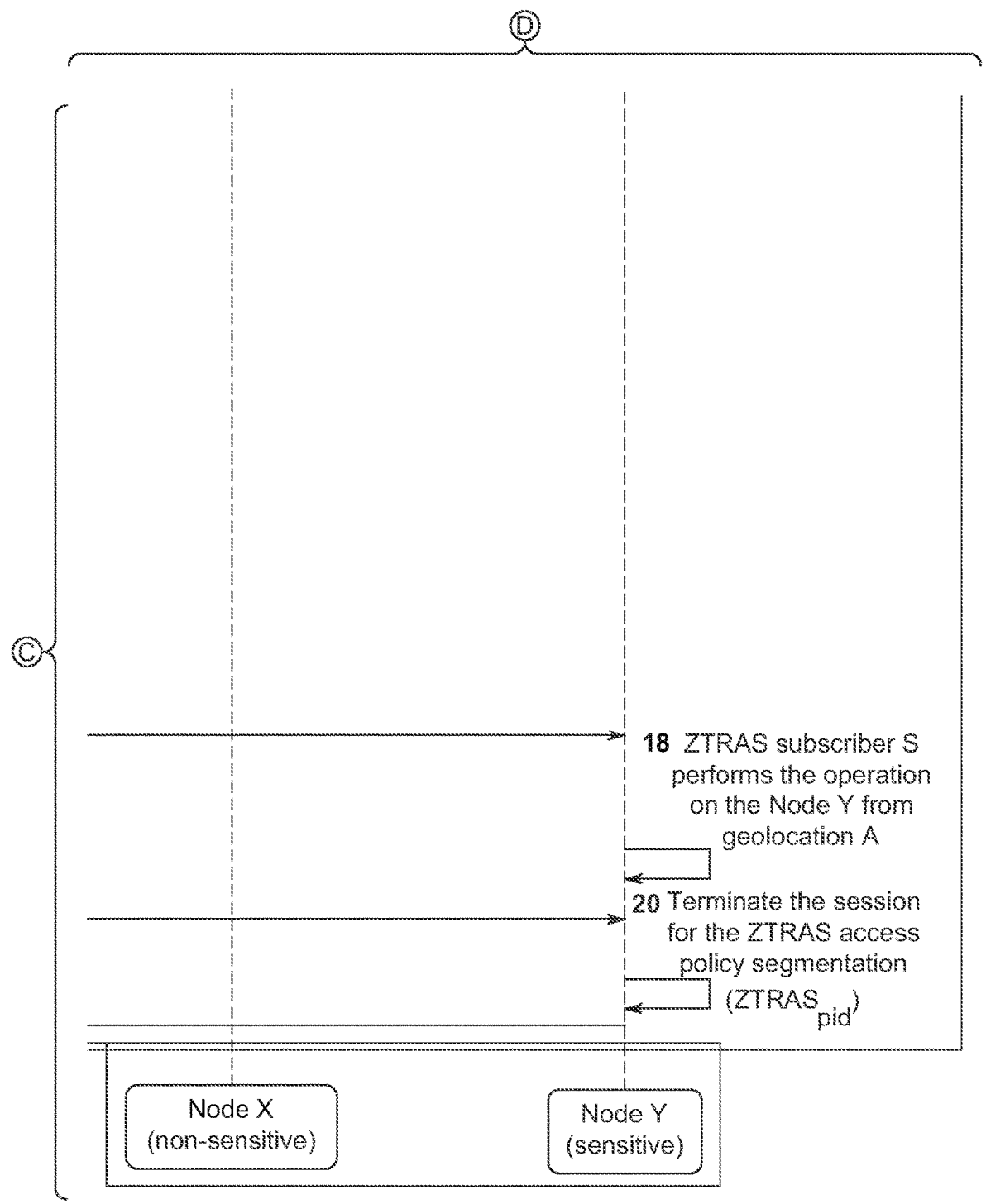

Use Case 1.2: Restriction of ZTRAS Access Policy Segmentation for ZTRAS Subscriber Based on Sensitive Application and Specific Geolocation FIG. 5 illustrates a call flow for restriction of ZTRAS access policy segmentation for a ZTRAS subscriber based on sensitive application, according to an embodiment. In the example of FIG. 5, the assumptions from Use Case 1 are applicable. In addition, the ZTRAS subscriber is assumed to be from geolocation A and requests to access a sensitive target node Y inside the cloud-based telecommunication network. In one or more embodiments, a node is classified as sensitive or non-sensitive based on the sensitivity of data or service provided by the node. To this end, during the onboarding or enrollment of the node to the system, the node may be classified as sensitive or non-sensitive by, for example, an administrator.

Referring to FIG. 5, steps (1) through (8) in the call flow thereof correspond to steps (1) through (8), respectively, in the call flow of FIG. 3. Thus, the redundant descriptions thereof are omitted below.

At (9), using the existing ZTRAS access policy segmentation ($ZTRAS_{pid}$), the ZTRAS subscriber S initiates an access request to the sensitive Node Y from geolocation A.

At (10), the access request is rejected due to invalid ZTRAS access policy segmentation ($ZTRAS_{pid}$). For example, the ZTRAS subscription engine may receive the access request at step (9) and may determine that the access policy segmentation is invalid due to a mismatch between the $ZTRAS_{nodeid}$ included in or associated with the access policy segmentation and the $ZTRAS_{nodeid}$ of the requested target Node Y.

At (11), based on the denial of access for Node Y, the ZTRAS subscriber S requests a new access policy segmentation ($ZTRAS_{pid}$) from geolocation A to the ZTRAS subscription engine.

At (12), the ZTRAS subscription engine requests the ZTRAS AI policy engine for a new ZTRAS access policy segmentation ($ZTRAS_{pid}$) based on the $ZTRAS_{id}$, $ZTRAS_{nodeid}$ and the subscriber geolocation A.

At (13), the ZTRAS AI policy engine returns the generated ZTRAS access policy segmentation ($ZTRAS_{pid}$) based on the subscriber geolocation A.

At (14), the ZTRAS subscription engine requests the administrator for approval of sensitive node access (Node Y) based on the ZTRAS access policy segmentation ($ZTRAS_{pid}$). That is, based on the Node Y being a sensitive node, the ZTRAS subscription engine requests administrator approval for access to that node.

At (15), if the request is valid, the administrator will approve the request within a predetermined time period (e.g., 60 minutes) from the time of request. Otherwise, the approval request will either be delegated to another administrator or rejected.

At (16), the administrator approves the access request to the sensitive Node Y for the ZTRAS subscriber S.

At (17), using the ZTRAS access policy segmentation ($ZTRAS_{pid}$), the ZTRAS subscription engine initiates the session for the ZTRAS subscriber ($ZTRAS_{id}$) to access the sensitive Node Y ($ZTRAS_{nodeid}$).

At (18), the ZTRAS subscriber S performs an operation on the sensitive Node Y from geolocation A.

At (19), using the ZTRAS access policy segmentation ($ZTRAS_{pid}$), the ZTRAS subscription engine terminates the session for the ZTRAS subscriber ($ZTRAS_{id}$) and restricts access to the sensitive Node Y ($ZTRAS_{nodeid}$).

At (20), the session for the ZTRAS access policy segmentation ($ZTRAS_{pid}$) is terminated on Node Y.

At (21), the Node Y notifies the ZTRAS subscriber S that the session has been terminated for geolocation A.

Use Case 2: Generation of $ZTRAS_{pid}$ access policy segmentation

Figure 6:
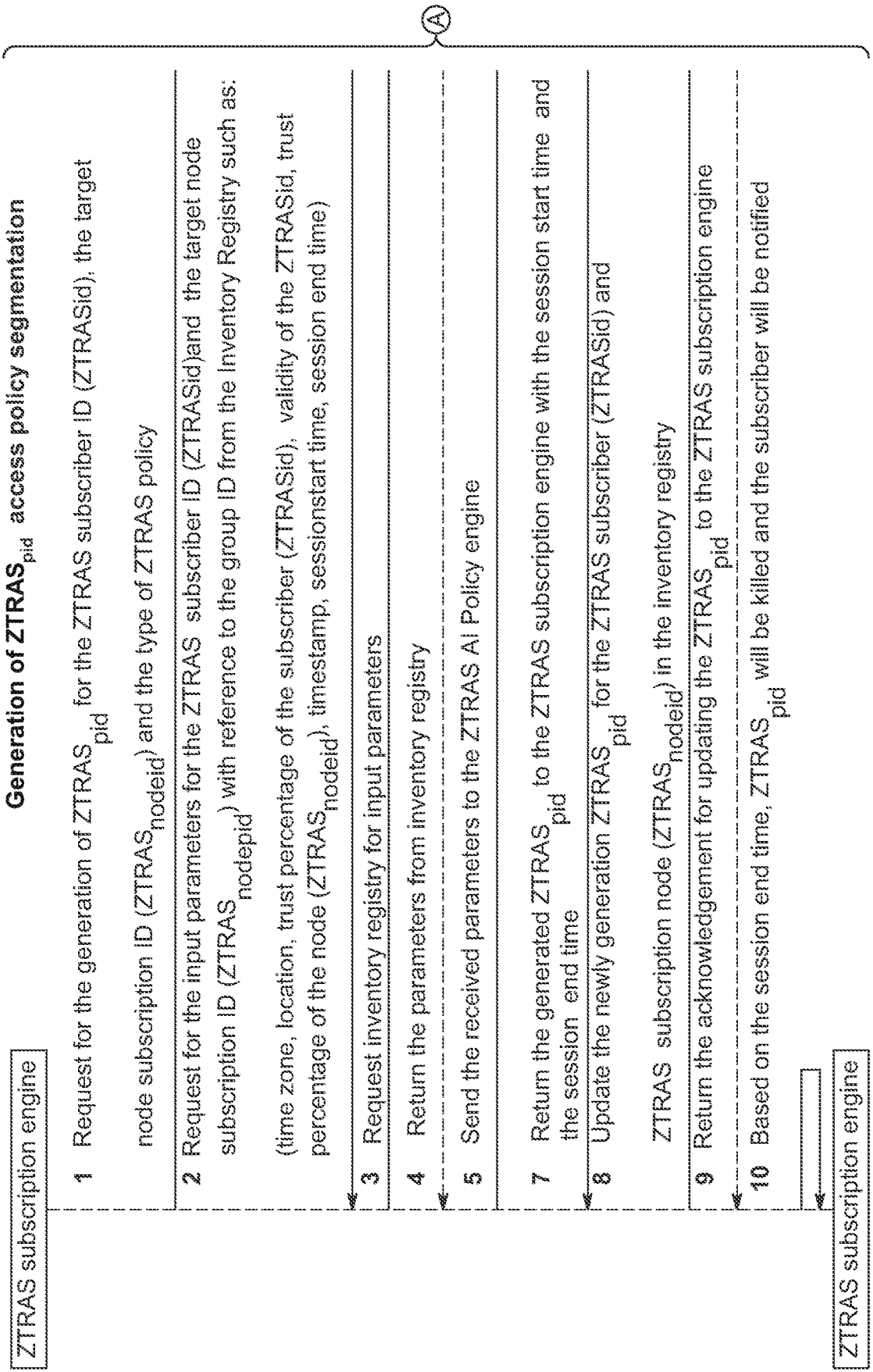
FIG. 6 illustrates a call flow for generation of $ZTRAS_{pid}$ access policy segmentation, according to an embodiment.
Figure 6:
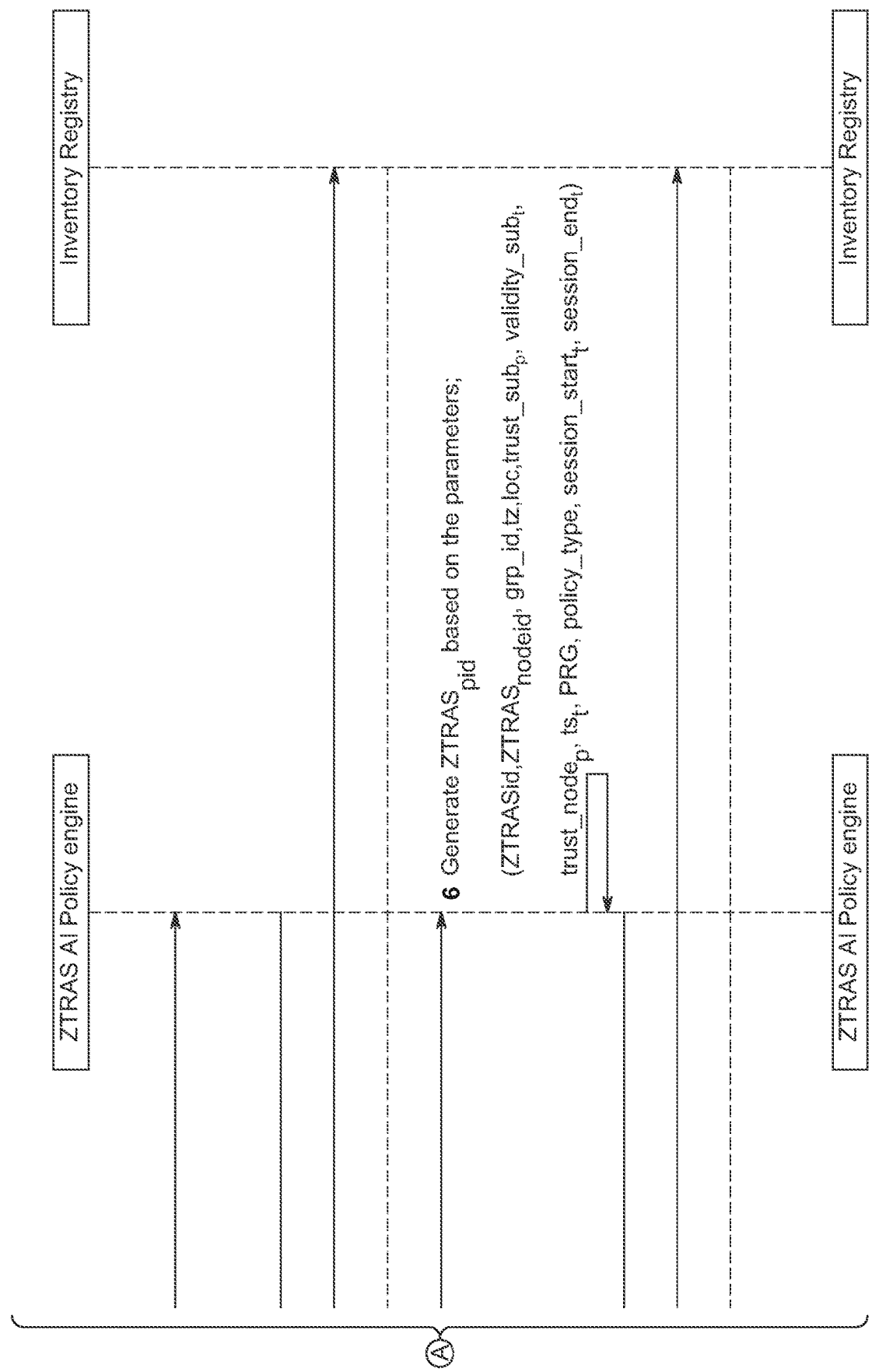

FIG. 6 illustrates a call flow for generation of $ZTRAS_{pid}$ access policy segmentation, according to an embodiment. In the example of FIG. 6, the inventory registry provides information about the target node $ZTRAS_{nodeid}$ with reference to a group ID (grp_id) such as at least one of time zone (tz), location (loc), trust percentage of the subscriber ($ZTRAS_{id}$) (trust_subp), validity of the $ZTRAS_{id}$ (validity_subt), trust percentage of the node ($ZTRAS_{nodeid}$) (trust_nodep), timestamp (tst), session start time (session_startt), session end time (session_endt), etc. By using a group ID or node group in accordance with one or more embodiments, the same policy (e.g., policy type, policy validity period, etc.) may be applied in bulk. Further, $ZTRAS_{pid}$ is a unique policy identifier that binds a ZTRAS subscriber ($ZTRAS_{id}$) with a target node ($ZTRAS_{nodeid}$) within the cloud-based telecommunication network.

Referring to FIG. 6, at (1), the ZTRAS subscription engine requests the ZTRAS AI policy engine for the generation of $ZTRAS_{pid}$ for the ZTRAS subscriber ID ($ZTRAS_{id}$), the target node subscription ID ($ZTRAS_{nodeid}$) and the type of ZTRAS policy.

At (2), the ZTRAS AI policy engine requests the ZTRAS subscription engine for the input parameters for the ZTRAS subscriber ID ($ZTRAS_{id}$) and the target node subscription ID ($ZTRAS_{nodeid}$) with reference to a group ID from the Inventory Registry such as at least one of time zone, location, trust percentage of the subscriber ($ZTRAS_{id}$), validity of the $ZTRAS_{id}$ (validity_subt), trust percentage of the node ($ZTRAS_{nodeid}$), timestamp, session start time, session end time, etc.

At (3), the ZTRAS subscription engine requests the inventory registry for the input parameters. For example, the request may include the ZTRAS subscriber ID ($ZTRAS_{id}$) and the target node subscription ID ($ZTRAS_{nodeid}$).

At (4), the inventory registry returns the requested parameters to the ZTRAS subscription engine.

At (5), the ZTRAS subscription engine sends the received parameters to the ZTRAS AI policy engine.

At (6), the ZTRAS AI policy engine generates a new $ZTRAS_{pid}$ based on the parameters. For example, the parameters may include at least one of $ZTRAS_{id}$, $ZTRAS_{nodeid}$, grp_id, tz, loc, trust_subp, validity_subt, trust_nodep, tst, pseudo-random number generator (PRNG), policy_type, session_startt, session_endt. The policy id itself may be a concatenation of some or all of the parameters. Further, the policy id or one or more of the parameters (e.g., group id (grp_id), policy_type, etc.) may be mapped to a particular access policy definition (e.g., pre-configured in the or looked up from a central database or inventory registry).

At (7), the ZTRAS AI policy engine returns the generated $ZTRAS_{pid}$ to the ZTRAS subscription engine with the session start time and the session end time.

At (8), the ZTRAS subscription engine updates the newly generated $ZTRAS_{pid}$ for the ZTRAS subscriber ($ZTRAS_{id}$) and ZTRAS subscription node ($ZTRAS_{nodeid}$) in the inventory registry.

At (9), the inventory registry returns an acknowledgement for updating the $ZTRAS_{pid}$ to the ZTRAS subscription engine.

At (10), based on the session end time, $ZTRAS_{pid}$ will be killed or terminated by the ZTRAS subscription engine and the subscriber will be notified.

Use Case 3: Prevention of Vulnerabilities Using ZTRAS Access Policy Segmentation ($ZTRAS_{pid}$)

Figure 7:
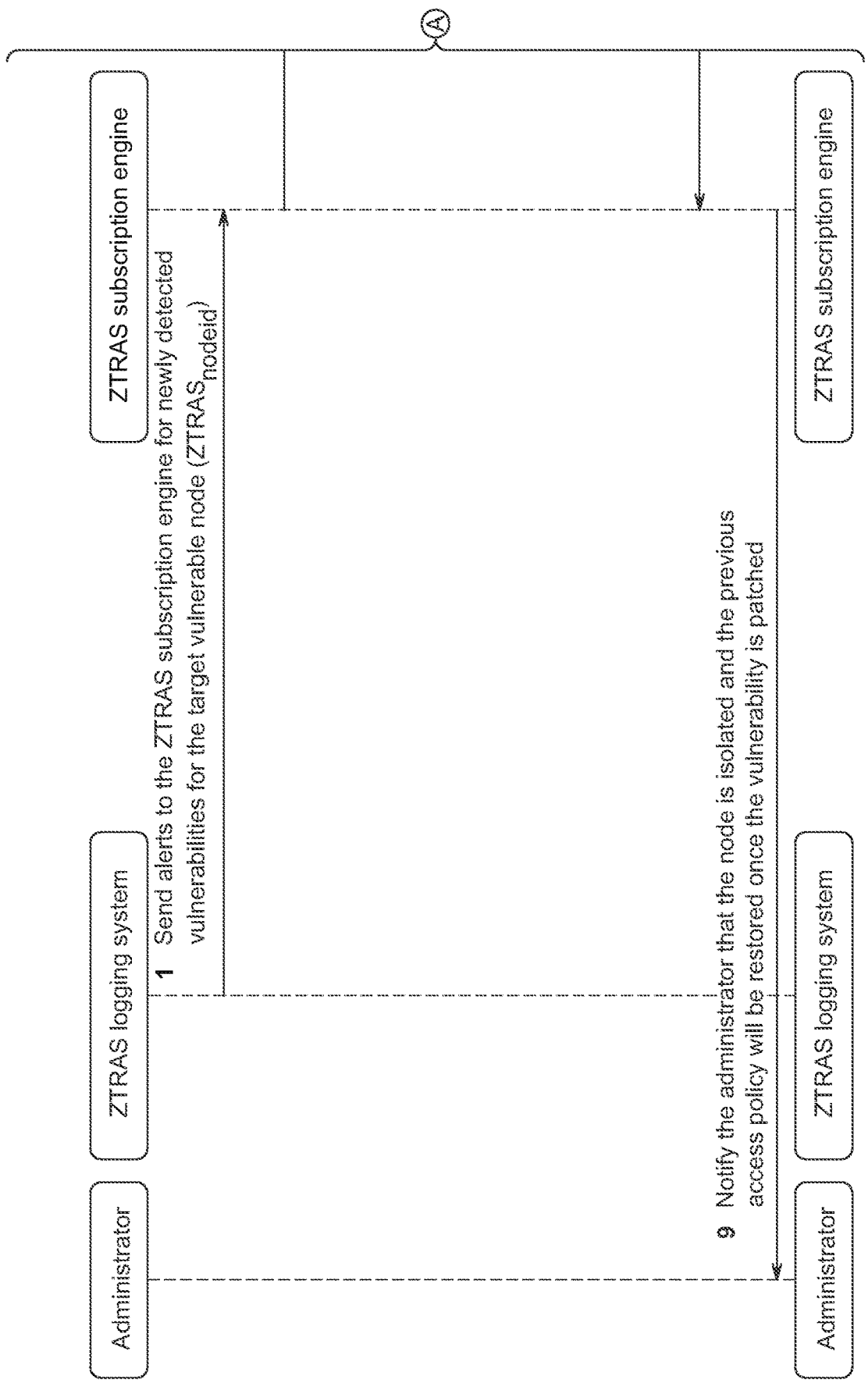
FIG. 7 illustrates a call flow for prevention of vulnerabilities using ZTRAS access policy segmentation ($ZTRAS_{pid}$), according to an embodiment.
Figure 7:
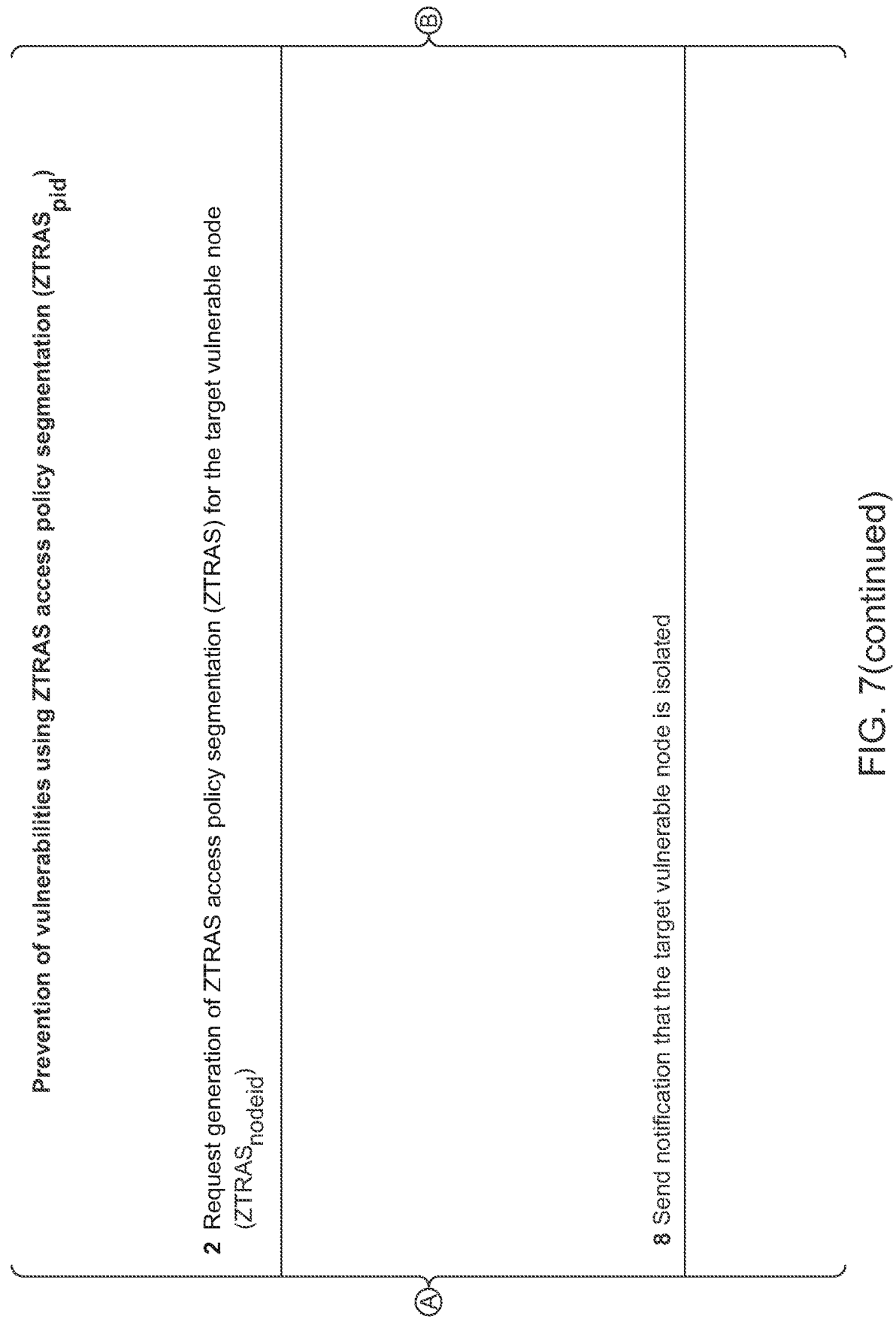
Figure 7:
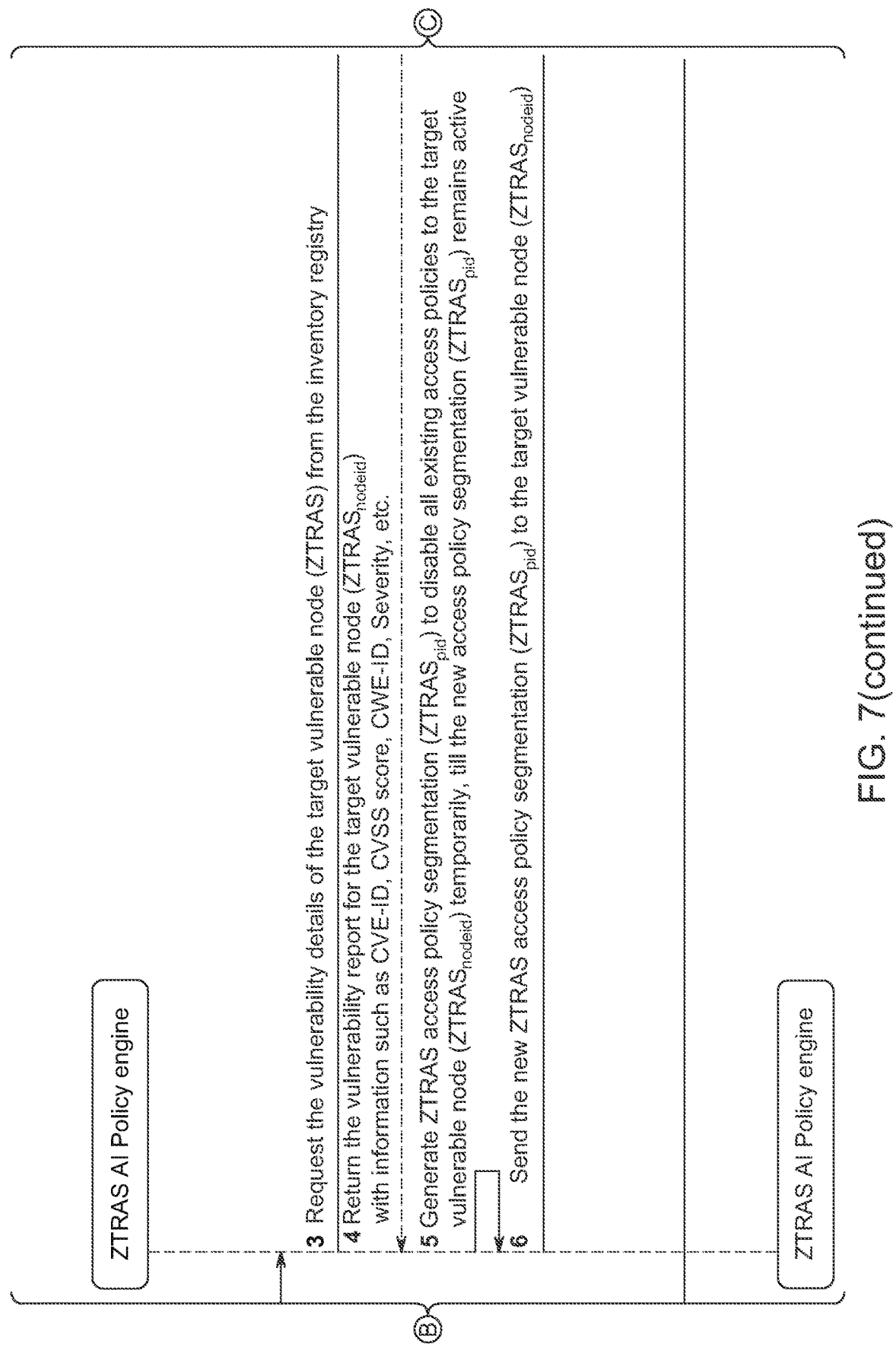

FIG. 7 illustrates a call flow for prevention of vulnerabilities using ZTRAS access policy segmentation ($ZTRAS_{pid}$), according to an embodiment. In the example of FIG. 7, the inventory registry provides the information about the vulnerability such as Common Vulnerabilities and Exposures (CVE) ID, Common Vulnerability Scoring System (CVSS) score, Severity, Common Weakness Enumeration (CWE) ID, Severity, etc., based on the ZTRAS nodeid.

Referring to FIG. 7, at (1), the ZTRAS logging system sends alerts to the ZTRAS subscription engine for newly detected vulnerabilities for the vulnerable target node ($ZTRAS_{nodeid}$).

At (2), the ZTRAS subscription engine requests the ZTRAS AI policy engine for generation of new ZTRAS access policy segmentation ($ZTRAS_{pid}$) for the vulnerable target node ($ZTRAS_{nodeid}$).

At (3), the ZTRAS AI policy engine requests the vulnerability details of the vulnerable target node ($ZTRAS_{nodeid}$) from the inventory registry.

At (4), the inventory registry returns the vulnerability report for the vulnerable target node ($ZTRAS_{nodeid}$) with information such as CVE-ID, CVSS score, CWE-ID, Severity, etc., to the ZTRAS AI policy engine.

At (5), the ZTRAS AI policy engine generates a new ZTRAS access policy segmentation ($ZTRAS_{pid}$) to disable all existing access policies to the vulnerable target node ($ZTRAS_{nodeid}$) temporarily, while the new access policy segmentation ($ZTRAS_{pid}$) remains active.

At (6), the ZTRAS AI policy engine sends the new ZTRAS access policy segmentation ($ZTRAS_{pid}$) to the vulnerable target node ($ZTRAS_{nodeid}$). According to another embodiment, the ZTRAS AI policy engine sends the new ZTRAS access policy segmentation to the ZTRAS subscription engine instead of (or in addition to) the target node).

At (7), the vulnerable target node is isolated from the network by restricting all access, without any interruptions to the service by the new ZTRAS access policy segmentation ($ZTRAS_{pid}$). For example, the ZTRAS subscription engine may restrict all access based on the new ZTRAS access policy segmentation.

At (8), the vulnerable target node sends a notification to the ZTRAS subscription engine that the vulnerable target node is isolated.

At (9), the ZTRAS subscription engine notifies the administrator that the node is isolated, and the previous access policy will be restored once the vulnerability is patched.

Use Case 4: Provisioning of Access for Administrative Change Management Using ZTRAS Access Policy Segmentation ($ZTRAS_{pid}$)

Figure 8:
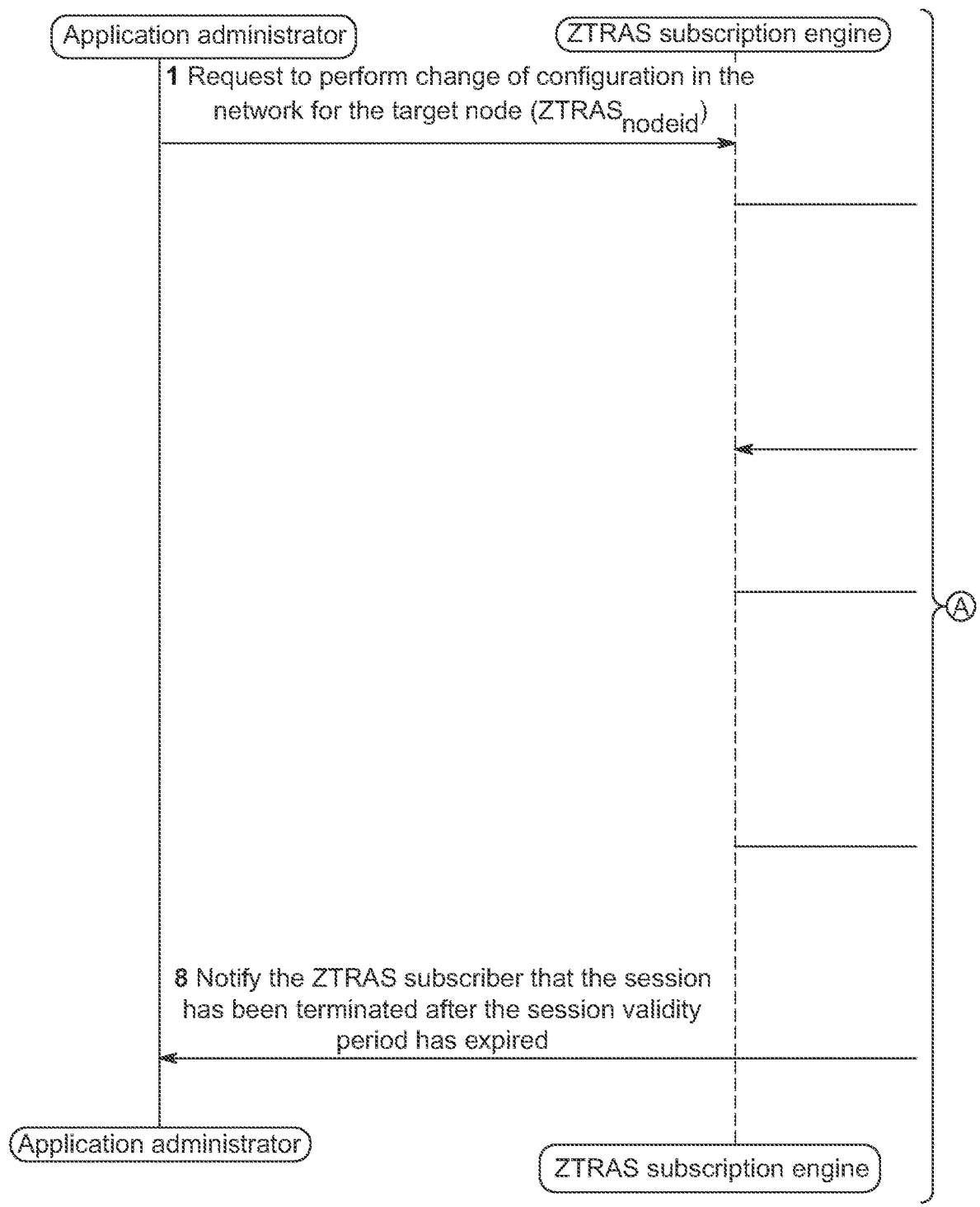
FIG. 8 illustrates a call flow for provisioning of access for administrative change management using ZTRAS access policy segmentation ($ZTRAS_{pid}$), according to an embodiment.
Figure 8:
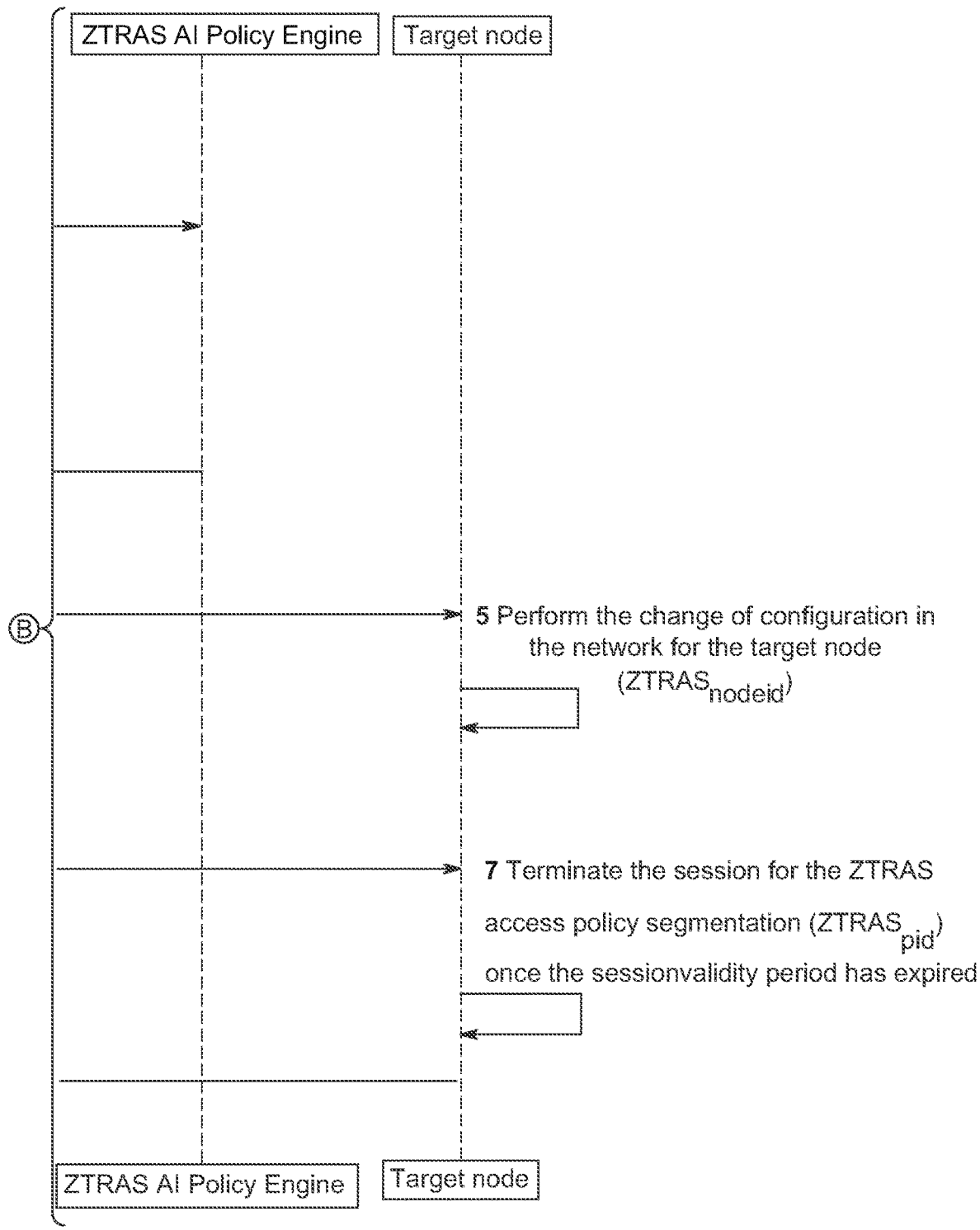

FIG. 8 illustrates a call flow for provisioning of access for administrative change management using ZTRAS access policy segmentation ($ZTRAS_{pid}$), according to an embodiment. In the present embodiment, a specific policy is provisioned for allowing administrative changes by an administrator.

Referring to FIG. 8, at (1), an application administrator requests to perform a change of configuration in the network for the target node ($ZTRAS_{nodeid}$).

At (2), the ZTRAS subscription engine requests creation of ZTRAS access policy segmentation ($ZTRAS_{pid}$) to the ZTRAS AI policy engine.

At (3), the ZTRAS AI policy engine returns, to the ZTRAS subscription engine, the ZTRAS access policy segmentation ($ZTRAS_{pid}$) based on the $ZTRAS_{id}$ and $ZTRAS_{nodeid}$ with session validity period (session start time and session end time) based on the type of change request. Here, a configuration, updating, etc., of a target node may require an extended validity period. Accordingly, various validity periods may be set based on the type of change request, e.g., two hours if the change request type is configuration change, six hours if the change request type is migration, twelve hours if the change request type is upgrade, etc.

At (4), using the ZTRAS access policy segmentation ($ZTRAS_{pid}$), the ZTRAS subscription engine initiates the session for the ZTRAS subscriber ($ZTRAS_{id}$) to access the target node ($ZTRAS_{nodeid}$).

At (5), the ZTRAS subscriber performs the change of configuration in the network for the target node ($ZTRAS_{nodeid}$).

At (6), using the ZTRAS access policy segmentation ($ZTRAS_{pid}$), the ZTRAS subscription engine terminates the session for the ZTRAS subscriber ($ZTRAS_{id}$) and restricts access to the target node ($ZTRAS_{nodeid}$).

At (7), the session for the ZTRAS access policy segmentation ($ZTRAS_{pid}$) is terminated once the session validity period has expired.

At (8), the target node notifies the ZTRAS subscriber that the session has been terminated after the session validity period has expired.

Figure 9:
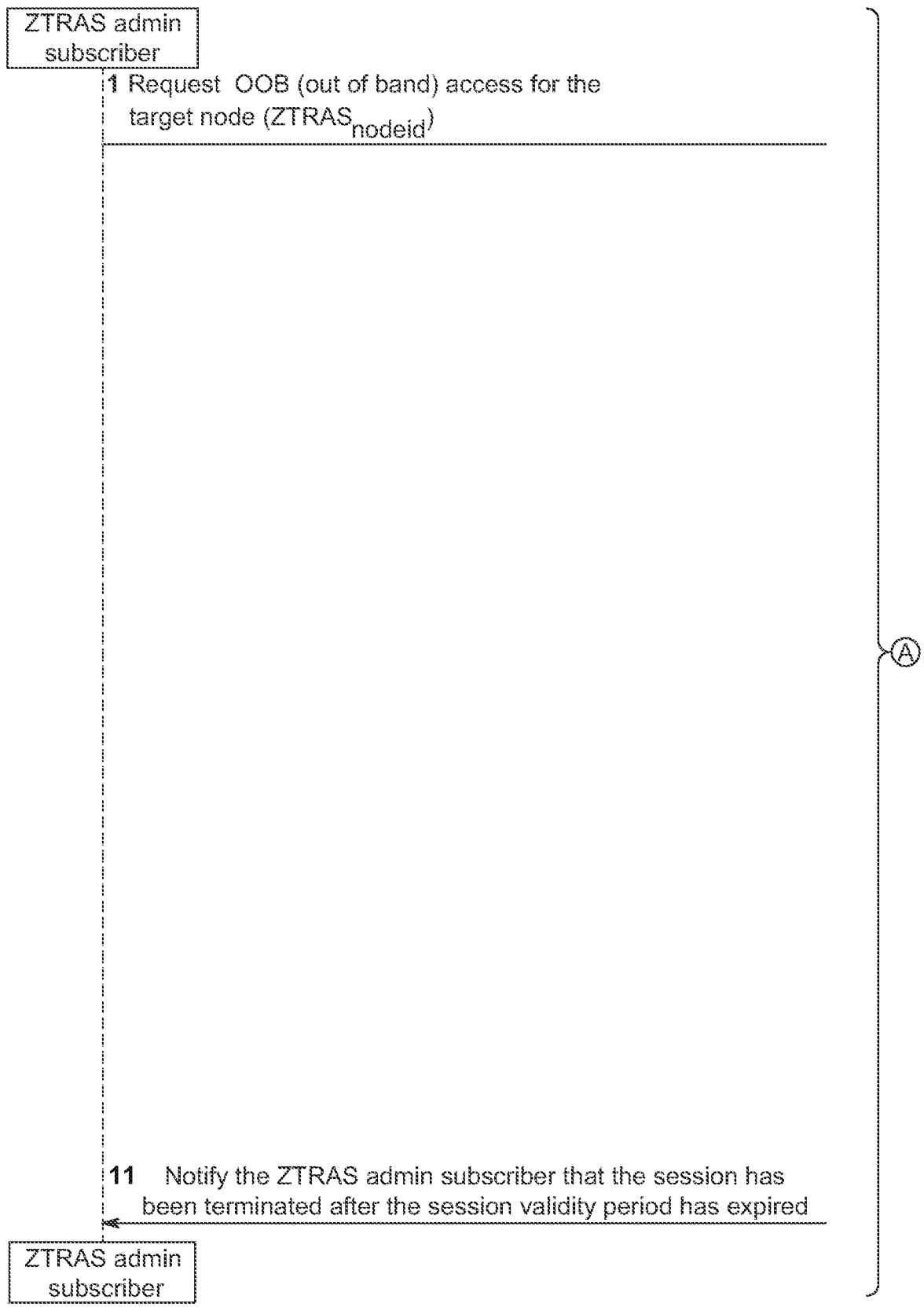
FIG. 9 illustrates a call flow for provisioning of out of band (OOB) access using ZTRAS access policy segmentation ($ZTRAS_{pid}$) for emergency use cases, according to an embodiment.
Figure 9:
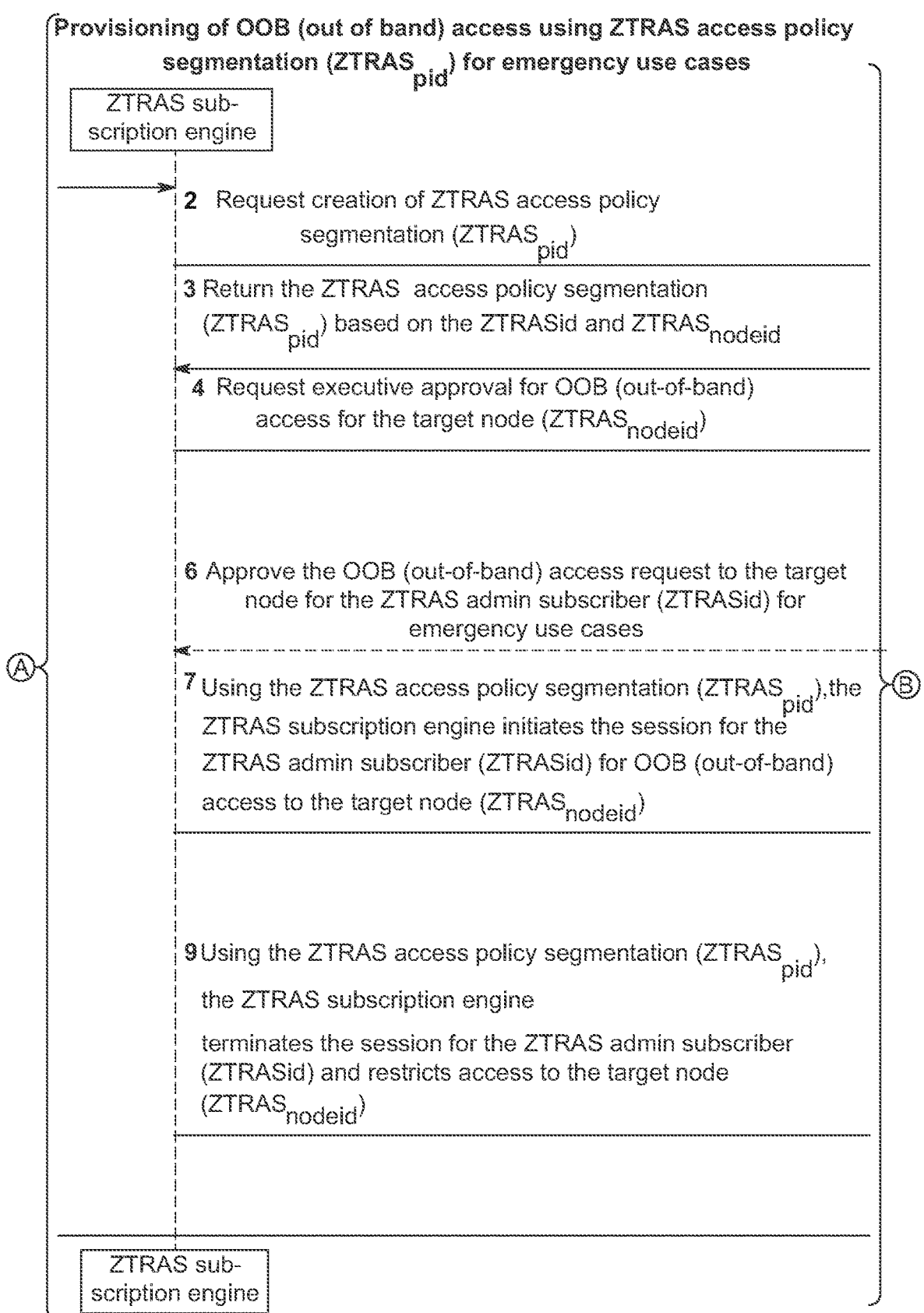
Figure 9:
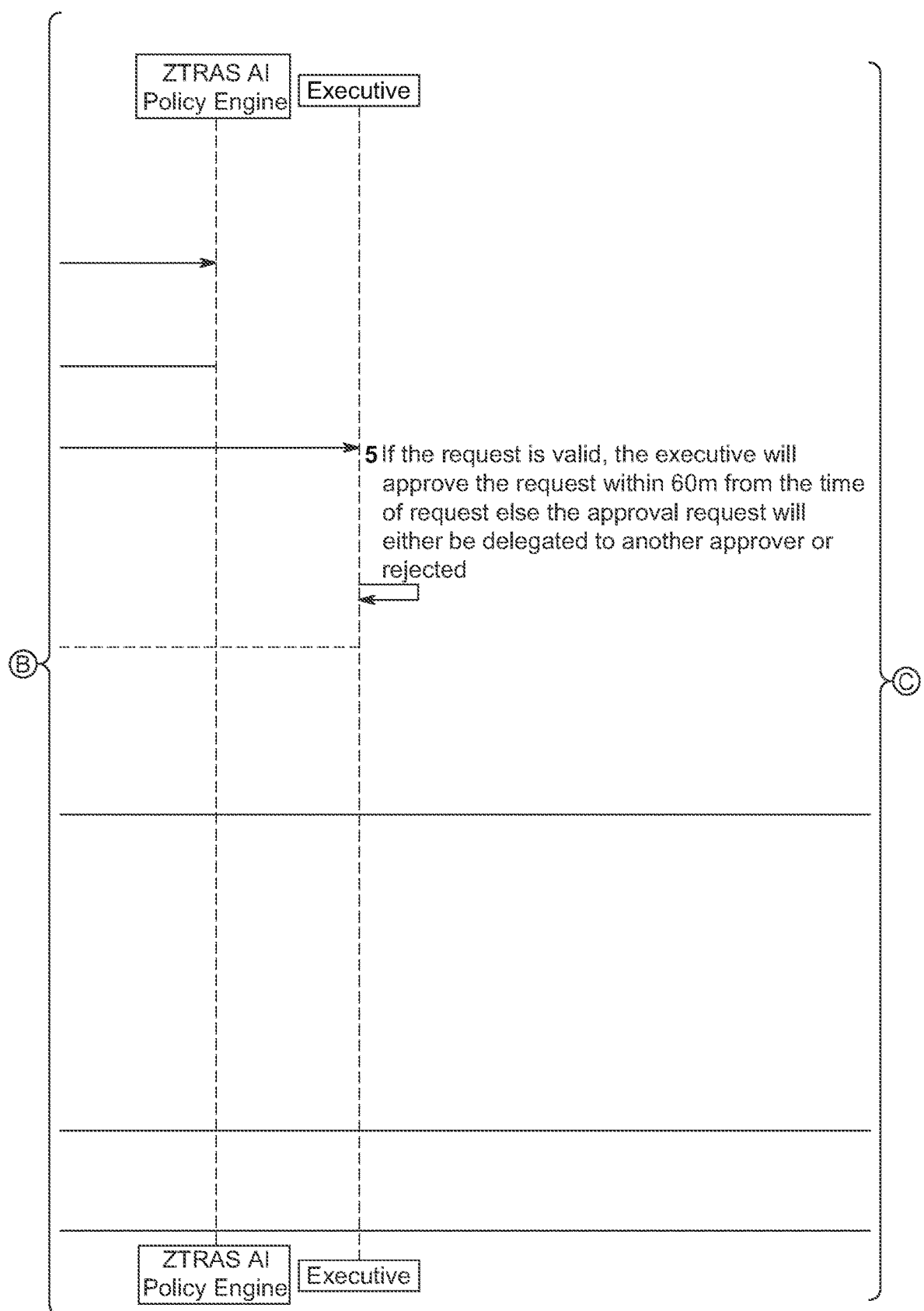
Figure 9:
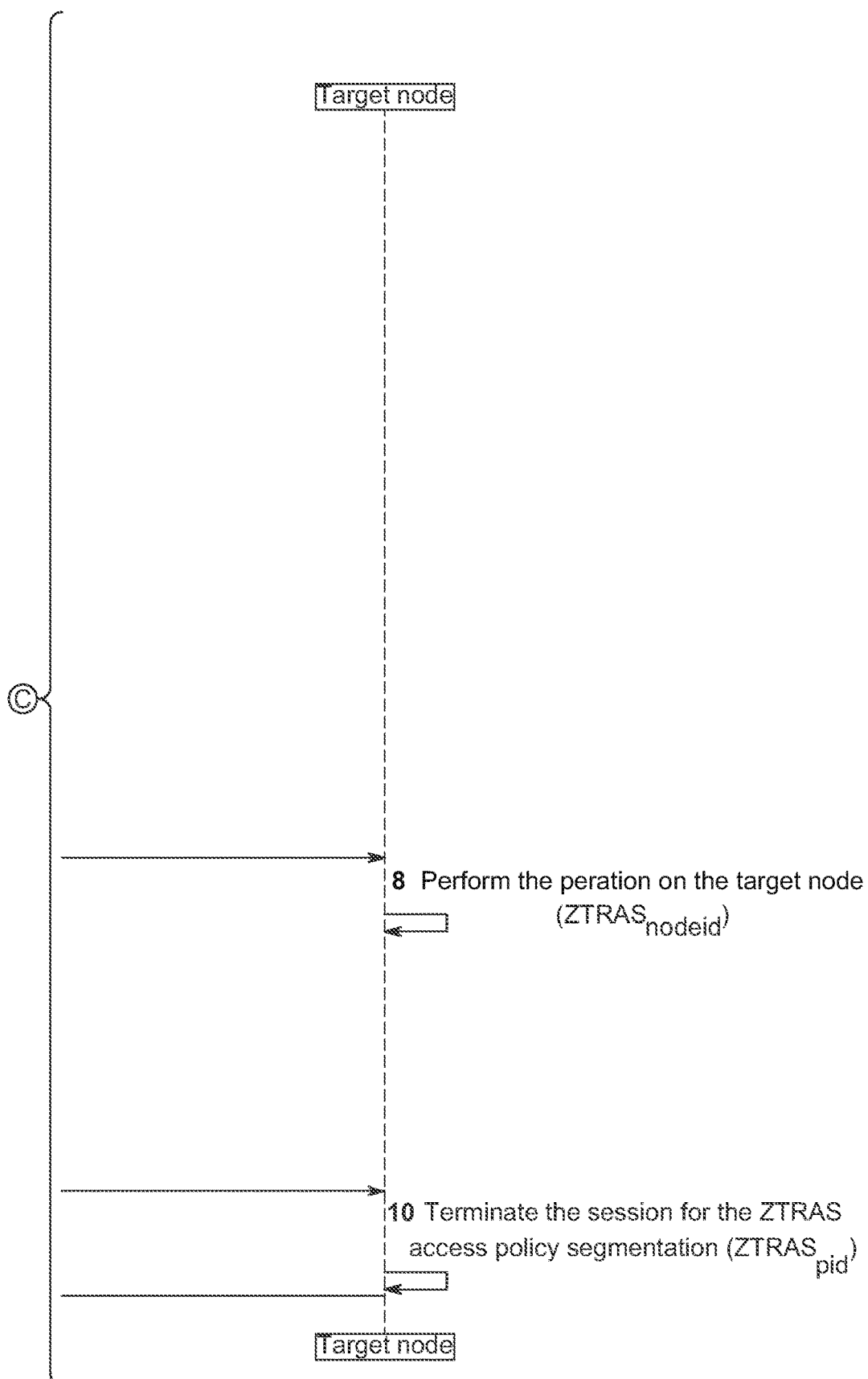

Use Case 5: Provisioning of Out of Band (OOB) Access Using ZTRAS Access Policy Segmentation ($ZTRAS_{pid}$) for Emergency Use Cases FIG. 9 illustrates a call flow for provisioning of out of band (OOB) access using ZTRAS access policy segmentation ($ZTRAS_{pid}$) for emergency use cases, according to an embodiment. In the example of FIG. 9, a ZTRAS admin subscriber may be understood as the ZTRAS subscriber authorized to receive OOB access to perform emergency changes in the network. Here, OOB access may refer to access to the network (e.g., cloud-based telecommunications network) using an interface that is outside or physically separated from the network. Further, an executive may be understood as members exercising the highest administrative or managerial authority in an organization, such as chief technology officer (CTO), chief information security office (CISO), etc.

Referring to FIG. 9, at (1), the ZTRAS admin subscriber requests OOB access for the target node ($ZTRAS_{nodeid}$) to the ZTRAS subscription engine. By way of example, in-band access may have previously failed.

At (2), the ZTRAS subscription engine requests the ZTRAS AI policy engine for the creation of ZTRAS access policy segmentation ($ZTRAS_{pid}$).

At (3), the ZTRAS AI policy engine returns the ZTRAS access policy segmentation ($ZTRAS_{pid}$) based on the $ZTRAS_{id}$ and $ZTRAS_{nodeid}$ to the ZTRAS subscription engine.

At (4), the ZTRAS subscription engine requests executive approval for OOB access for the target node ($ZTRAS_{nodeid}$).

At (5), if the request is valid, the executive will approve the request within a predetermined time period (e.g., 60 minutes) from the time of request. Otherwise, the approval request will either be delegated to another approver or rejected.

At (6), the executive approves the OOB access request to the target node for the ZTRAS admin subscriber ($ZTRAS_{id}$) for emergency use cases.

At (7), using the ZTRAS access policy segmentation ($ZTRAS_{pid}$), the ZTRAS subscription engine initiates the session for the ZTRAS admin subscriber ($ZTRAS_{id}$) for OOB access to the target node ($ZTRAS_{nodeid}$).

At (8), the ZTRAS admin subscriber performs an operation on the target node ($ZTRAS_{nodeid}$).

At (9), using the ZTRAS access policy segmentation ($ZTRAS_{pid}$), the ZTRAS subscription engine terminates the session for the ZTRAS admin subscriber ($ZTRAS_{id}$) and restricts OOB access to the target node ($ZTRAS_{nodeid}$).

At (10), the session for the ZTRAS access policy segmentation ($ZTRAS_{pid}$) is terminated by the target node.

At (11), the target node notifies the ZTRAS admin subscriber that the session has been terminated after the session validity period has expired.

Figure 10:
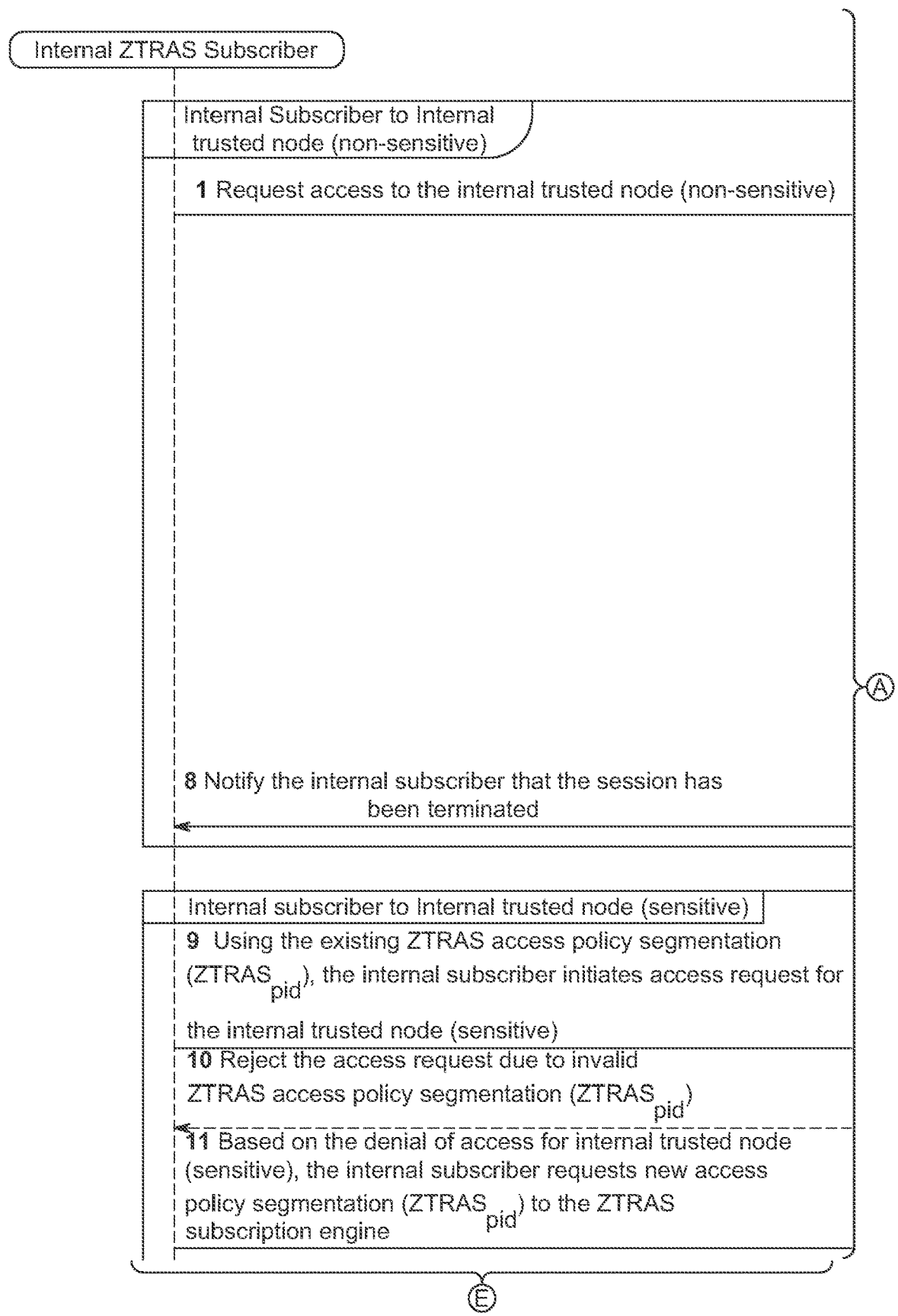
FIG. 10 illustrates a call flow for provisioning of sensitive and non-sensitive application or node access using ZTRAS access policy segmentation ($ZTRAS_{pid}$) for an internal ZTRAS subscriber, according to an embodiment.
Figure 10:
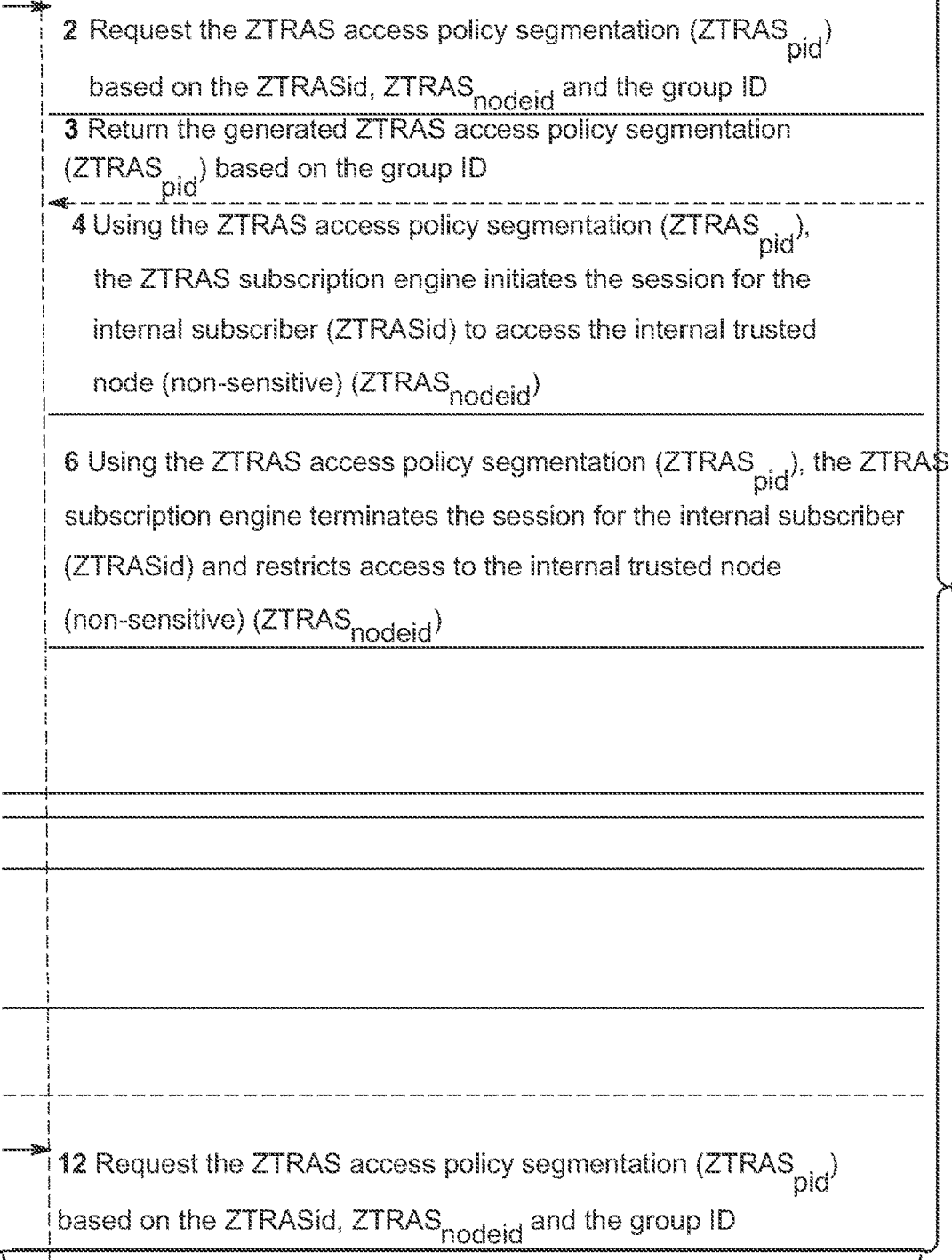
Figure 10:
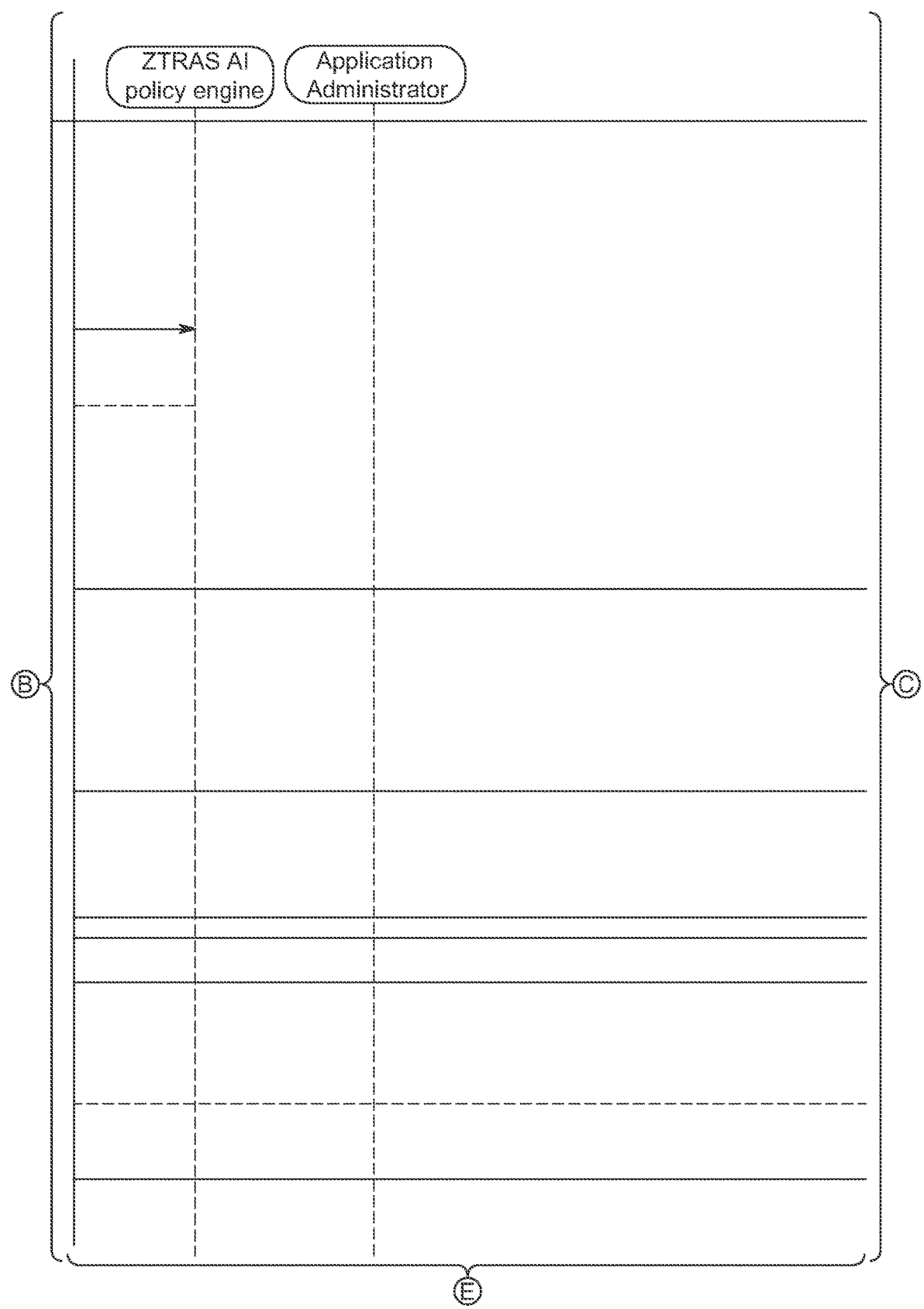
Figure 10:
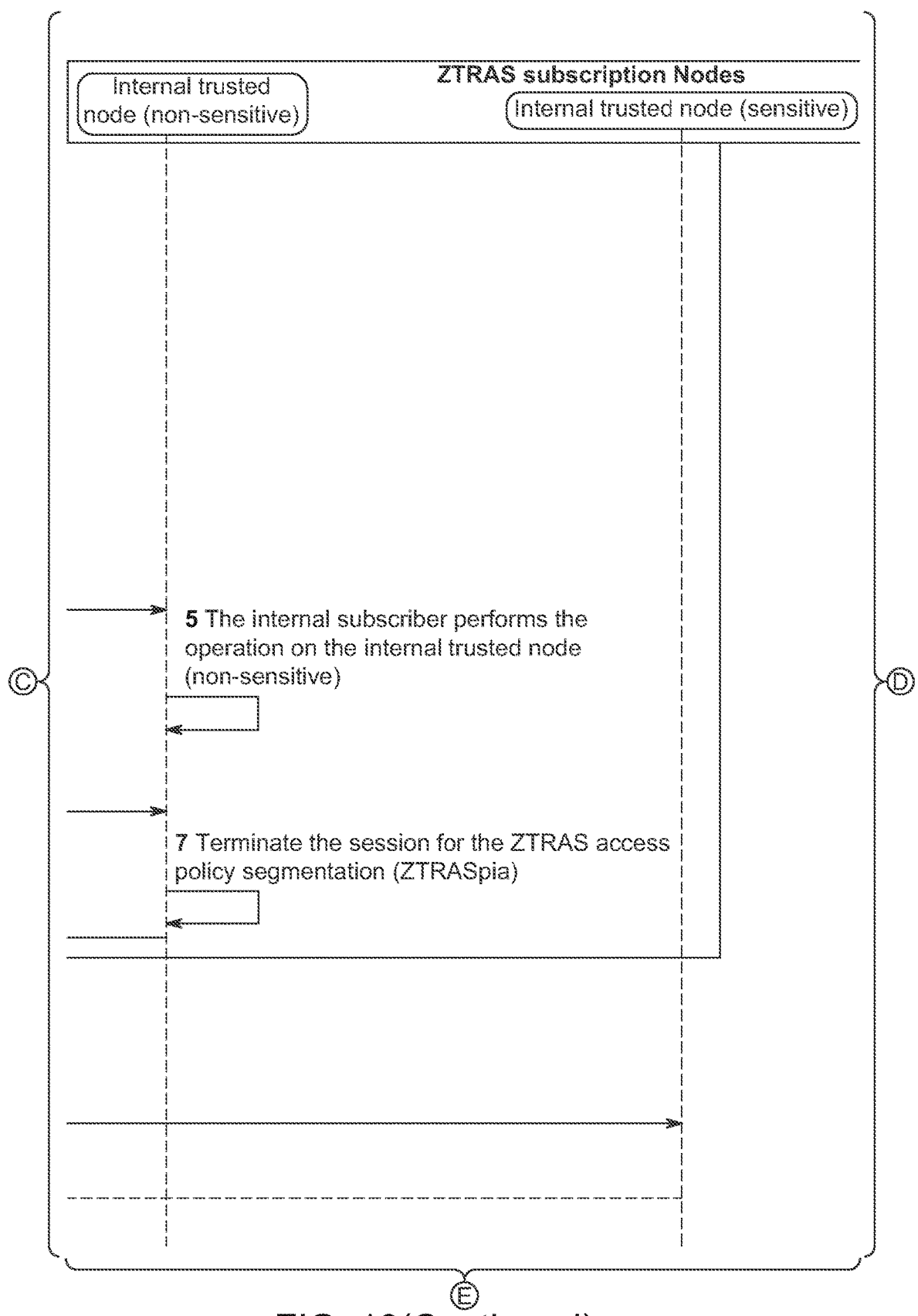
Figure 10:
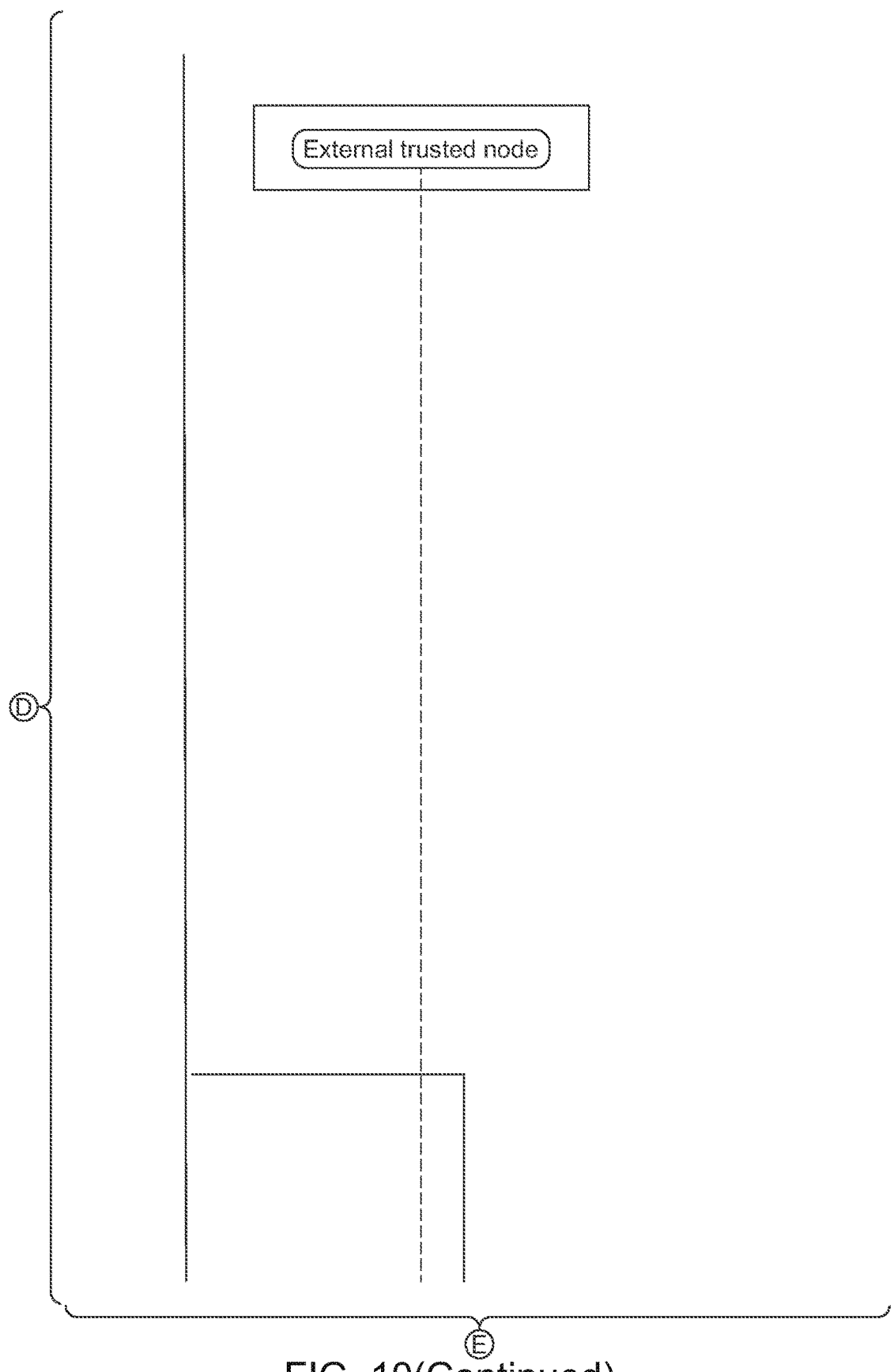
Figure 10:
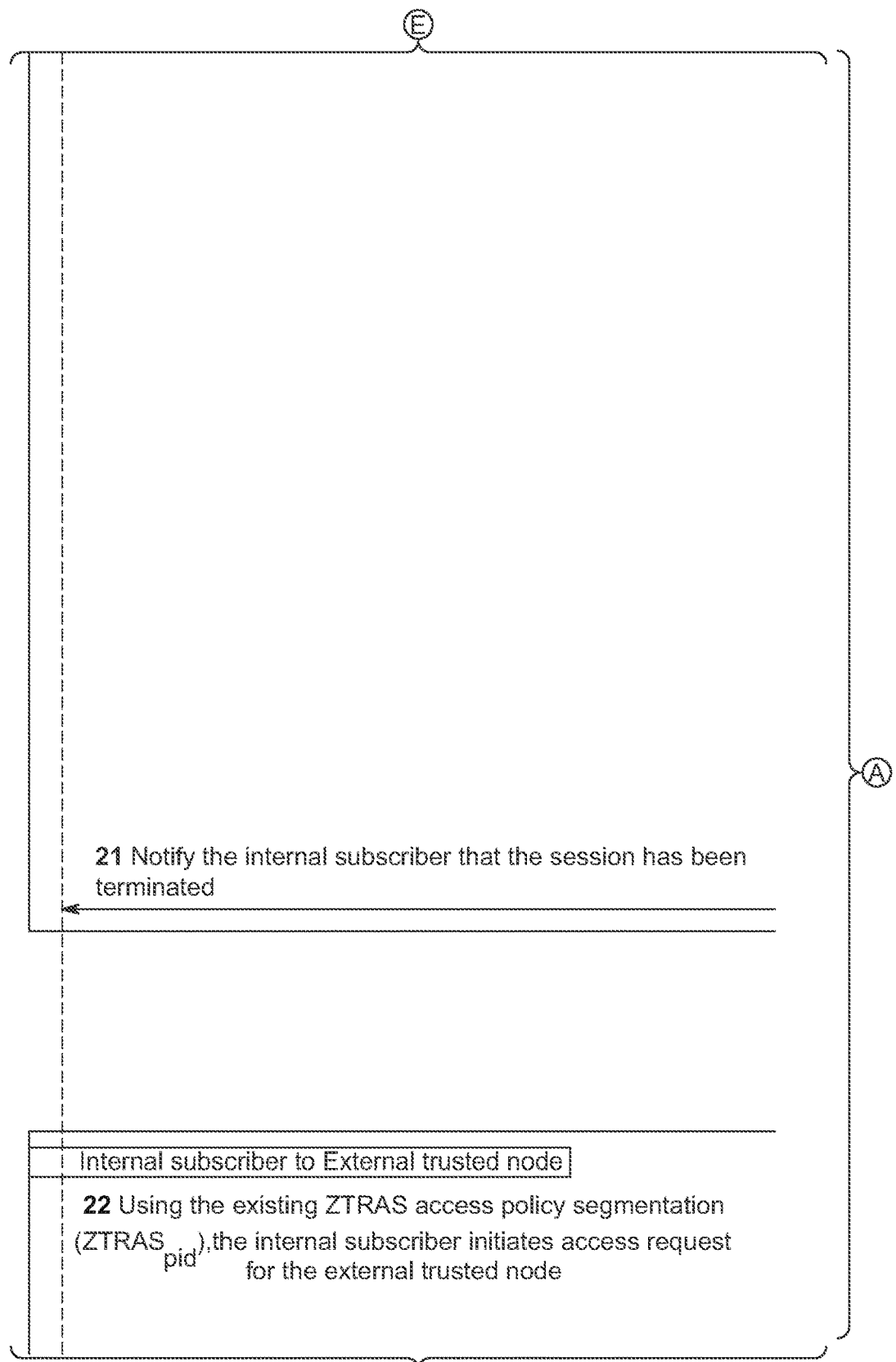
Figure 10:
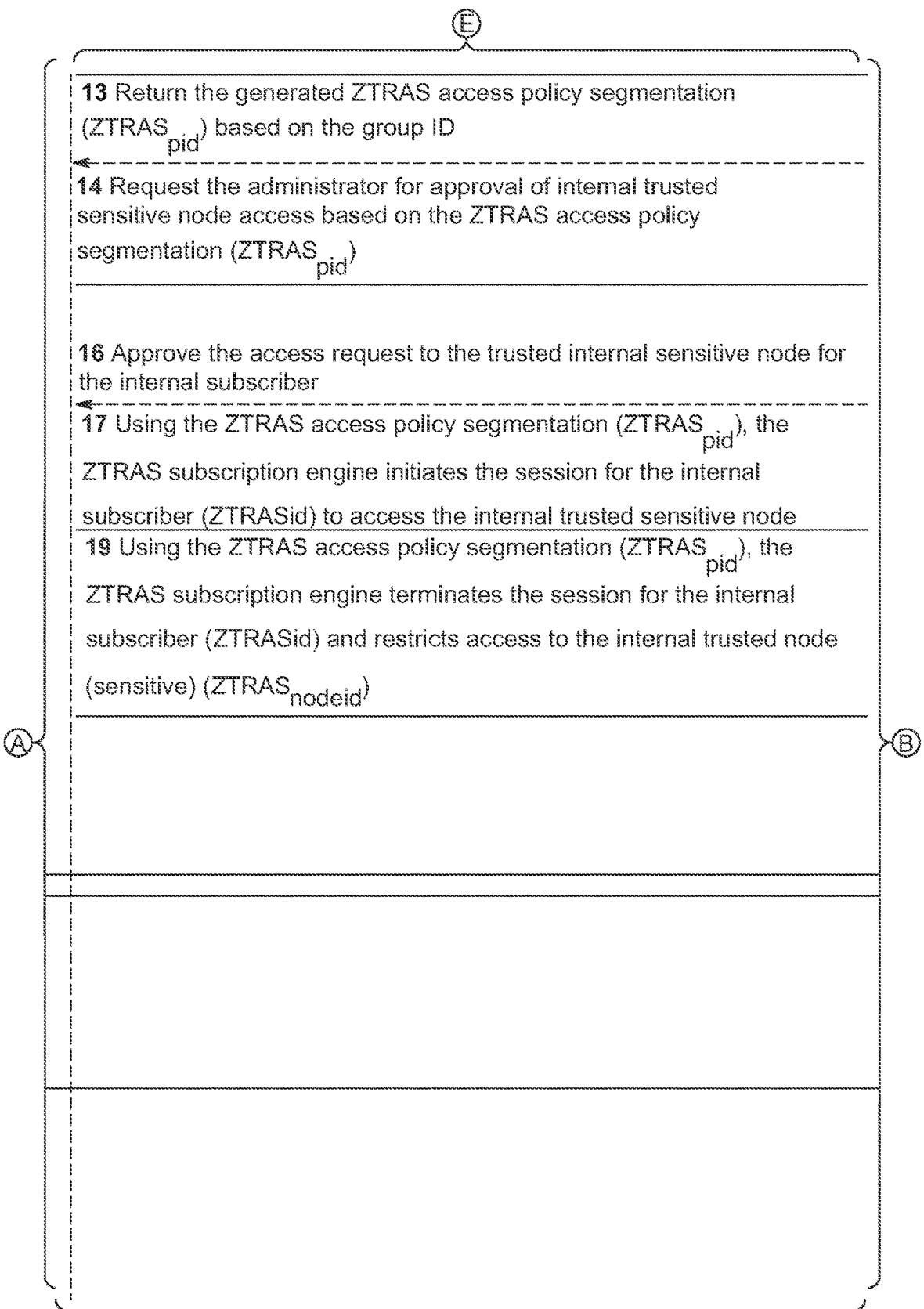
Figure 10:
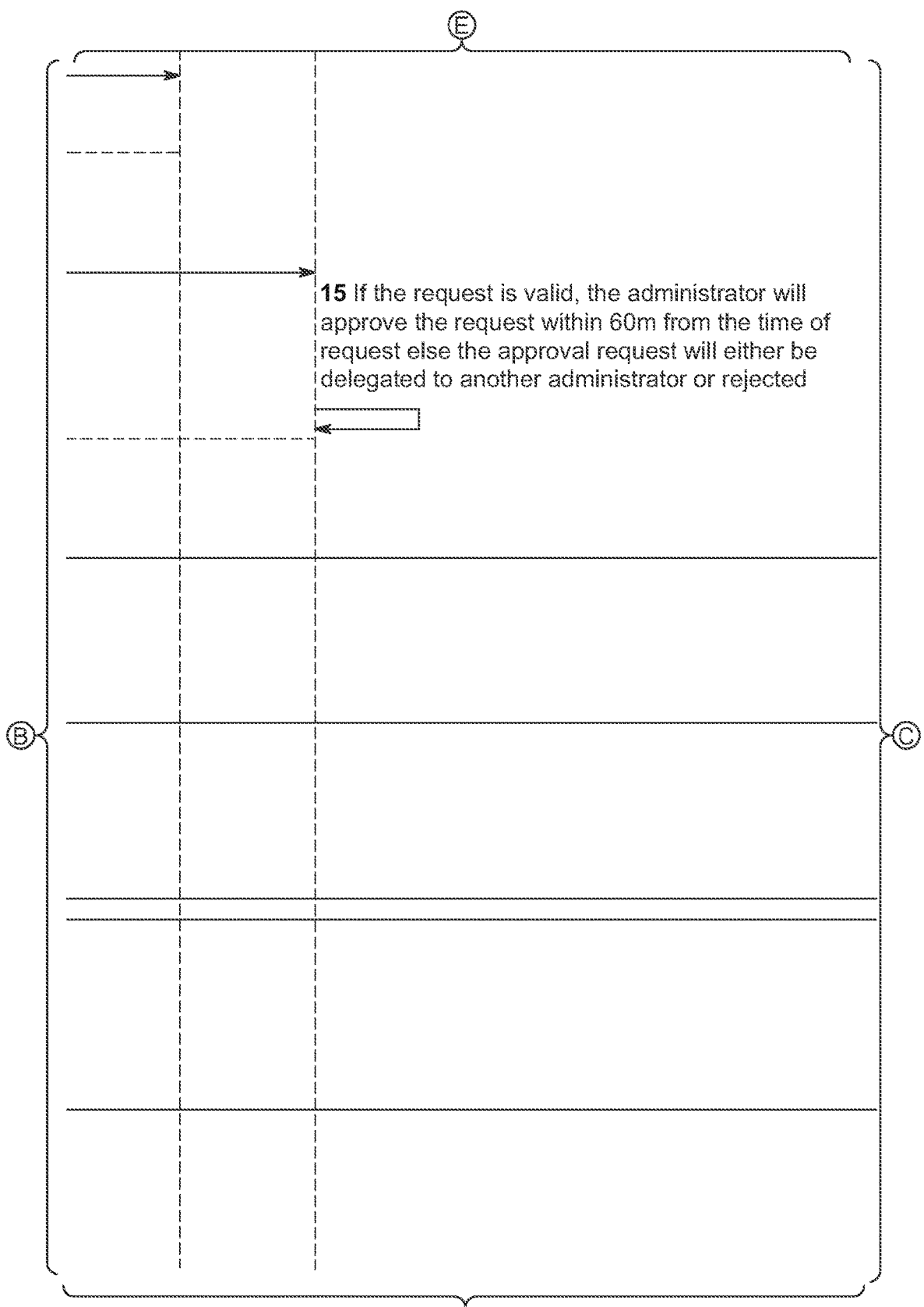
Figure 10:
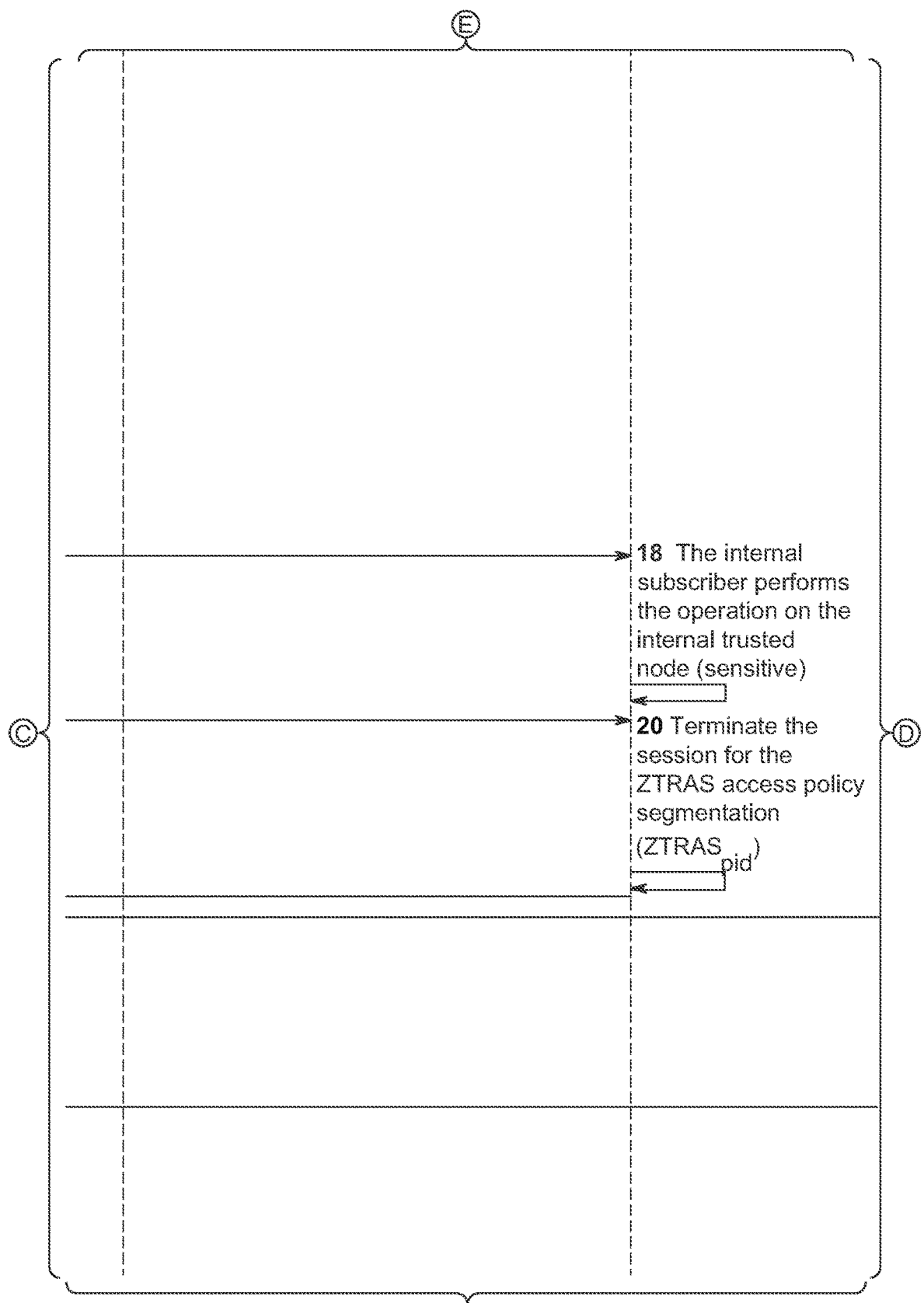
Figure 10:
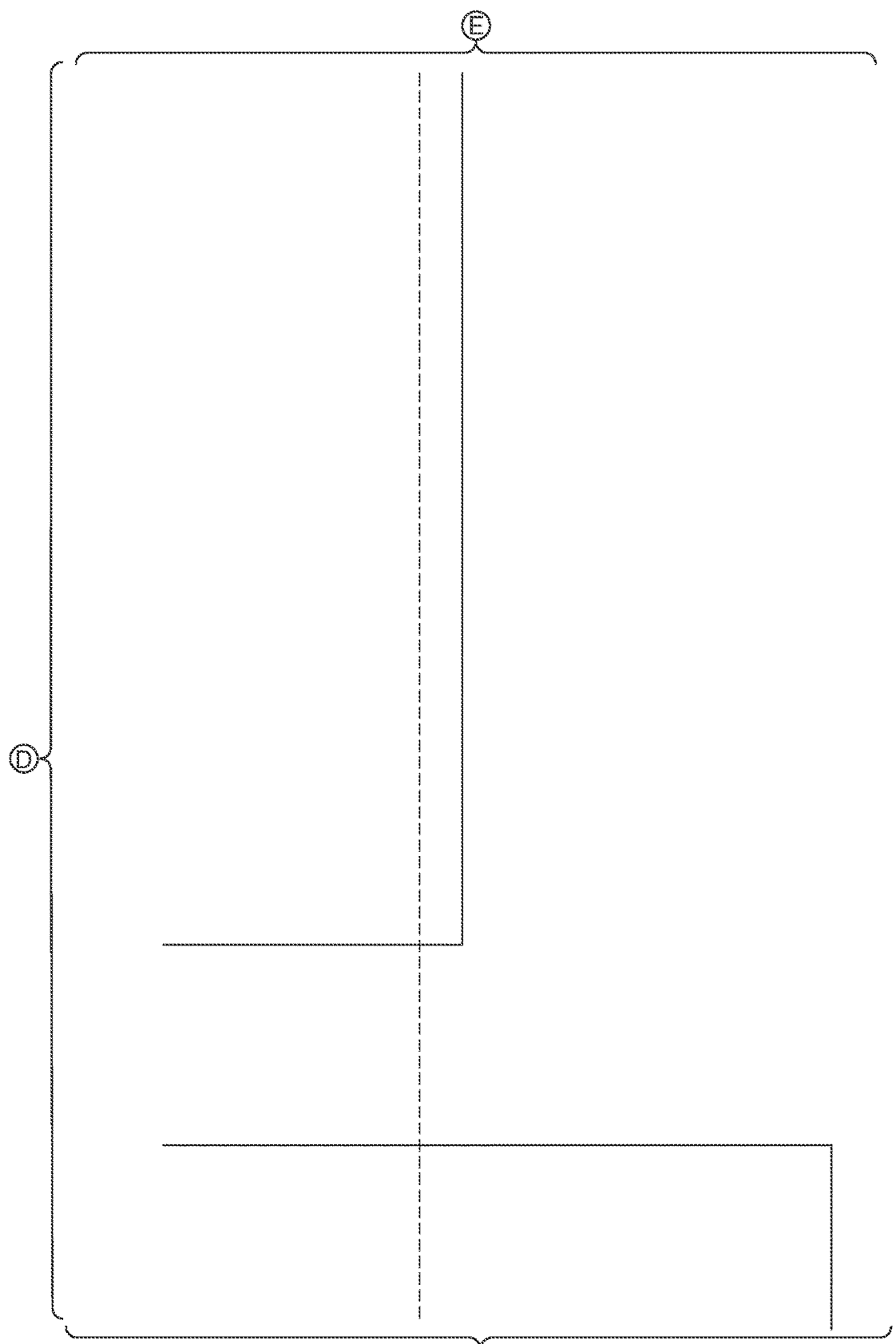
Figure 10:
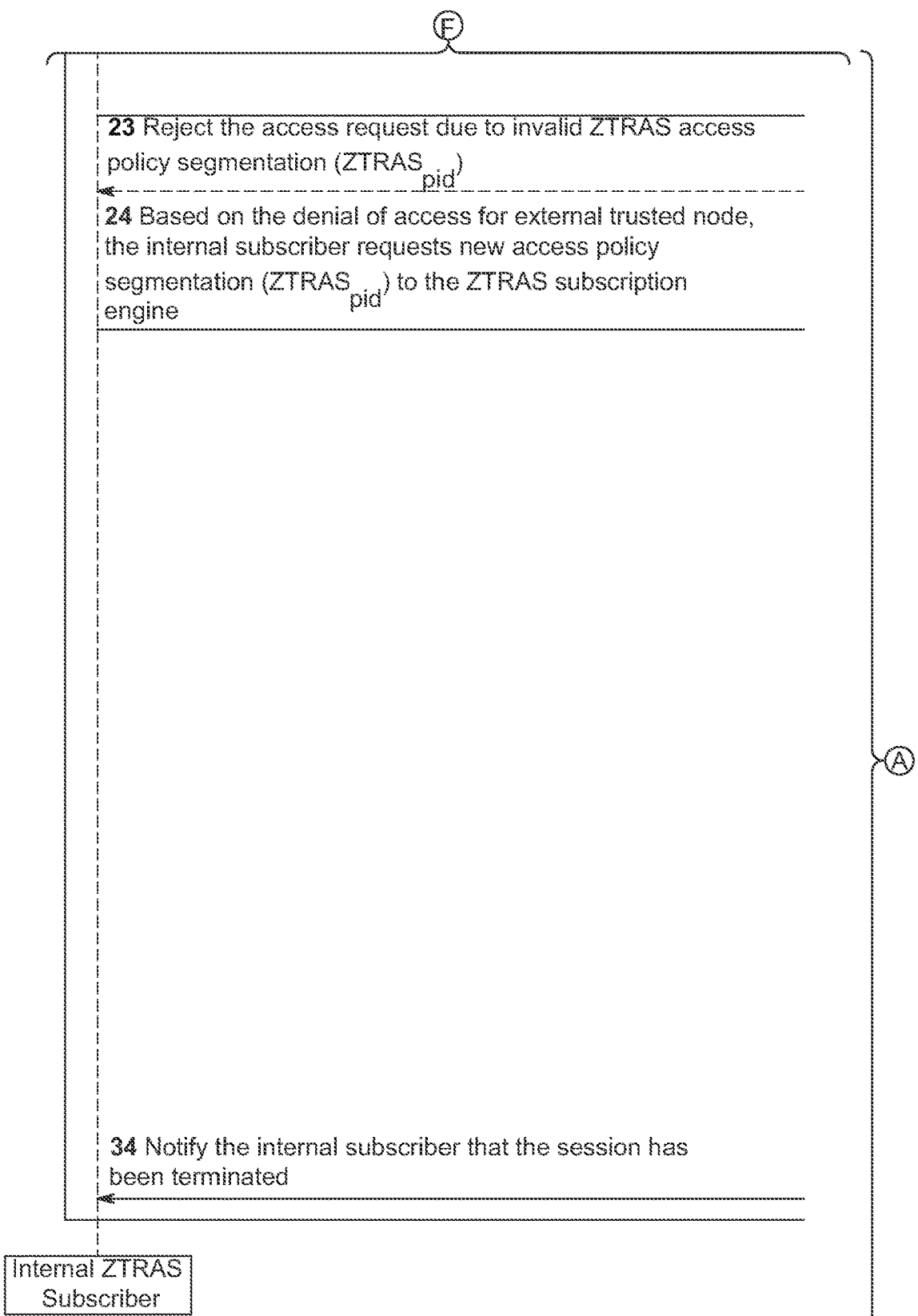
Figure 10:
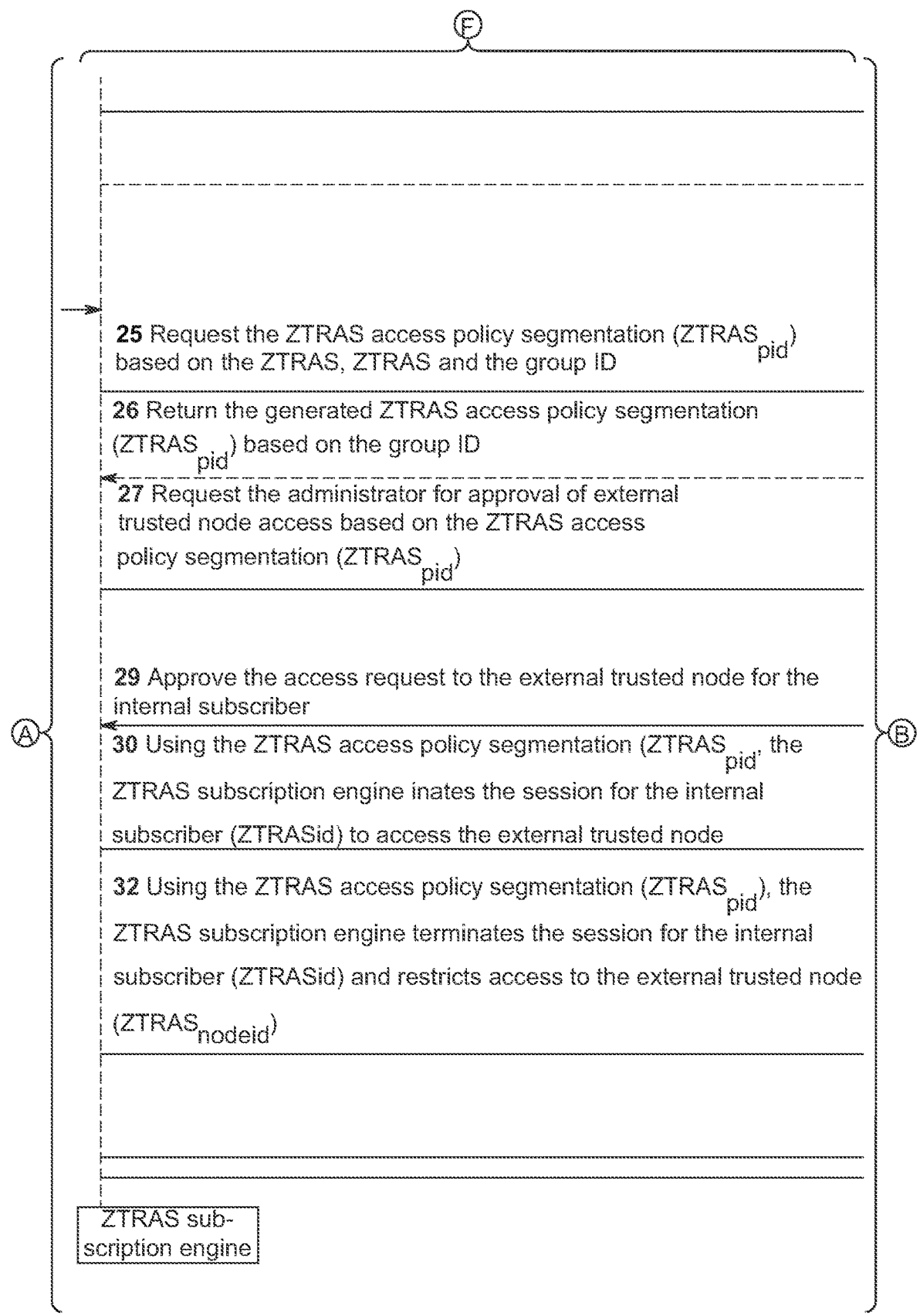
Figure 10:
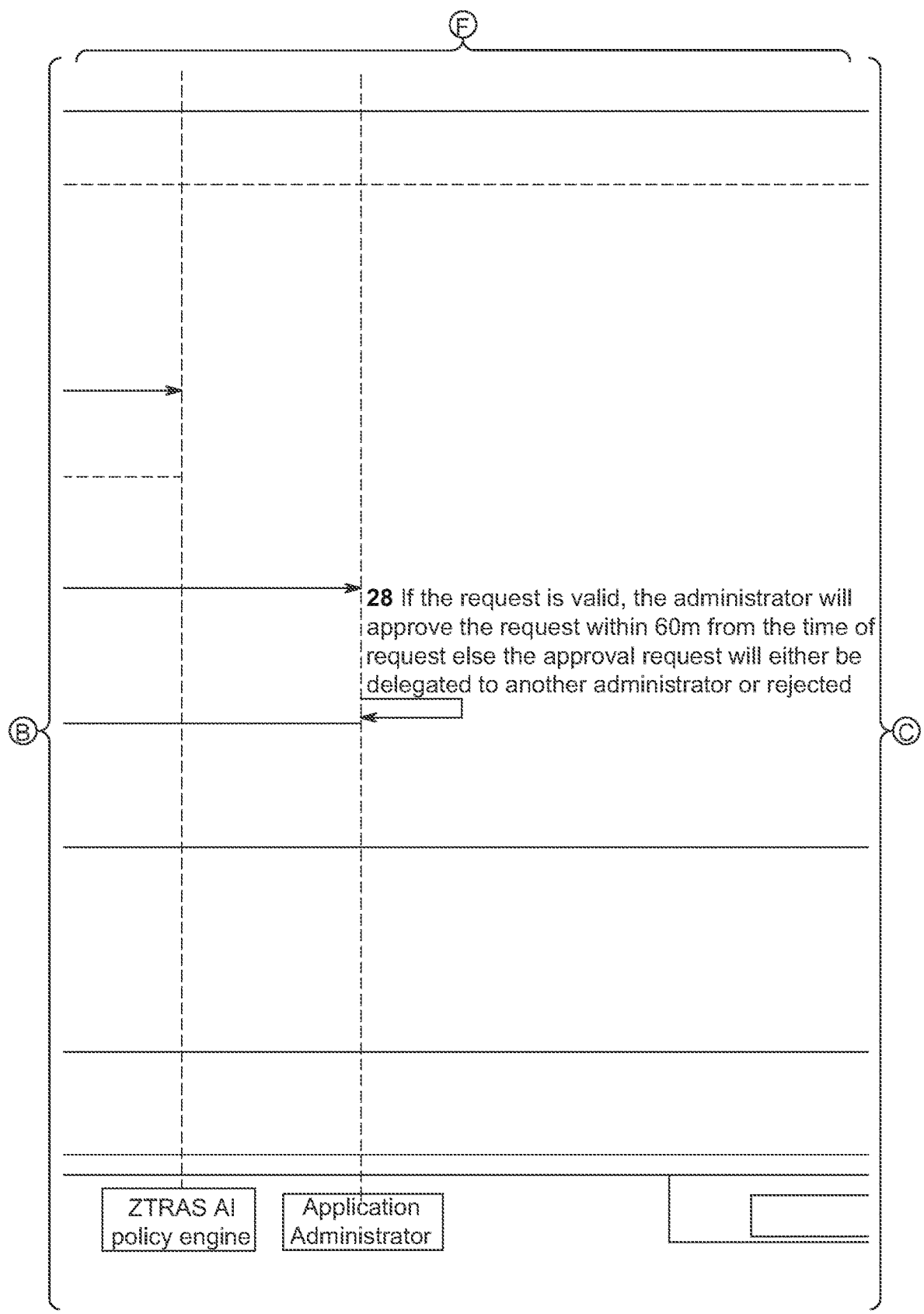
Figure 10:
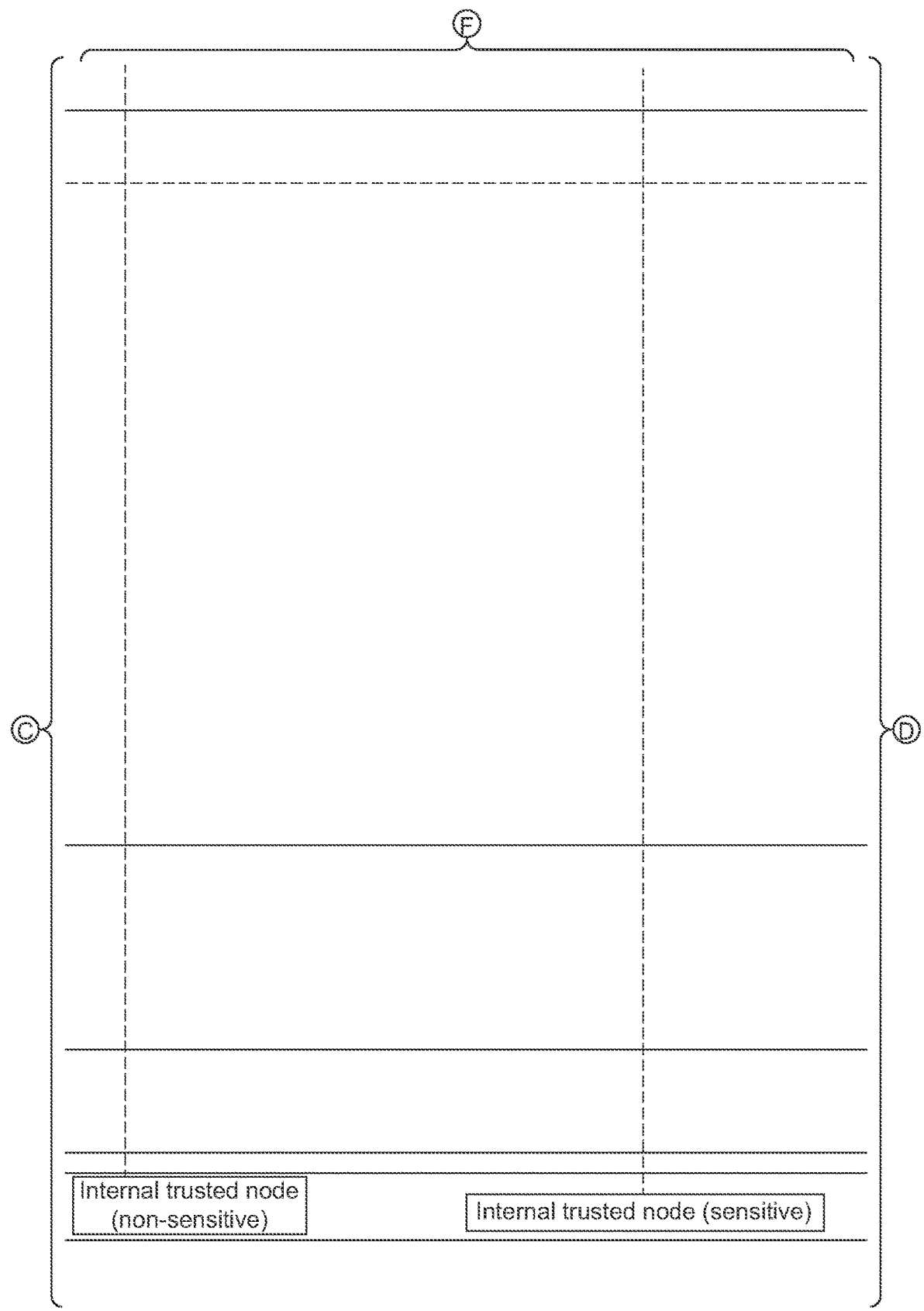
Figure 10:
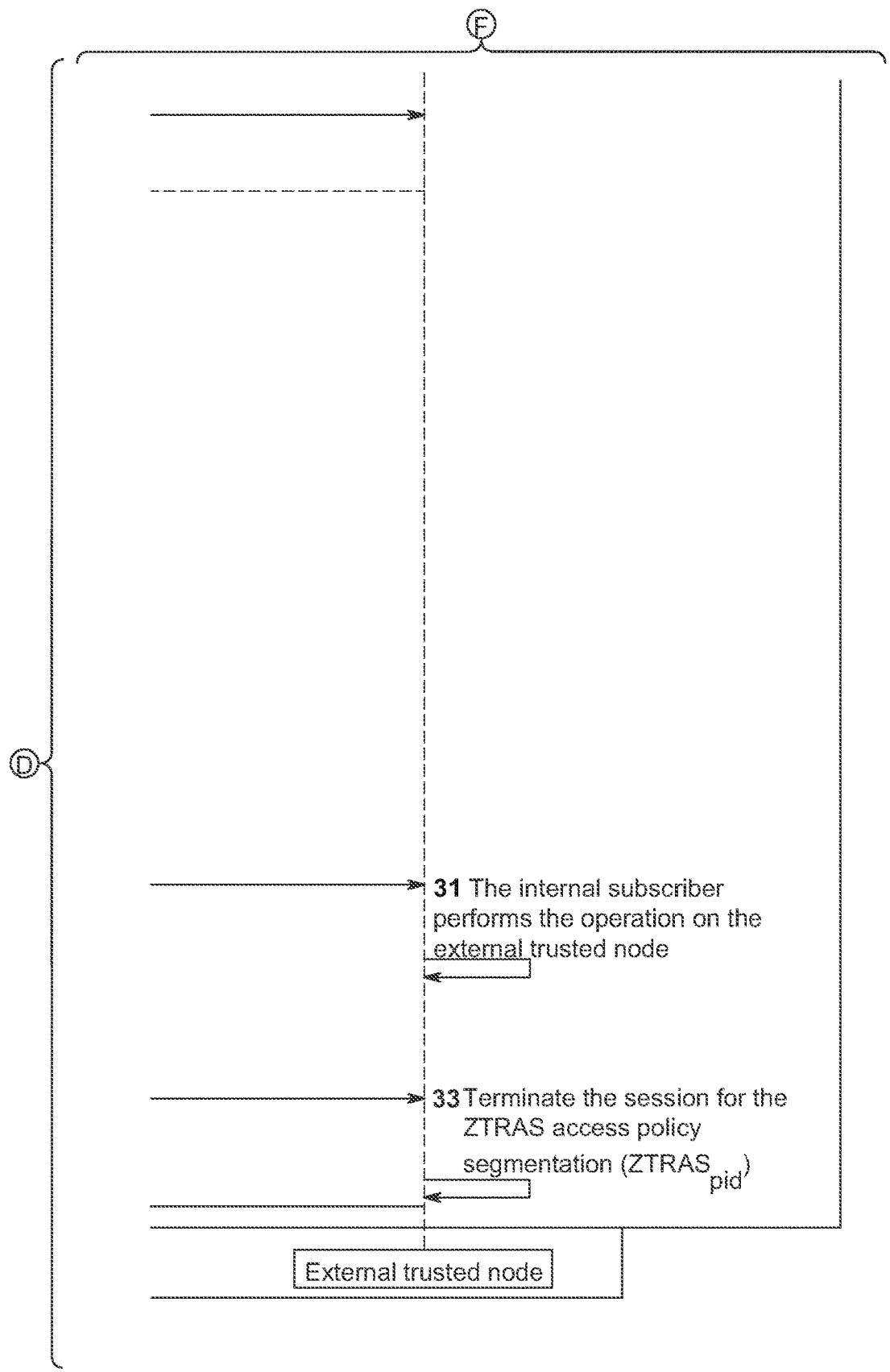

Use Case 6: Provisioning of Sensitive and Non-Sensitive Application Using ZTRAS Access Policy Segmentation ($ZTRAS_{pid}$) for ZTRAS Subscriber:

Use Case 6.1: Provisioning of Sensitive and Non-Sensitive Application Access Using ZTRAS Access Policy Segmentation ($ZTRAS_{pid}$) for Internal ZTRAS Subscriber FIG. 10 illustrates a call flow for provisioning of sensitive and non-sensitive application or node access using ZTRAS access policy segmentation ($ZTRAS_{pid}$) for an internal ZTRAS subscriber, according to an embodiment. In the example of FIG. 10, the internal subscriber is defined to have access to internal trusted non-sensitive nodes. Further, the internal subscriber is defined to have access to internal trusted sensitive nodes and external trusted nodes based on approval by the application administrator.

Referring to FIG. 10, at (1), the internal subscriber requests the ZTRAS subscription engine for access to the internal trusted node (non-sensitive).

At (2), the ZTRAS subscription engine requests the ZTRAS AI policy engine for a new ZTRAS access policy segmentation ($ZTRAS_{pid}$) based on the $ZTRAS_{id}$, $ZTRAS_{nodeid}$ and the group ID.

At (3), the ZTRAS AI policy engine returns the generated ZTRAS access policy segmentation ($ZTRAS_{pid}$) based on the group ID.

At (4), using the ZTRAS access policy segmentation ($ZTRAS_{pid}$), the ZTRAS subscription engine initiates the session for the internal subscriber ($ZTRAS_{id}$) to access the internal trusted node (non-sensitive) ($ZTRAS_{nodeid}$).

At (5), the internal subscriber performs an operation on the internal trusted node (non-sensitive).

At (6), using the ZTRAS access policy segmentation ($ZTRAS_{pid}$), the ZTRAS subscription engine terminates the session for the internal subscriber ($ZTRAS_{id}$) and restricts access to the internal trusted node (non-sensitive) ($ZTRAS_{nodeid}$).

At (7), the session for the ZTRAS access policy segmentation ($ZTRAS_{pid}$) is terminated on the internal trusted non-sensitive node.

At (8), the internal trusted non-sensitive node notifies the internal subscriber that the session has been terminated.

At (9), using the existing ZTRAS access policy segmentation ($ZTRAS_{pid}$), the internal subscriber initiates access request for the internal trusted node (sensitive).

At (10), the internal trusted node (sensitive) (or the ZTRAS subscription engine) rejects the access request due to invalid ZTRAS access policy segmentation ($ZTRAS_{pid}$).

At (11), based on the denial of access for the internal trusted node (sensitive), the internal subscriber requests new access policy segmentation ($ZTRAS_{pid}$) to the ZTRAS subscription engine.

At (12), the ZTRAS subscription engine requests the ZTRAS AI policy engine for a new ZTRAS access policy segmentation ($ZTRAS_{pid}$) based on the $ZTRAS_{id}$, $ZTRAS_{nodeid}$ and the group ID.

At (13), the ZTRAS AI policy engine returns the generated ZTRAS access policy segmentation ($ZTRAS_{pid}$) based on the group ID.

At (14), the ZTRAS subscription engine requests the administrator for approval of internal trusted sensitive node access based on the ZTRAS access policy segmentation ($ZTRAS_{pid}$).

At (15), if the request is valid, the administrator will approve the request within a predetermined time period (e.g., 60 minutes) from the time of request. Otherwise, the approval request will either be delegated to another administrator or rejected.

At (16), the administrator approves the access request to the trusted internal sensitive node for the internal subscriber.

At (17), using the ZTRAS access policy segmentation ($ZTRAS_{pid}$), the ZTRAS subscription engine initiates the session for the internal subscriber ($ZTRAS_{id}$) to access the internal trusted sensitive node.

At (18), the internal subscriber performs an operation on the internal trusted node (sensitive).

At (19), using the ZTRAS access policy segmentation ($ZTRAS_{pid}$), the ZTRAS subscription engine terminates the session for the internal subscriber ($ZTRAS_{id}$) and restricts access to the internal trusted node (sensitive) ($ZTRAS_{nodeid}$).

At (20), the session for the ZTRAS access policy segmentation ($ZTRAS_{pid}$) is terminated in the internal trusted node (sensitive).

At (21), the internal trusted node (sensitive) notifies the internal subscriber that the session has been terminated.

Steps (22) through (34) in the call flow of FIG. 10 are similar to steps (9) through (21), respectively, in the call flow of FIG. 10, other than that the external trusted node is used in place of the internal trusted node (sensitive). Thus, redundant descriptions thereof are omitted below.

Figure 11:
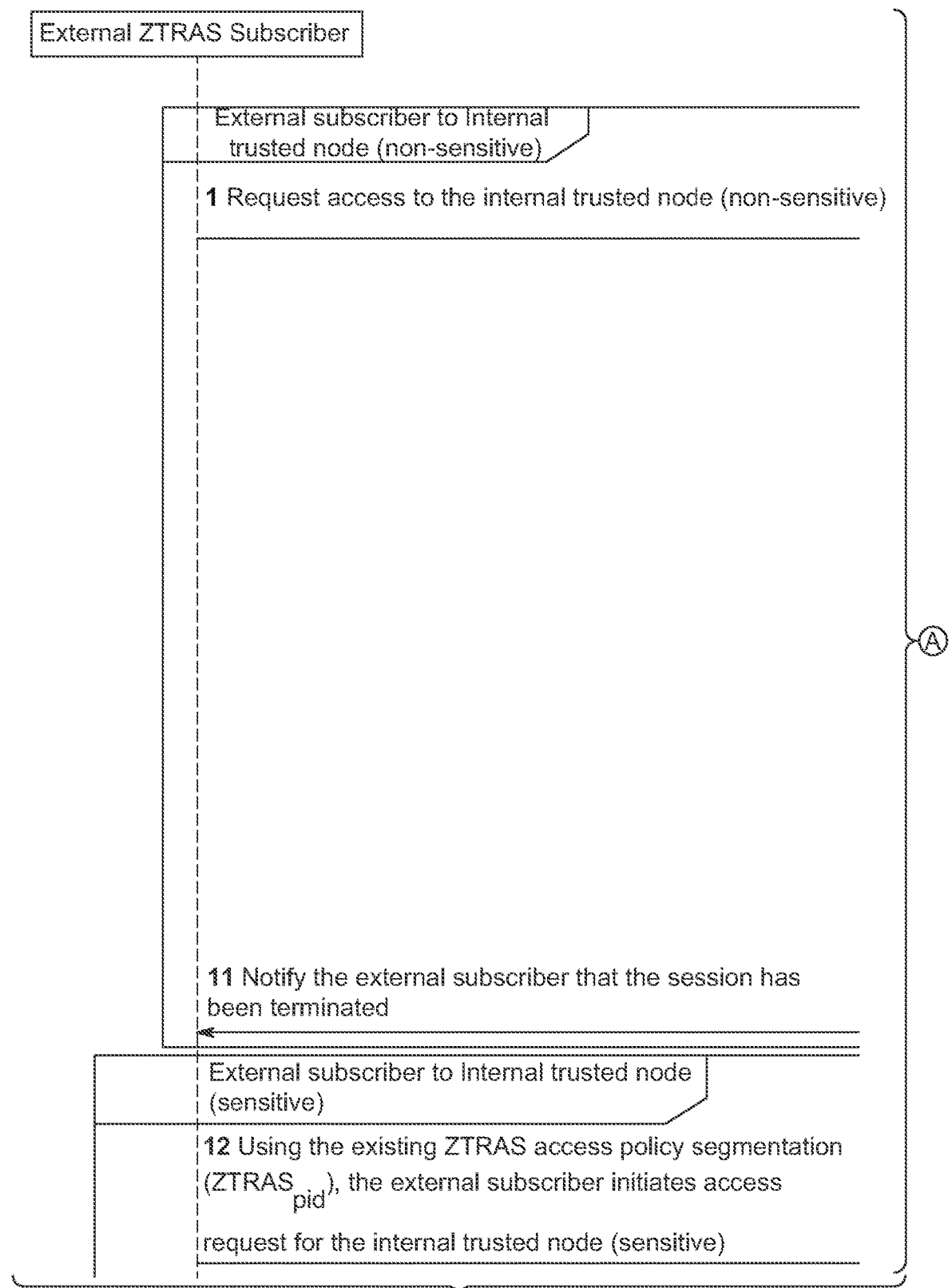
FIG. 11 illustrates a call flow for provisioning of sensitive and non-sensitive application or node access using ZTRAS access policy segmentation ($ZTRAS_{pid}$) for an external ZTRAS subscriber, according to an embodiment.
Figure 11:
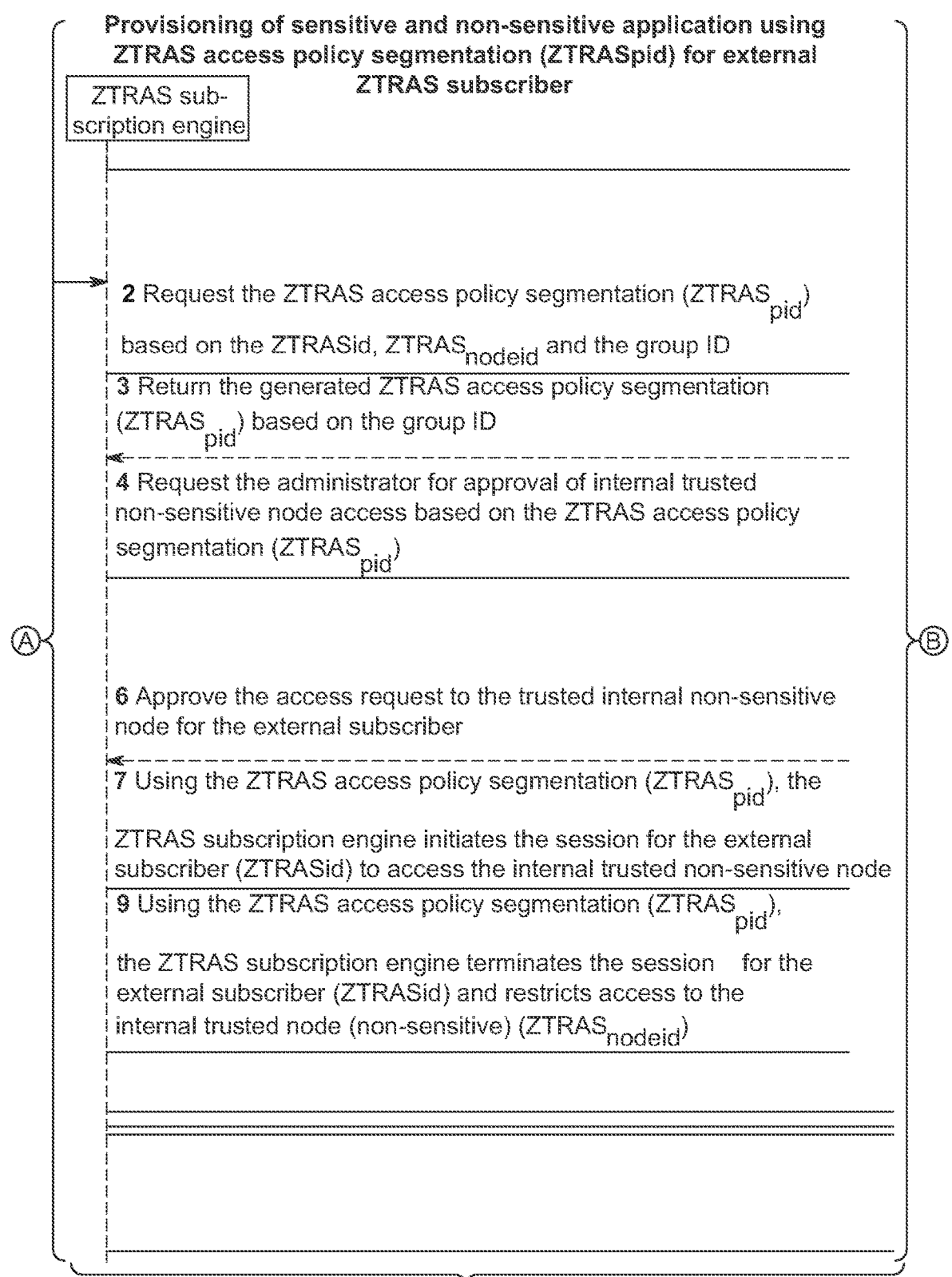
Figure 11:
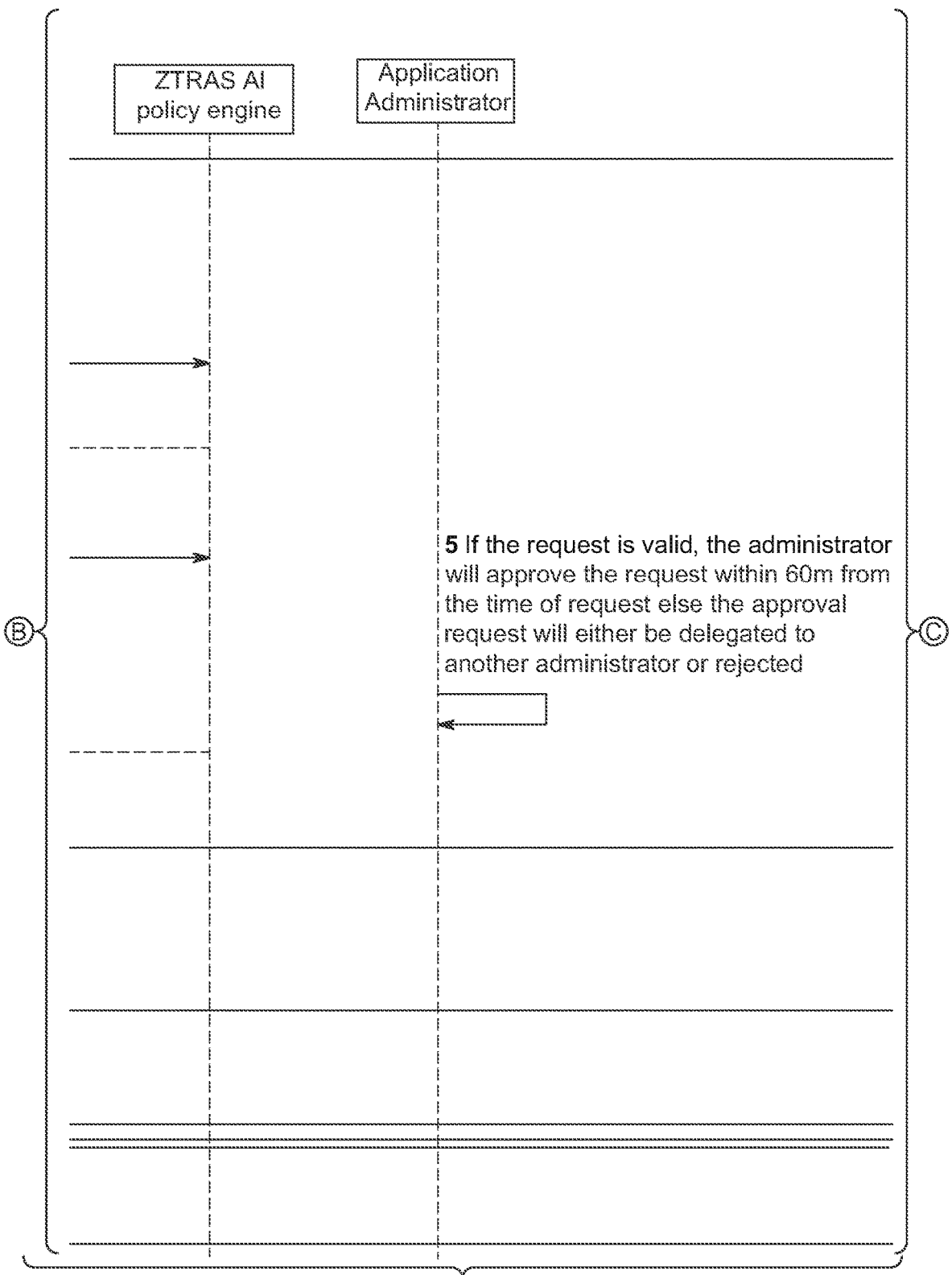
Figure 11:
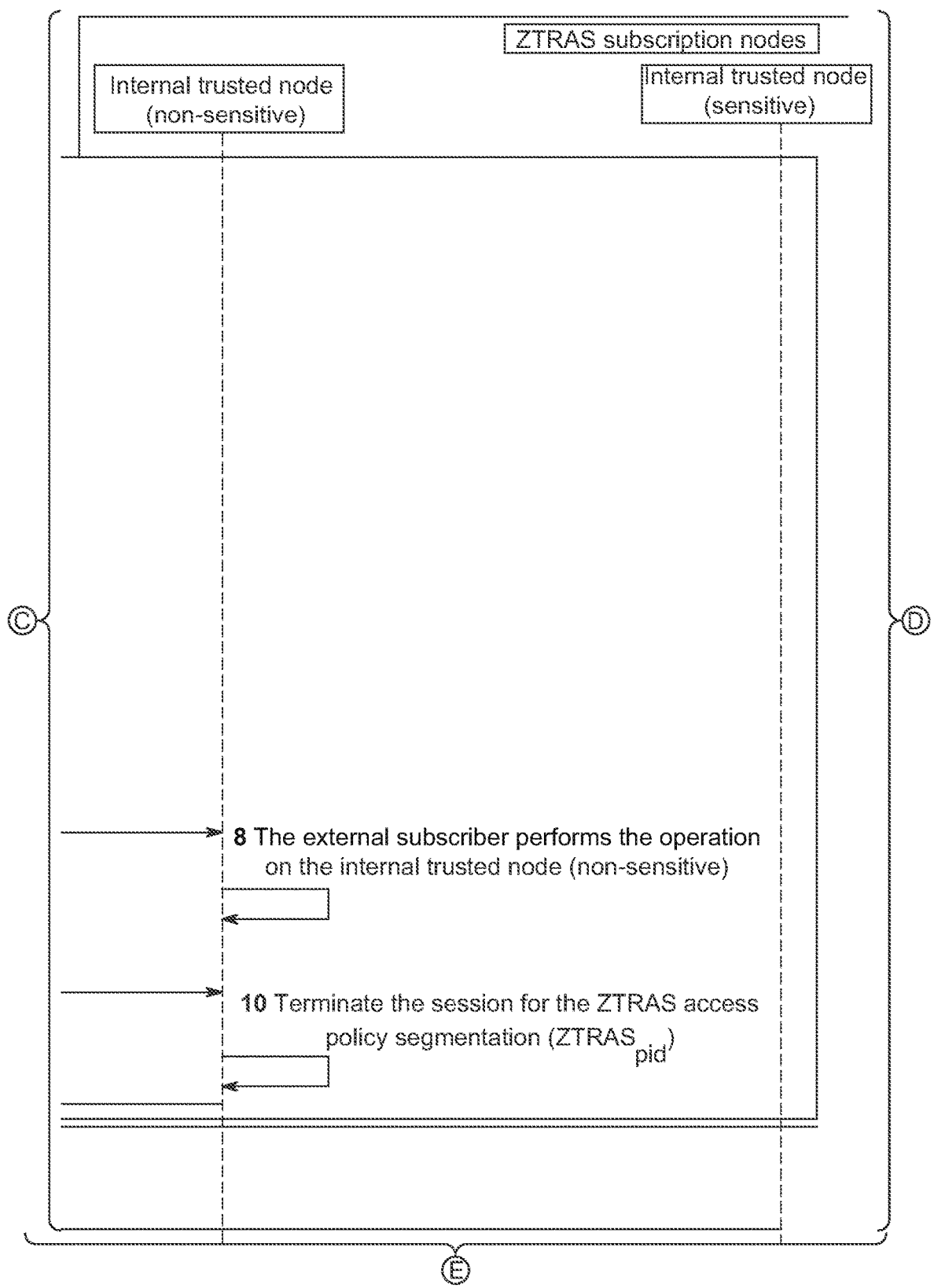
Figure 11:
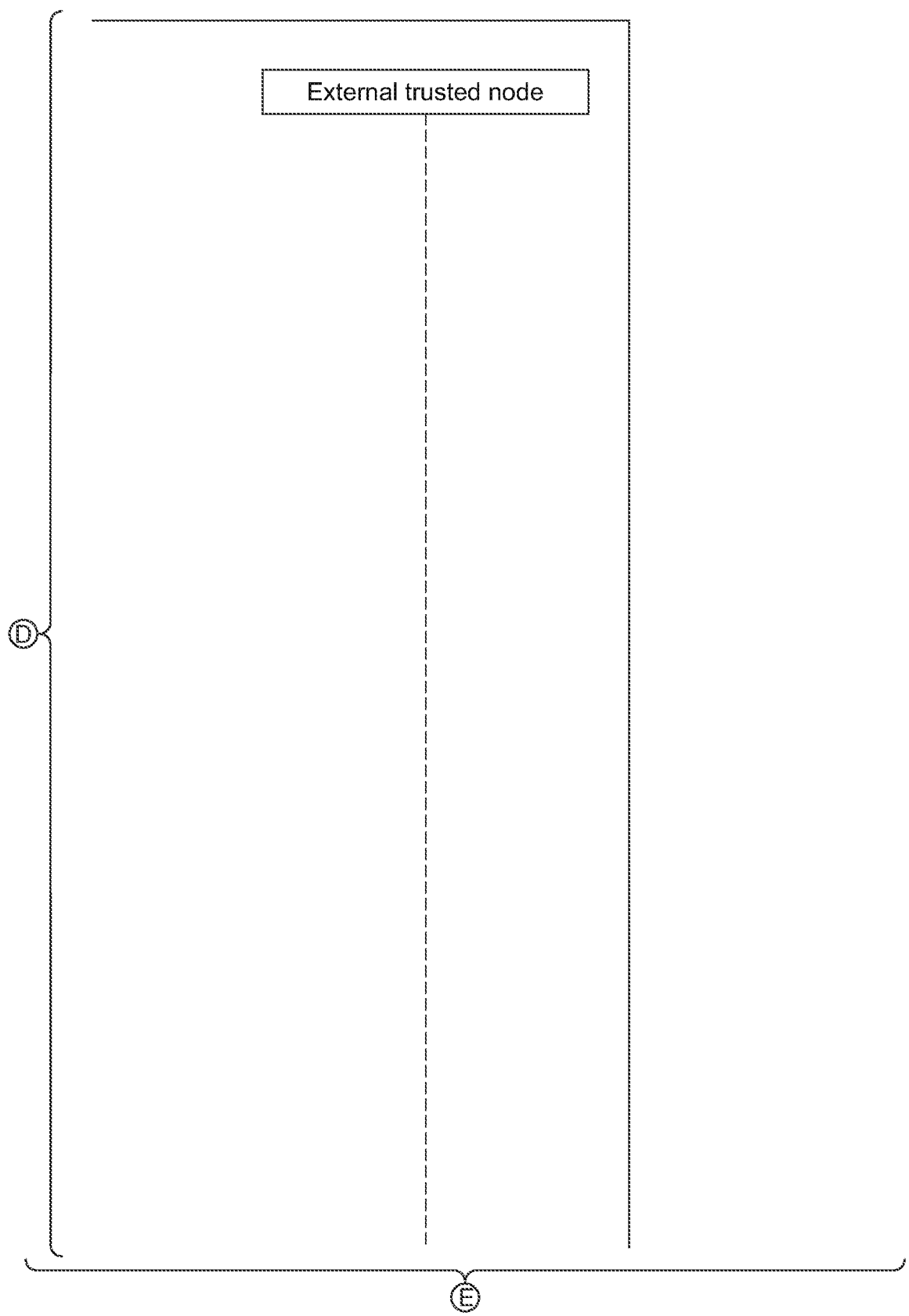
Figure 11:
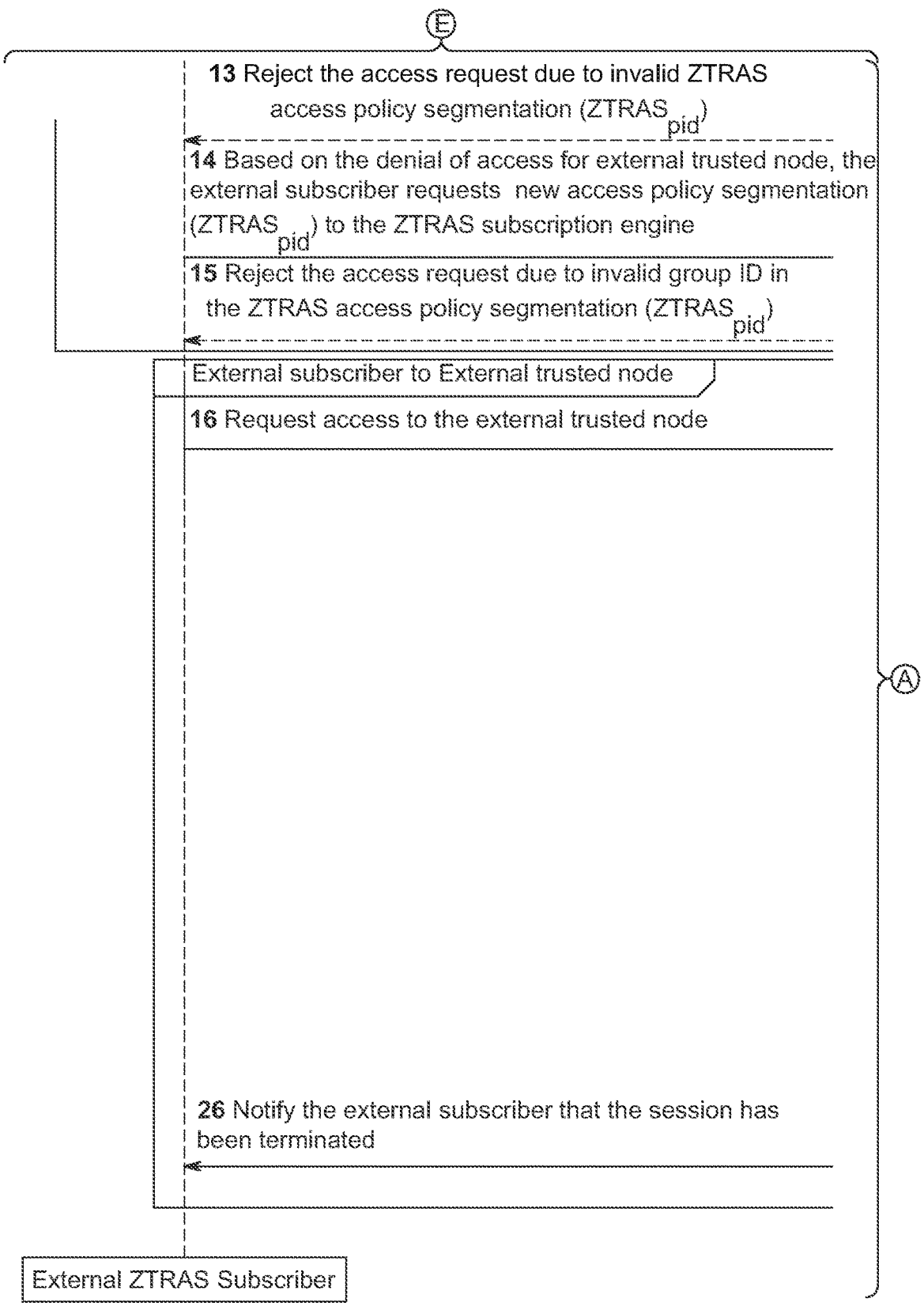
Figure 11:
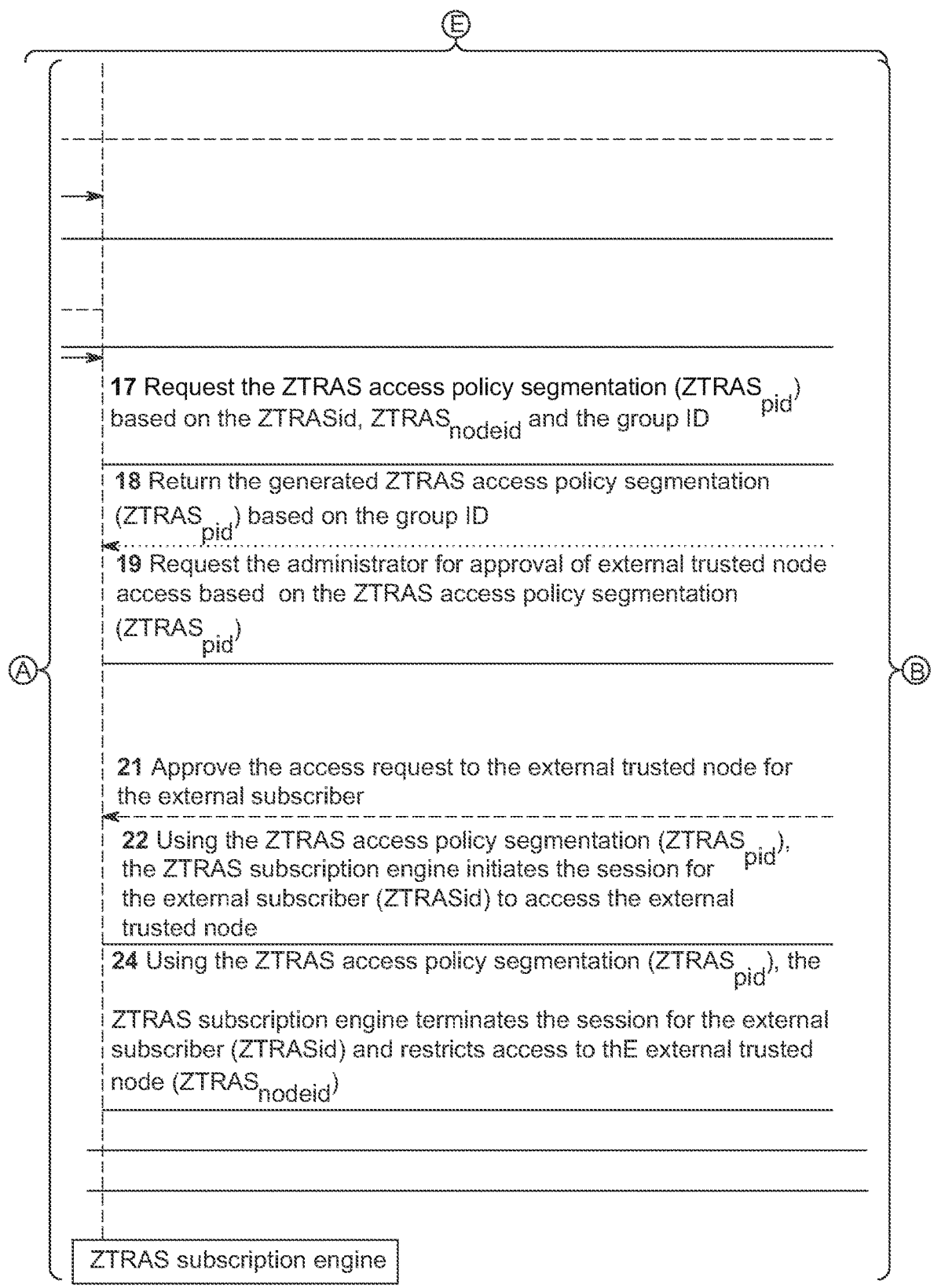
Figure 11:
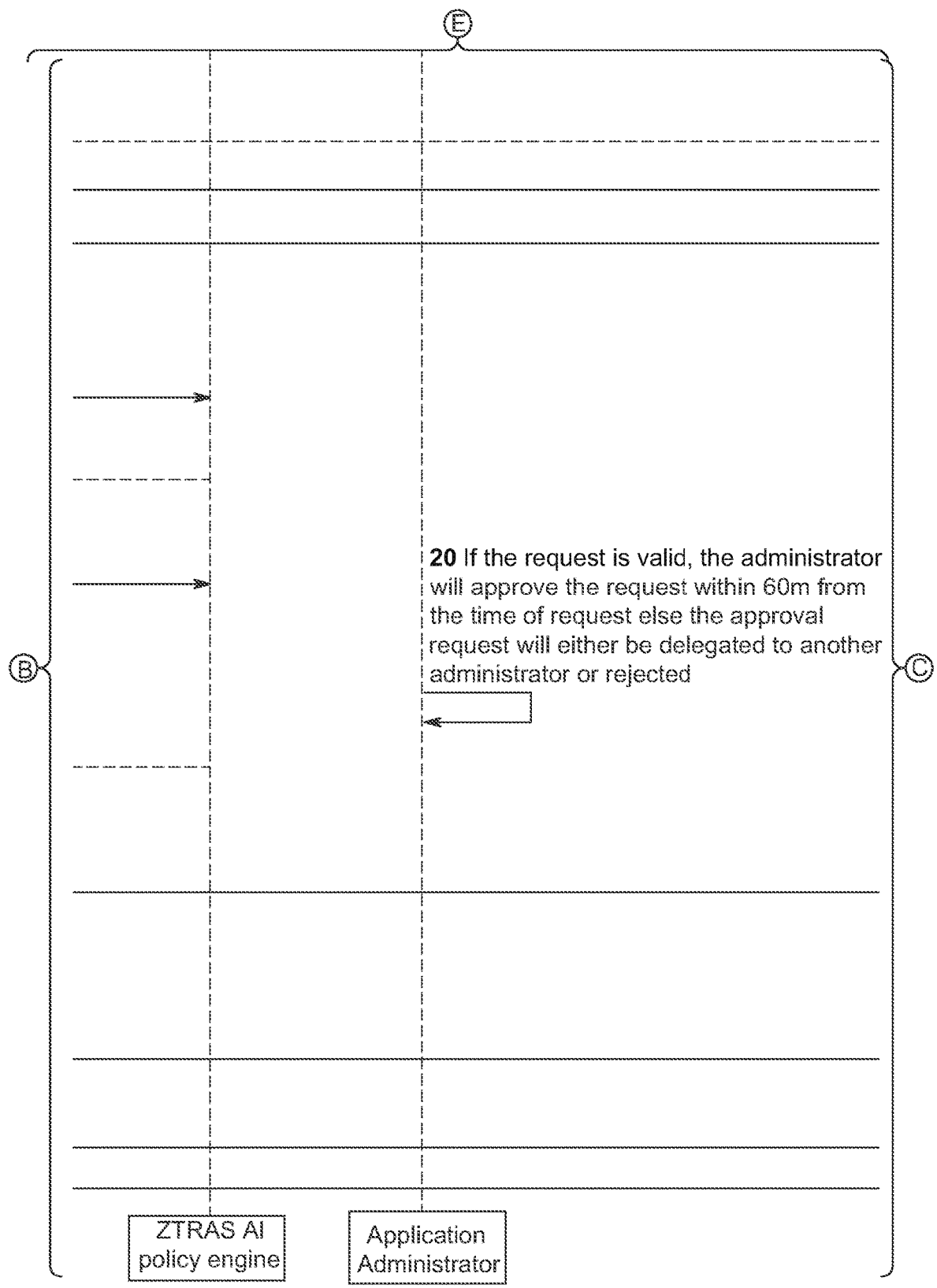
Figure 11:
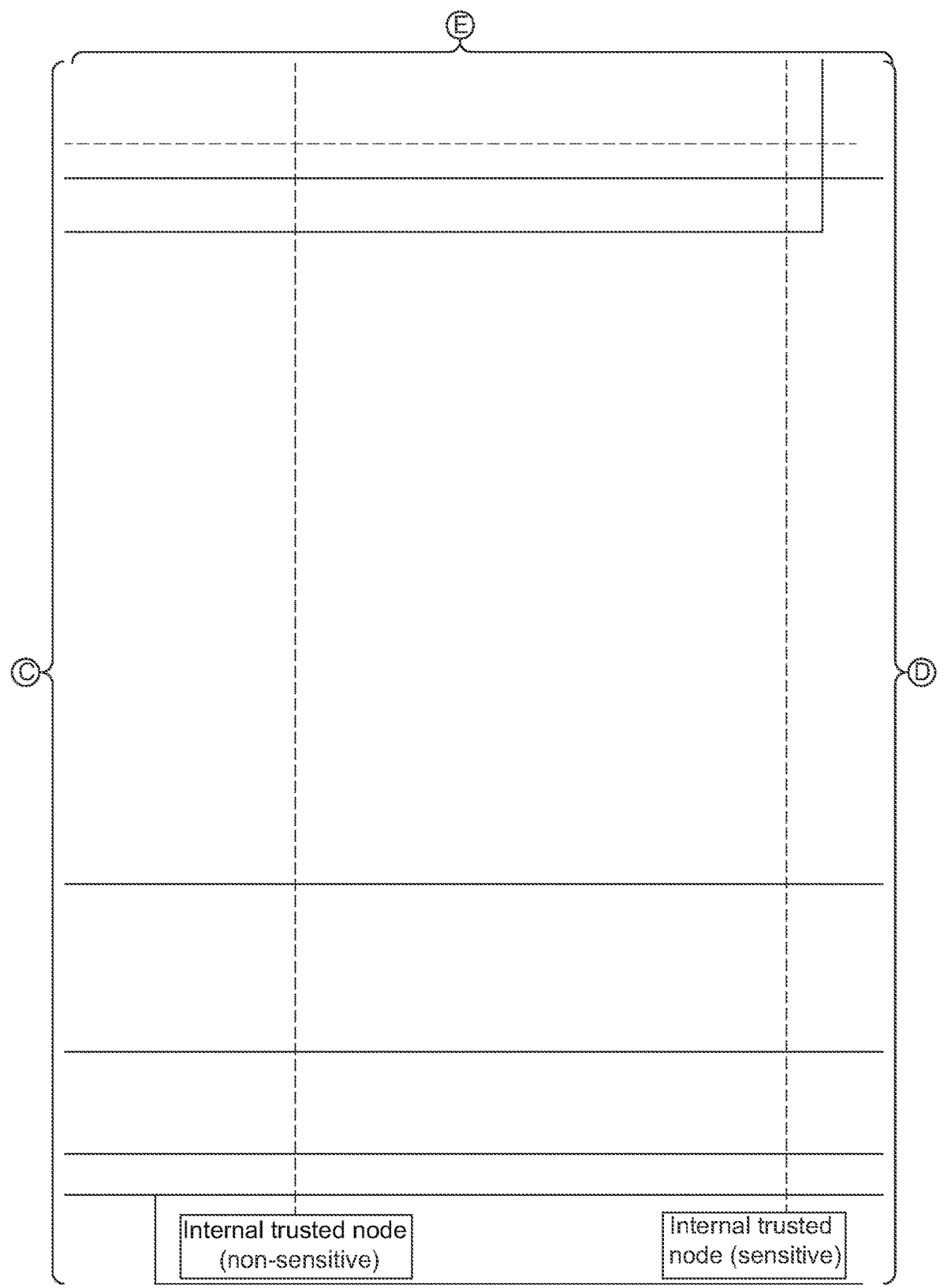
Figure 11:
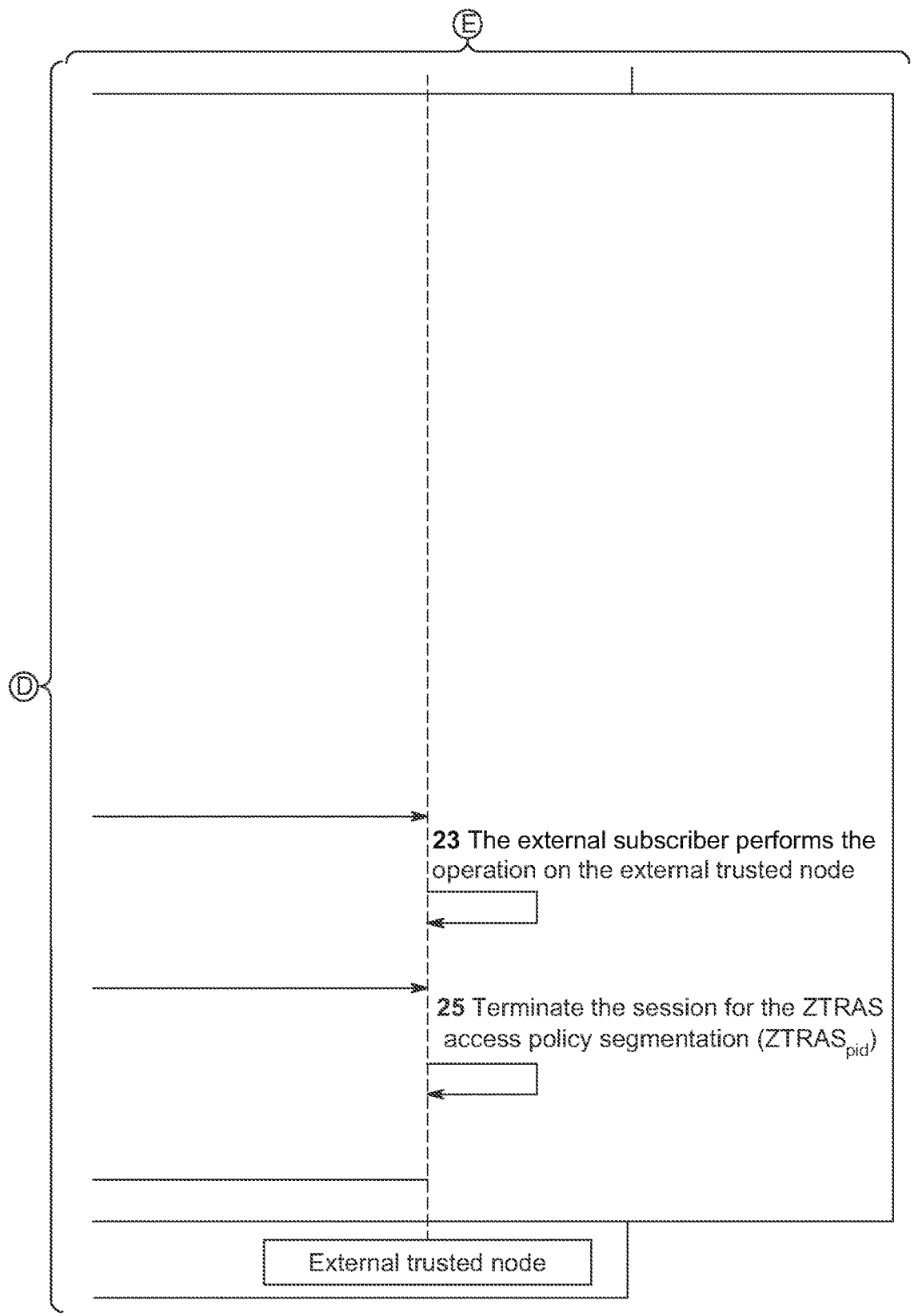

Use Case 6.2: Provisioning of Sensitive and Non-Sensitive Application Access Using ZTRAS Access Policy Segmentation ($ZTRAS_{pid}$) for External ZTRAS Subscriber FIG. 11 illustrates a call flow for provisioning of sensitive and non-sensitive application or node access using ZTRAS access policy segmentation ($ZTRAS_{pid}$) for an external ZTRAS subscriber, according to an embodiment. In the example of FIG. 11, the external subscriber is defined to not have access to internal trusted sensitive nodes. Further, the external subscriber is defined to have access to internal trusted non-sensitive nodes and external trusted nodes based on approval by the application administrator.

Referring to FIG. 11, at (1), the external subscriber requests the ZTRAS subscription engine for access to the internal trusted node (non-sensitive).

At (2), the ZTRAS subscription engine requests the ZTRAS AI policy engine for a new ZTRAS access policy segmentation ($ZTRAS_{pid}$) based on the $ZTRAS_{id}$, $ZTRAS_{nodeid}$ and the group ID.

At (3), the ZTRAS AI policy engine returns the generated ZTRAS access policy segmentation ($ZTRAS_{pid}$) based on the group ID.

At (4), the ZTRAS subscription engine requests the administrator for approval of internal trusted non-sensitive node access based on the ZTRAS access policy segmentation ($ZTRAS_{pid}$).

At (5), if the request is valid, the administrator will approve the request within a predetermined period of time (e.g., 60 minutes) from the time of request. Otherwise, the approval request will either be delegated to another administrator or rejected.

At (6), the administrator approves the access request to the trusted internal non-sensitive node for the external subscriber.

At (7), using the ZTRAS access policy segmentation ($ZTRAS_{pid}$), the ZTRAS subscription engine initiates the session for the external subscriber ($ZTRAS_{id}$) to access the internal trusted node (non-sensitive) ($ZTRAS_{nodeid}$).

At (8), the external subscriber performs an operation on the internal trusted node (non-sensitive).

At (9), using the ZTRAS access policy segmentation ($ZTRAS_{pid}$), the ZTRAS subscription engine terminates the session for the external subscriber ($ZTRAS_{id}$) and restricts access to the internal trusted node (non-sensitive) ($ZTRAS_{nodeid}$).

At (10), the session for the ZTRAS access policy segmentation ($ZTRAS_{pid}$) is terminated on the internal trusted non-sensitive node.

At (11), the internal trusted non-sensitive node notifies the external subscriber that the session has been terminated.

At (12), using the existing ZTRAS access policy segmentation ($ZTRAS_{pid}$), the external subscriber initiates access request for the internal trusted node (sensitive).

At (13), the internal trusted node (sensitive) rejects the access request due to invalid ZTRAS access policy segmentation ($ZTRAS_{pid}$).

At (14), based on the denial of access for external trusted node, the external subscriber requests the ZTRAS subscription engine for new access policy segmentation ($ZTRAS_{pid}$).

At (15), the ZTRAS subscription engine rejects the access request due to invalid group ID in the ZTRAS access policy segmentation ($ZTRAS_{pid}$).

Steps (16) through (26) in the call flow of FIG. 11 are similar to steps (1) through (11), respectively, in the call flow of FIG. 11, other than that the external trusted node is used in place of the internal trusted node (non-sensitive). Thus, redundant descriptions thereof are omitted below.

Figure 12:
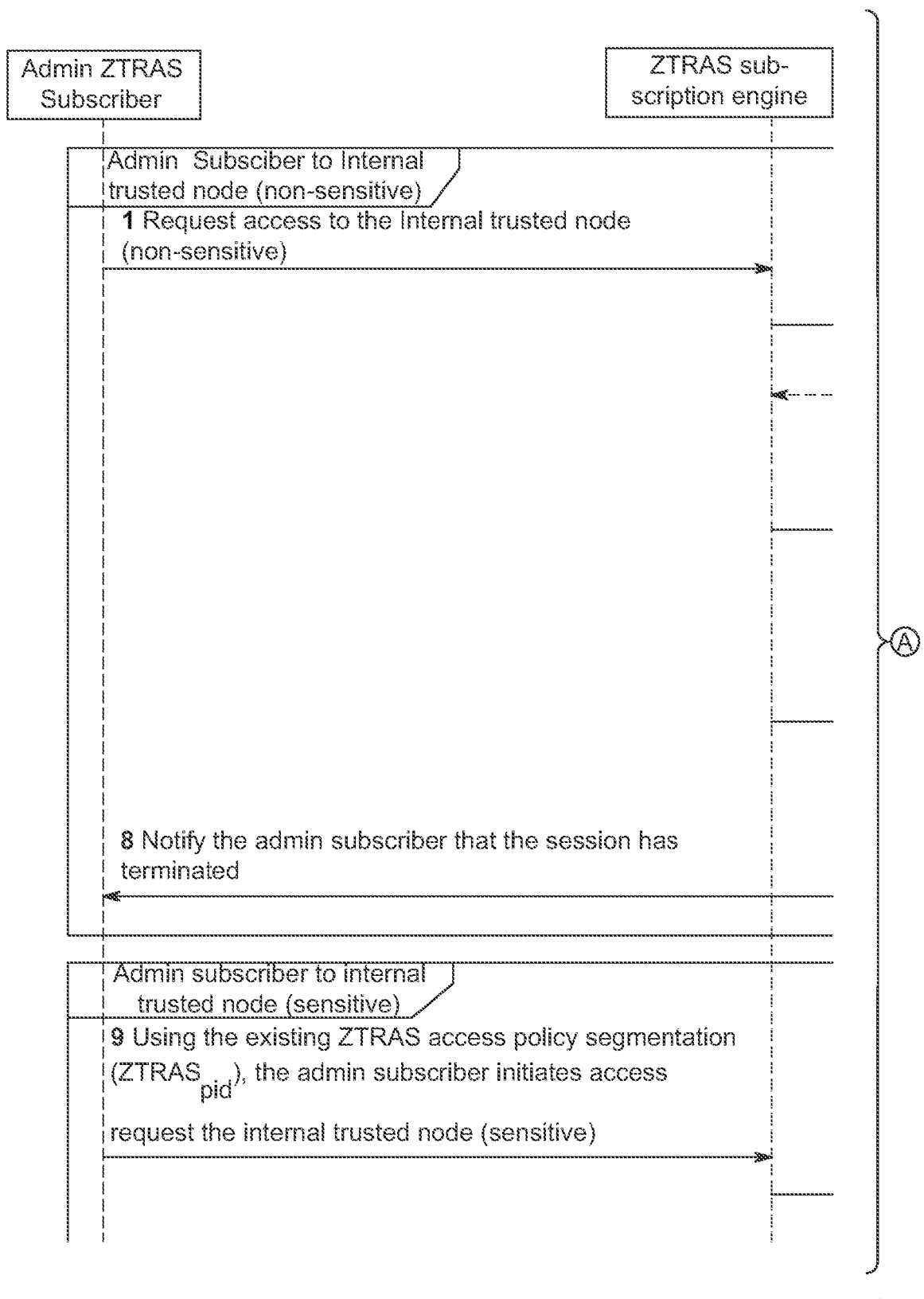
FIG. 12 illustrates a call flow for provisioning of sensitive and non-sensitive application or node access using ZTRAS access policy segmentation ($ZTRAS_{pid}$) for an Admin ZTRAS subscriber, according to an embodiment.
Figure 12:
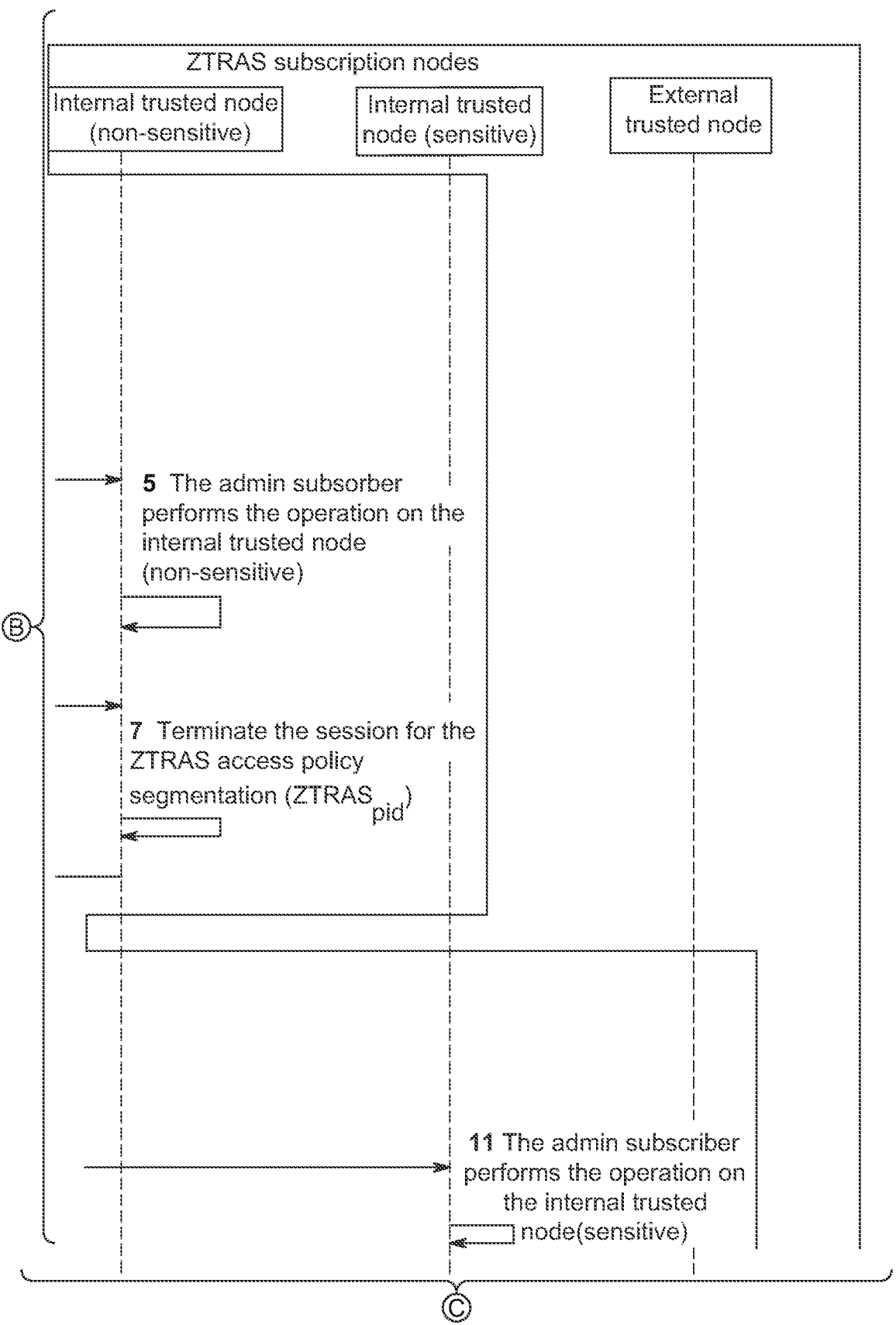
Figure 12:
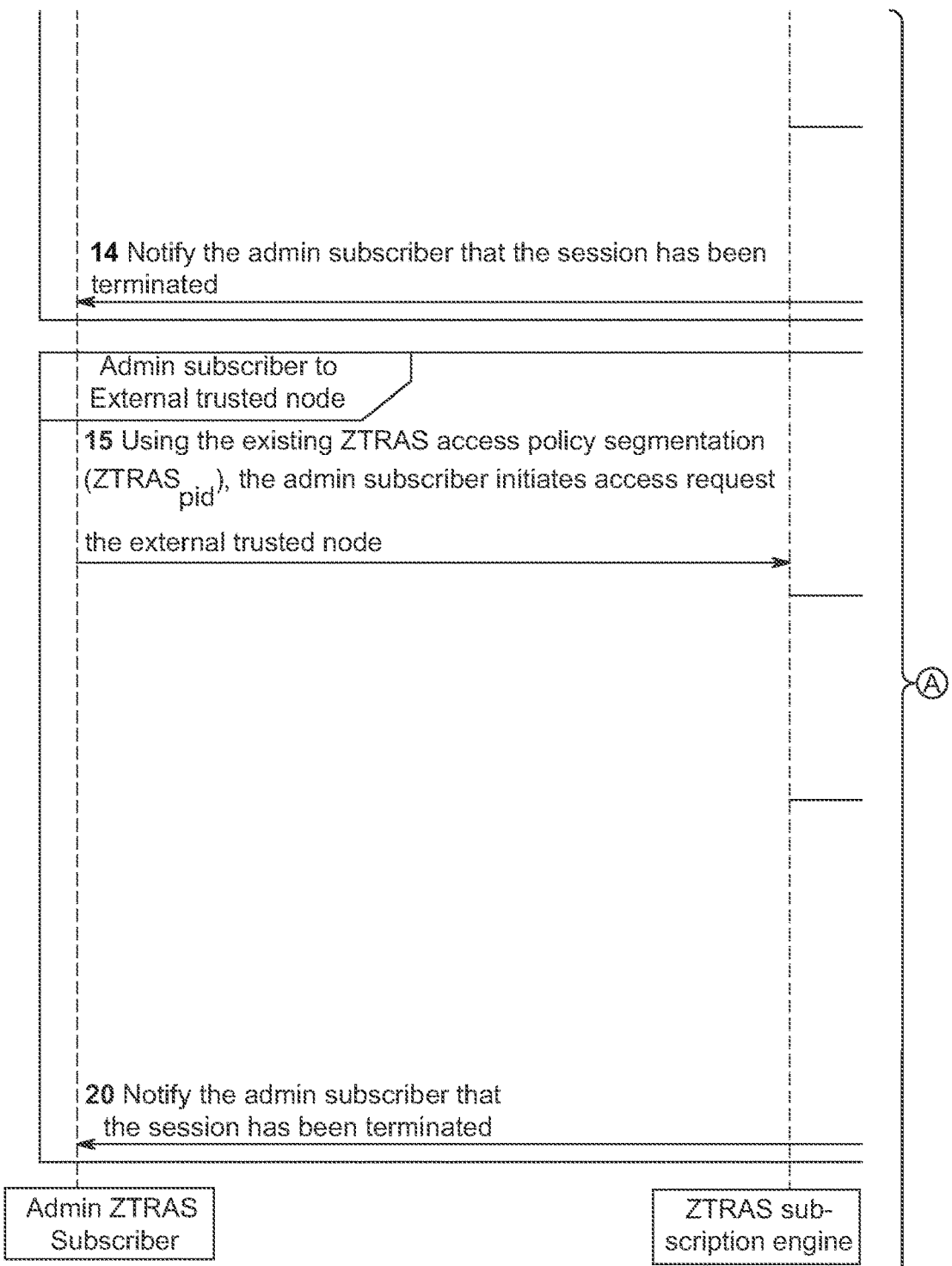
Figure 12:
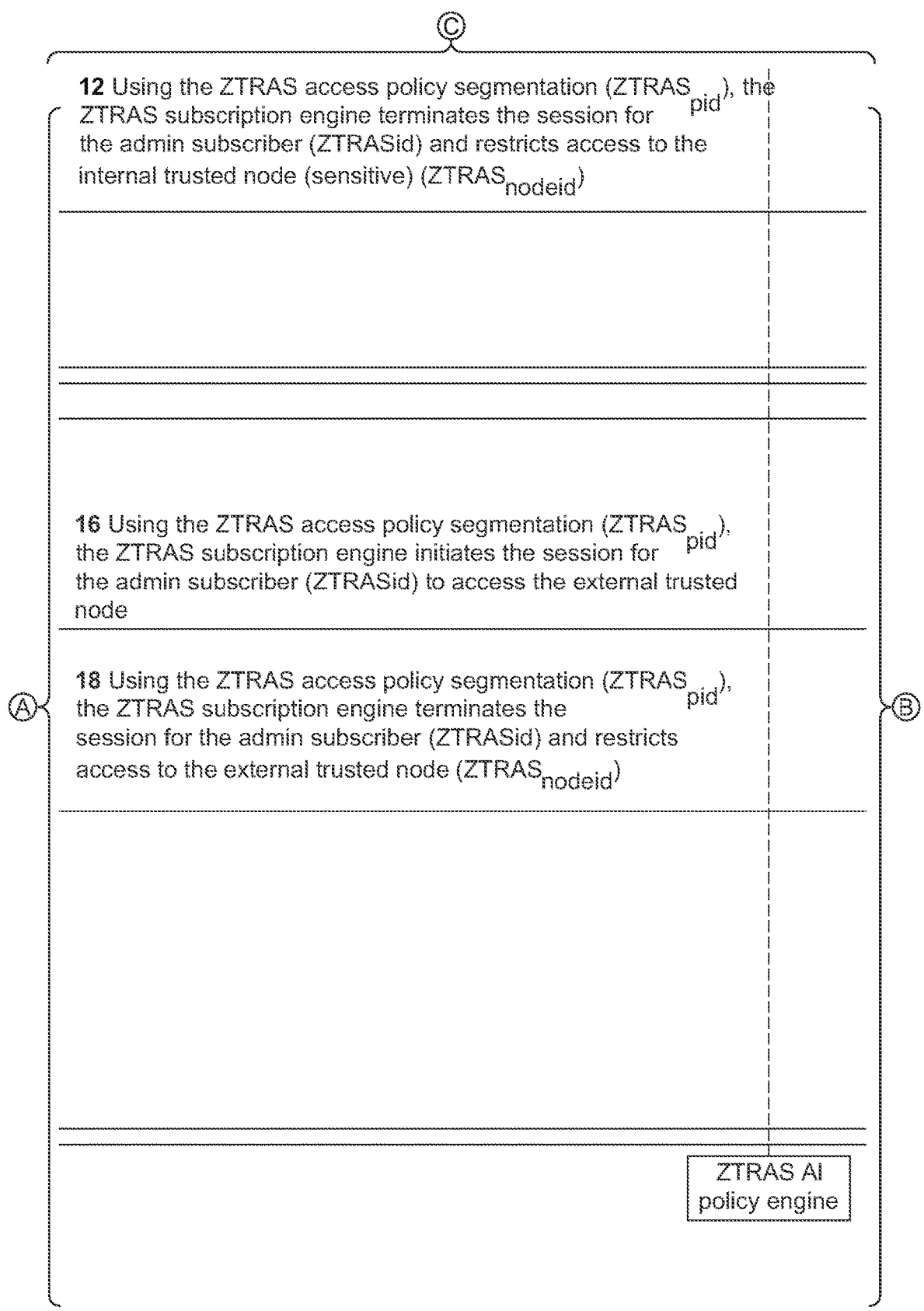
Figure 12:
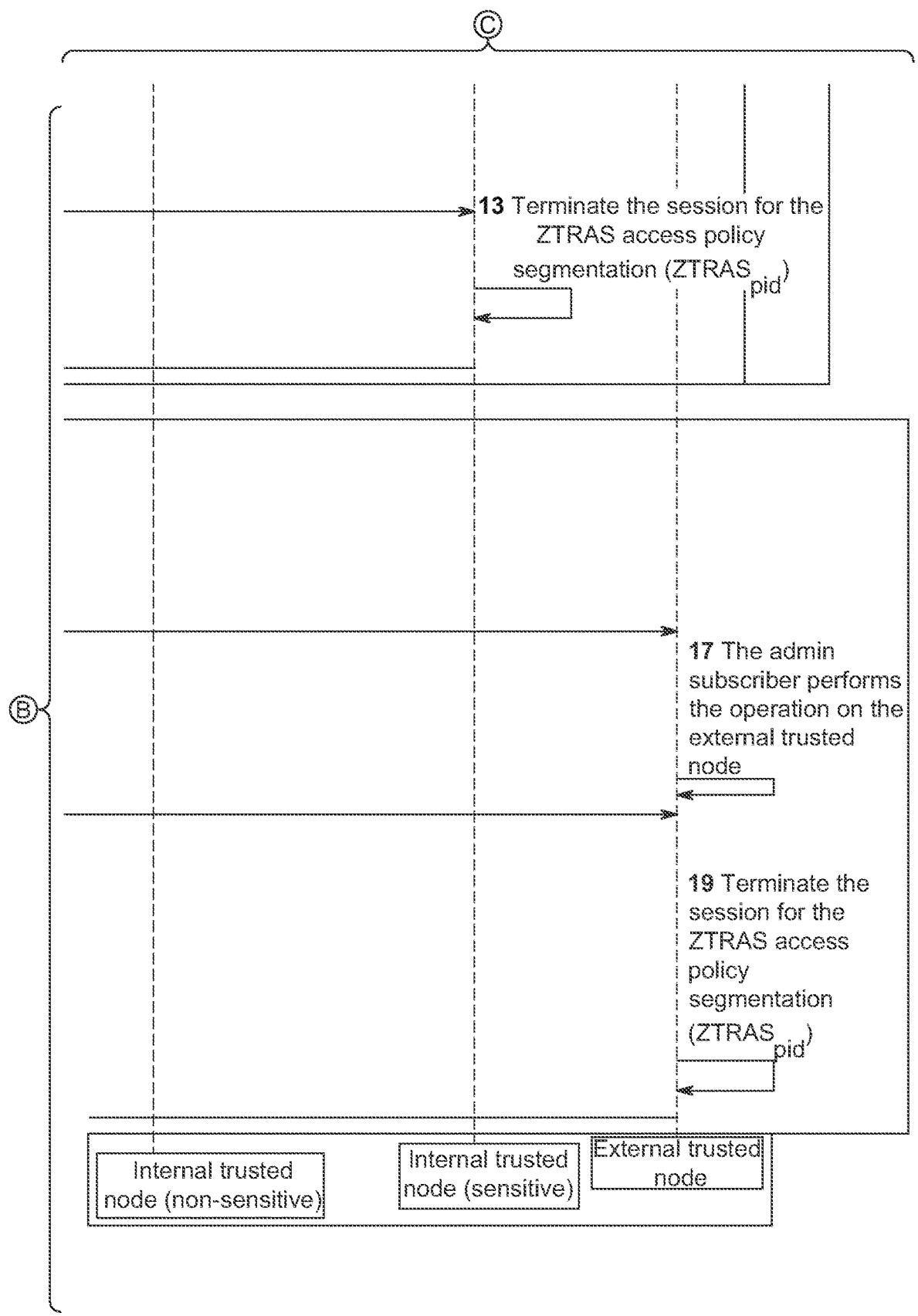

Use Case 6.3: Provisioning of Sensitive and Non-Sensitive Application Access Using ZTRAS Access Policy Segmentation ($ZTRAS_{pid}$) for Admin ZTRAS Subscriber FIG. 12 illustrates a call flow for provisioning of sensitive and non-sensitive application or node access using ZTRAS access policy segmentation ($ZTRAS_{pid}$) for an Admin ZTRAS subscriber, according to an embodiment. In the example of FIG. 12, the admin subscriber is defined to have access to internal trusted non-sensitive nodes, internal trusted sensitive nodes, and external trusted nodes.

Referring to FIG. 12, at (1), the admin subscriber requests the ZTRAS subscription engine for access to the internal trusted node (non-sensitive).

At (2), the ZTRAS subscription engine requests the ZTRAS AI policy engine for a new ZTRAS access policy segmentation ($ZTRAS_{pid}$) based on the $ZTRAS_{id}$, $ZTRAS_{nodeid}$ and the group ID.

At (3), the ZTRAS AI policy engine returns the generated ZTRAS access policy segmentation ($ZTRAS_{pid}$) based on the group ID.

At (4), using the ZTRAS access policy segmentation ($ZTRAS_{pid}$), the ZTRAS subscription engine initiates the session for the admin subscriber ($ZTRAS_{id}$) to access the internal trusted node (non-sensitive) ($ZTRAS_{nodeid}$).

At (5), the admin subscriber performs an operation on the internal trusted node (non-sensitive).

At (6), using the ZTRAS access policy segmentation ($ZTRAS_{pid}$), the ZTRAS subscription engine terminates the session for the admin subscriber ($ZTRAS_{id}$) and restricts access to the internal trusted node (non-sensitive) ($ZTRAS_{nodeid}$).

At (7), the session is terminated for the ZTRAS access policy segmentation ($ZTRAS_{pid}$) in the internal trusted node (non-sensitive).

At (8), the internal trusted node (non-sensitive) notifies the admin subscriber that the session has been terminated.

Steps (9) through (14) in the call flow of FIG. 12 are similar to steps (1) through (8), respectively, in the call flow of FIG. 12, other than that the internal trusted node (sensitive) is used in place of the internal trusted node (non-sensitive). Thus, redundant descriptions thereof are omitted below.

Steps (15) through (20) in the call flow of FIG. 12 are similar to steps (1) through (8), respectively, in the call flow of FIG. 12, other than that the external trusted node is used in place of the internal trusted node (non-sensitive). Thus, redundant descriptions thereof are omitted below.

Figure 13:
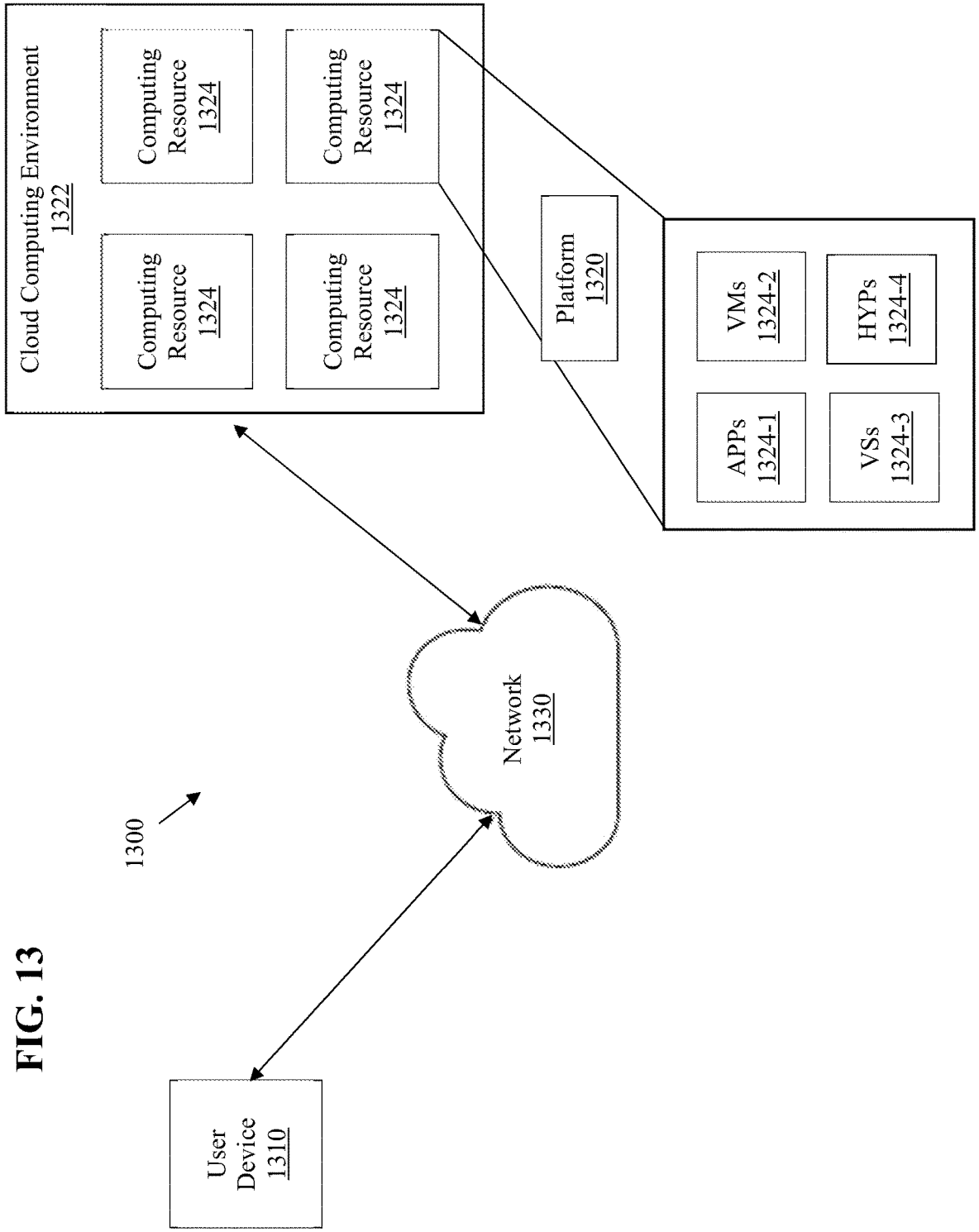
FIG. 13 is a diagram of an example environment in which systems and/or methods, described herein, may be implemented.

FIG. 13 is a diagram of an example environment 1300 in which systems and/or methods, described herein, may be implemented. As shown in FIG. 13, environment 1300 may include a user device 1310, a platform 1320, and a network 1330. Devices of environment 1300 may interconnect via wired connections, wireless connections, or a combination of wired and wireless connections. In embodiments, any of the functions and operations described with reference to FIGS. 1 through 12 above may be performed by any combination of elements illustrated in FIG. 13.

User device 1310 includes one or more devices capable of receiving, generating, storing, processing, and/or providing information associated with platform 1320. For example, user device 1310 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 1310 may receive information from and/or transmit information to platform 1320.

Platform 1320 includes one or more devices capable of receiving, generating, storing, processing, and/or providing information. In some implementations, platform 1320 may include a cloud server or a group of cloud servers. In some implementations, platform 1320 may be designed to be modular such that certain software components may be swapped in or out depending on a particular need. As such, platform 1320 may be easily and/or quickly reconfigured for different uses.

In some implementations, as shown, platform 1320 may be hosted in cloud computing environment 1322. Notably, while implementations described herein describe platform 1320 as being hosted in cloud computing environment 1322, in some implementations, platform 1320 may not be cloud-based (i.e., may be implemented outside of a cloud computing environment) or may be partially cloud-based.

Cloud computing environment 1322 includes an environment that hosts platform 1320. Cloud computing environment 1322 may provide computation, software, data access, storage, etc., services that do not require end-user (e.g., user device 1310) knowledge of a physical location and configuration of system(s) and/or device(s) that hosts platform 1320. As shown, cloud computing environment 1322 may include a group of computing resources 1324 (referred to collectively as "computing resources 1324" and individually as "computing resource 1324").

Computing resource 1324 includes one or more personal computers, a cluster of computing devices, workstation computers, server devices, or other types of computation and/or communication devices. In some implementations, computing resource 1324 may host platform 1320. The cloud resources may include compute instances executing in computing resource 1324, storage devices provided in computing resource 1324, data transfer devices provided by computing resource 1324, etc. In some implementations, computing resource 1324 may communicate with other computing resources 1324 via wired connections, wireless connections, or a combination of wired and wireless connections.

As further shown in FIG. 13, computing resource 1324 includes a group of cloud resources, such as one or more applications ("APPs") 1324-1, one or more virtual machines ("VMs") 1324-2, virtualized storage ("VSs") 1324-3, one or more hypervisors ("HYPs") 1324-4, or the like.

Application 1324-1 includes one or more software applications that may be provided to or accessed by user device 1310. Application 1324-1 may eliminate a need to install and execute the software applications on user device 1310. For example, application 1324-1 may include software associated with platform 1320 and/or any other software capable of being provided via cloud computing environment 1322. In some implementations, one application 1324-1 may send/receive information to/from one or more other applications 1324-1, via virtual machine 1324-2.

Virtual machine 1324-2 includes a software implementation of a machine (e.g., a computer) that executes programs like a physical machine. Virtual machine 1324-2 may be either a system virtual machine or a process virtual machine, depending upon use and degree of correspondence to any real machine by virtual machine 1324-2. A system virtual machine may provide a complete system platform that supports execution of a complete operating system ("OS"). A process virtual machine may execute a single program, and may support a single process. In some implementations, virtual machine 1324-2 may execute on behalf of a user (e.g., user device 1310), and may manage infrastructure of cloud computing environment 1322, such as data management, synchronization, or long-duration data transfers.

Virtualized storage 1324-3 includes one or more storage systems and/or one or more devices that use virtualization techniques within the storage systems or devices of computing resource 1324. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1324-4 may provide hardware virtualization techniques that allow multiple operating systems (e.g., "guest operating systems") to execute concurrently on a host computer, such as computing resource 1324. Hypervisor 1324-4 may present a virtual operating platform to the guest operating systems, and may manage the execution of the guest operating systems. Multiple instances of a variety of operating systems may share virtualized hardware resources.

Network 1330 includes one or more wired and/or wireless networks. For example, network 1330 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 13 are provided as an example. In practice, there may be additional devices and/or networks, fewer devices and/or networks, different devices and/or networks, or differently arranged devices and/or networks than those shown in FIG. 13. Furthermore, two or more devices shown in FIG. 13 may be implemented within a single device, or a single device shown in FIG. 13 may be implemented as multiple, distributed devices. Additionally, or alternatively, a set of devices (e.g., one or more devices) of environment 1300 may perform one or more functions described as being performed by another set of devices of environment 1300.

FIG. 14 is a diagram of example components of a device 1400. Device 1400 may correspond to user device 1310 and/or platform 1320. As shown in FIG. 14, device 1400 may include a bus 1410, a processor 1420, a memory 1430, a storage component 1440, an input component 1450, an output component 1460, and a communication interface 1470.

Bus 1410 includes a component that permits communication among the components of device 1400. Processor 1420 may be implemented in hardware, firmware, or a combination of hardware and software. Processor 1420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1420 includes one or more processors capable of being programmed to perform a function. Memory 1430 includes a random access memory (RAM), a read only memory (ROM), and/or another type of dynamic or static storage device (e.g., a flash memory, a magnetic memory, and/or an optical memory) that stores information and/or instructions for use by processor 1420.

Storage component 1440 stores information and/or software related to the operation and use of device 1400. For example, storage component 1440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1450 includes a component that permits device 1400 to receive information, such as via user input (e.g., a touch screen display, a keyboard, a keypad, a mouse, a button, a switch, and/or a microphone). Additionally, or alternatively, input component 1450 may include a sensor for sensing information (e.g., a global positioning system (GPS) component, an accelerometer, a gyroscope, and/or an actuator). Output component 1460 includes a component that provides output information from device 1400 (e.g., a display, a speaker, and/or one or more light-emitting diodes (LEDs)).

Communication interface 1470 includes a transceiver-like component (e.g., a transceiver and/or a separate receiver and transmitter) that enables device 1400 to communicate with other devices, such as via a wired connection, a wireless connection, or a combination of wired and wireless connections. Communication interface 1470 may permit device 1400 to receive information from another device and/or provide information to another device. For example, communication interface 1470 may include an Ethernet interface, an optical interface, a coaxial interface, an infrared interface, a radio frequency (RF) interface, a universal serial bus (USB) interface, a Wi-Fi interface, a cellular network interface, or the like.

Device 1400 may perform one or more processes described herein. Device 1400 may perform these processes in response to processor 1420 executing software instructions stored by a non-transitory computer-readable medium, such as memory 1430 and/or storage component 1440. A computer-readable medium is defined herein as a non-transitory memory device. A memory device includes memory space within a single physical storage device or memory space spread across multiple physical storage devices.

Software instructions may be read into memory 1430 and/or storage component 1440 from another computer-readable medium or from another device via communication interface 1470. When executed, software instructions stored in memory 1430 and/or storage component 1440 may cause processor 1420 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 14 are provided as an example. In practice, device 1400 may include additional components, fewer components, different components, or differently arranged components than those shown in FIG. 14. Additionally, or alternatively, a set of components (e.g., one or more components) of device 1400 may perform one or more functions described as being performed by another set of components of device 1400.

In embodiments, any one of the operations or processes of FIGS. 1 through 12 may be implemented by or using any one of the elements illustrated in FIGS. 13 and 14. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computereadable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiberoptic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for controlling zero trust remote access to a target node in a network system, the method comprising:
    receiving a request of a user to access the target node in the network system;
    generating, based on parameters of the user and the target node, an access policy segmentation for the user to access the target node;
    providing, based on the generated access policy segmentation, the user with access to the target node; and
    terminating, based on the generated access policy segmentation, access of the user to the target node,
    wherein the user is a zero trust remote access system (ZTRAS) subscribed user, the target node is a ZTRAS subscribed node, and the access policy segmentation is a ZTRAS access policy segmentation, and
    wherein the access policy segmentation is variably generated based on whether the target node is a ZTRAS internal subscribed node or a ZTRAS external subscribed node.

2. The method as claimed in claim 1, wherein the parameters comprise a ZTRAS subscription identification (ID) of the user registered for the ZTRAS for the network system and a ZTRAS subscription ID of the target node registered for the ZTRAS.

3. The method as claimed in claim 2, wherein the parameters further comprise a group ID of the target node, the group ID corresponding to a plurality of nodes for which a same policy is applicable.

4. The method as claimed in claim 2, wherein the parameters further comprise a trust percentage calculated by the ZTRAS for the user and a trust percentage calculated by the ZTRAS for the target node.

5. The method as claimed in claim 2, wherein the generated access policy segmentation is a policy ID that is a combination of at least some of the parameters.

6. The method as claimed in claim 2, wherein the generated access policy segmentation provides user access to the target node based on the user being registered as an internal subscriber to the ZTRAS and the target node being registered an internal non-sensitive subscriber to the ZTRAS.

7. The method as claimed in claim 2, wherein based on the user being registered as an internal subscriber to the ZTRAS, the generated access policy segmentation restricts user access to the target node without administrator approval based on the target node being registered an internal sensitive subscriber to the ZTRAS or an external subscriber to the ZTRAS.

8. The method as claimed in claim 2, wherein the generated access policy segmentation denies user access to the target node based on the user being registered as an external subscriber to the ZTRAS and the target node being registered an internal sensitive subscriber to the ZTRAS.

9. The method as claimed in claim 2, wherein based on the user being registered as an external subscriber to the ZTRAS, the generated access policy segmentation restricts user access to the target node without administrator approval based on the target node being registered an internal non-sensitive subscriber to the ZTRAS or an external subscriber to the ZTRAS.

10. A system for controlling zero trust remote access to a target node in a network system, the system comprising:
at least one memory storing instructions; and
at least one processor configured to execute the instructions to:
receive a request of a user to access the target node in the network system;
generate, based on parameters of the user and the target node, an access policy segmentation for the user to access the target node;
provide, based on the generated access policy segmentation, the user with access to the target node; and
terminate, based on the generated access policy segmentation, access of the user to the target node,
wherein the user is a zero trust remote access system (ZTRAS) subscribed user, the target node is a ZTRAS subscribed node, and the access policy segmentation is a ZTRAS access policy segmentation, and
wherein the access policy segmentation is variably generated based on whether the target node is a ZTRAS internal subscribed node or a ZTRAS external subscribed node.

11. The system as claimed in claim 10, wherein the parameters comprise a ZTRAS subscription identification (ID) of the user registered for the ZTRAS for the network system and a ZTRAS subscription ID of the target node registered for the ZTRAS.

12. The system as claimed in claim 11, wherein the parameters further comprise a group ID of the target node, the group ID corresponding to a plurality of nodes for which a same policy is applicable.

13. The system as claimed in claim 11, wherein the parameters further comprise a trust percentage calculated by the ZTRAS for the user and a trust percentage calculated by the ZTRAS for the target node.

14. The system as claimed in claim 11, wherein the generated access policy segmentation is a policy ID that is a combination of at least some of the parameters.

15. The system as claimed in claim 11, wherein the generated access policy segmentation provides user access to the target node based on the user being registered as an internal subscriber to the ZTRAS and the target node being registered an internal non-sensitive subscriber to the ZTRAS.

16. The system as claimed in claim 11, wherein based on the user being registered as an internal subscriber to the ZTRAS, the generated access policy segmentation restricts user access to the target node without administrator approval based on the target node being registered an internal sensitive subscriber to the ZTRAS or an external subscriber to the ZTRAS.

17. The system as claimed in claim 11, wherein the generated access policy segmentation denies user access to the target node based on the user being registered as an external subscriber to the ZTRAS and the target node being registered an internal sensitive subscriber to the ZTRAS.

18. The system as claimed in claim 11, wherein based on the user being registered as an external subscriber to the ZTRAS, the generated access policy segmentation restricts user access to the target node without administrator approval based on the target node being registered an internal non-sensitive subscriber to the ZTRAS or an external subscriber to the ZTRAS.

19. A non-transitory computer-readable recording medium having recorded thereon instructions executable by at least one processor to perform a method for controlling zero trust remote access to a target node in a network system, the method comprising:
receiving a request of a user to access the target node in the network system;
generating, based on parameters of the user and the target node, an access policy segmentation for the user to access the target node;
providing, based on the generated access policy segmentation, the user with access to the target node; and
terminating, based on the generated access policy segmentation, access of the user to the target node,
wherein the user is a zero trust remote access system (ZTRAS) subscribed user, the target node is a ZTRAS subscribed node, and the access policy segmentation is a ZTRAS access policy segmentation, and
wherein the access policy segmentation is variably generated based on whether the target node is a ZTRAS internal subscribed node or a ZTRAS external subscribed node.

20. The non-transitory computer-readable recording medium as claimed in claim 19, wherein the parameters comprise a ZTRAS subscription identification (ID) of the user registered for the ZTRAS for the network system and a ZTRAS subscription ID of the target node registered for the ZTRAS.

* * * * *